United States Patent
Oni

(10) Patent No.: US 7,299,217 B2
(45) Date of Patent: Nov. 20, 2007

(54) SYSTEMS AND METHODS FOR PROVIDING ADAPTIVE TOOLS FOR ENABLING COLLABORATIVE AND INTEGRATED DECISION-MAKING

(76) Inventor: Adeboyejo A. Oni, 4329 Leland St., Chevy Chase, MD (US) 20815

( * ) Notice: Subject to any disclaimer, the term of this patent is extended or adjusted under 35 U.S.C. 154(b) by 385 days.

(21) Appl. No.: 10/657,562

(22) Filed: Sep. 9, 2003

(65) Prior Publication Data

US 2004/0133546 A1 Jul. 8, 2004

Related U.S. Application Data

(60) Provisional application No. 60/408,875, filed on Sep. 9, 2002, provisional application No. 60/432,661, filed on Dec. 12, 2002.

(51) Int. Cl.
*G06F 7/00* (2006.01)
(52) U.S. Cl. .............. 707/1; 705/10; 705/14; 705/23
(58) Field of Classification Search ............ 707/1; 705/10, 14, 23
See application file for complete search history.

(56) References Cited

U.S. PATENT DOCUMENTS

| | | | | |
|---|---|---|---|---|
| 5,732,397 | A * | 3/1998 | DeTore et al. ............... | 705/1 |
| 5,810,605 | A * | 9/1998 | Siefert ...................... | 434/362 |
| 5,813,863 | A * | 9/1998 | Sloane et al. .............. | 434/236 |
| 5,904,485 | A * | 5/1999 | Siefert ...................... | 434/322 |
| 6,067,539 | A * | 5/2000 | Cohen ....................... | 707/2 |
| 6,370,510 | B1 * | 4/2002 | McGovern et al. ........... | 705/1 |
| 6,782,370 | B1 * | 8/2004 | Stack ....................... | 705/10 |
| 7,043,443 | B1 * | 5/2006 | Firestone ................... | 705/8 |
| 7,085,806 | B1 * | 8/2006 | Shapira ..................... | 709/203 |
| 2002/0002479 | A1 * | 1/2002 | Almog et al. ............... | 705/8 |
| 2002/0019763 | A1 * | 2/2002 | Linden et al. .............. | 705/10 |
| 2002/0055867 | A1 * | 5/2002 | Putnam et al. .............. | 705/8 |
| 2002/0087416 | A1 * | 7/2002 | Knutson .................... | 705/23 |

* cited by examiner

*Primary Examiner*—Tim Vo
*Assistant Examiner*—Mahesh Dwivedi
(74) *Attorney, Agent, or Firm*—DLA Piper US LLP

(57) ABSTRACT

A system and method for presenting data relating to at least one individualized instructional program, comprising: receiving filtering criteria, accessing at least one repository of data relating to the individualized instructional program, and identifying data responsive to the filtering criteria.

35 Claims, 59 Drawing Sheets

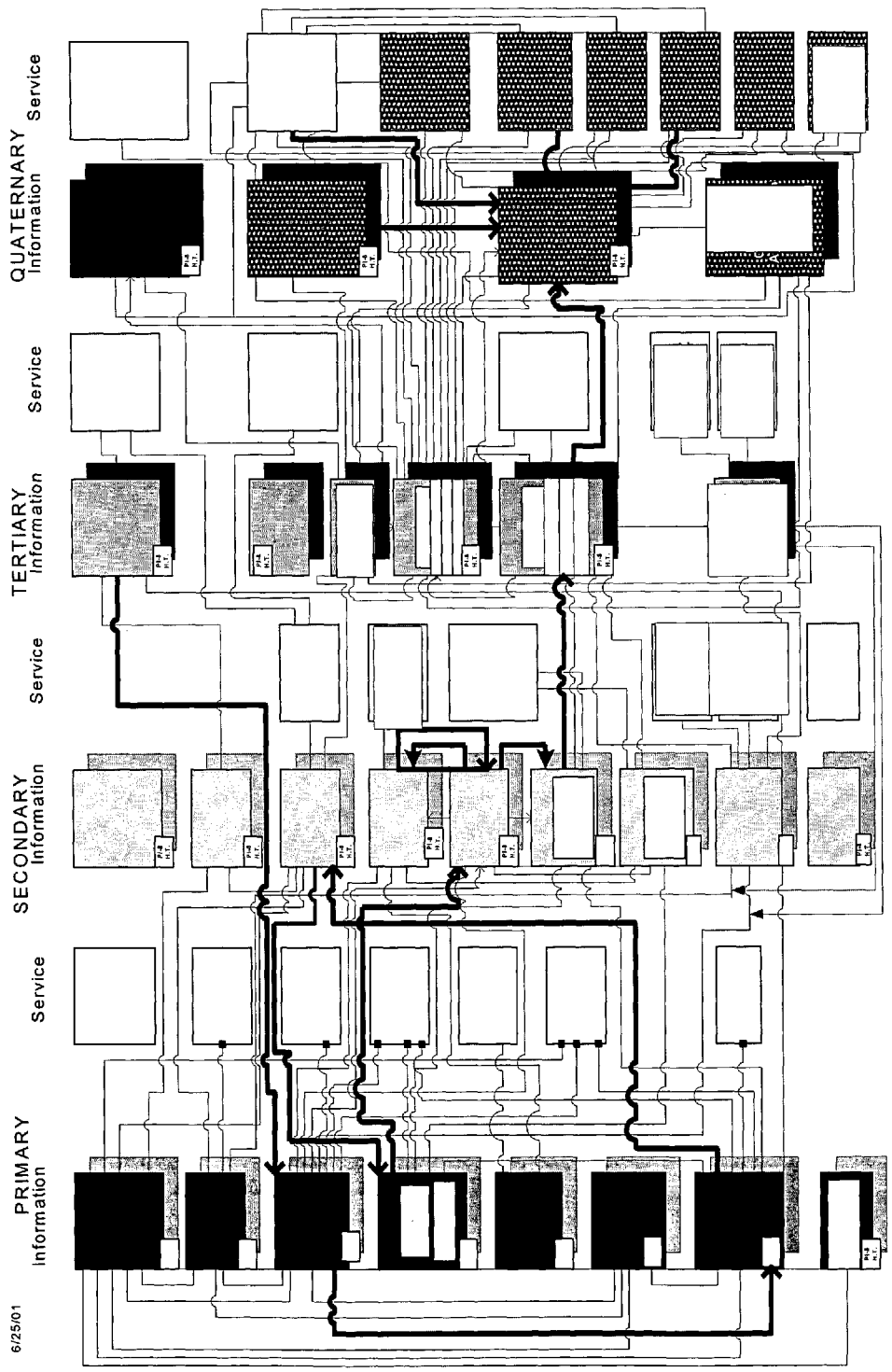

PathhFinder:E: Logic for Data Relationships -- College Level-Scenario #109A

FIGURE 2H

Inter-Module Data Relationship Connections

| Module Number | Module Code | Module Designation | List Available? | Content Available for List Item(s)? | Other Modules Data-Connected to Current Module | Total # of Relational Connections |
|---|---|---|---|---|---|---|
| 1 | R1 | Agencies & Companies | | | R2,R3,R5,RCPA-GL,C1,C2,C3,C4,P1,A1,A2 | 11 |
| 2 | R2 | Industries | | | R1,R3,R5,RCPA-GL,C1,C2,C3,C4,C5 | 9 |
| 3 | R3 | Engineering Disciplines | | | R1,R2,R4,R5,RCPA-GL,C1,C2,C3,C4,C5,A1,A2,A3 | 13 |
| 4 | R4 | Colleges | | | R3,R5,RCPA-GL,C1,C3,P1,P2,P3,P4,P5,A1,A2 | 12 |
| 5 | R5 | Financial Resources | | | R1,R2,R3,R4,RCPA-GL,P1,P2,P3,A1 | 9 |
| 6 | RCPA-GL | Geographical Locations | | | R1,R2,R3,R4,R5,C1,C2,C3,C4,C5,P1,P2,P4,A1,A2,A3,A4 | 17 |
| 7 | C1 | Internships | | | R1,R2,R3,R4,RCPA-GL,C2,C3,C4,C5,P1,P2,P3,P4,P5,A1,A2,A3 | 17 |
| 8 | C2 | Job Links | | | R1,R2,R3,R4,RCPA-GL,C1,C3,C4,P1,P2,P3,P4,A1,A2,A3 | 14 |
| 9 | C3 | Job Descriptions | | | R1,R2,R3,R4,RCPA-GL,C1,C2,C4,C5,P1,P2,P3,P4,A1,A2,A3 | 16 |
| 10 | C4 | Engineering Careers | | | R1,R2,R3,RCPA-GL,C1,C2,C3,C5,P1,P2,P3,P4,A1,A2,A3 | 15 |
| 11 | C5 | Strategies for Employment | | | R2,R3,RCPA-GL,C1,C3,C4 | 6 |
| 12 | P1 | College Program Types | | | R1,R4,R5,RCPA-GL,C1,C2,C3,C4,P2,P3,P4,P5,A1,A2,A3 | 15 |
| 13 | P2 | College Programs | | | R4,R5,RCPA-GL,C1,C2,C3,C4,P1,P3,P4,P5,A1,A2,A3 | 14 |
| 14 | P3 | Distance/Online Programs | | | R4,R5,C1,C2,C3,C4,P1,P2,P4,P5,A1,A2,A3 | 13 |
| 15 | P4 | Secondary School Standards | | | R4,RCPA-GL,C1,C2,C3,C4,P1,P2,P3,A1,A2,A3 | 12 |
| 16 | P5 | College Entrance Testing | | | R4,C1,P1,P2,P3,A1 | 6 |
| 17 | A1 | Curricula | | | R1,R3,R4,R5,RCPA-GL,C1,C2,C3,C4,P1,P2,P3,P4,P5,A2,A3 | 16 |
| 18 | A2 | Course Types | | | R1,R3,R4,RCPA-GL,C1,C2,C3,C4,P1,P2,P3,P4,A1,A3,A4 | 15 |
| 19 | A3 | Courses | | | R3,RCPA-GL,C1,C2,C3,C4,P1,P2,P3,P4,A1,A2,A4 | 13 |
| 20 | A4 | Course Tutoring | | | RCPA-GL,A2,A3 | 3 |
| | | | | | TOTAL # OF CONNECTION NODES | 246 |
| | | | | | TOTAL # OF DISTINCT 2-WAY CONNECTIONS (= # OF DB TABLES) | 123 |

APPLICATION OVERVIEW 2

FIGURE 11A

PathFinder

○○○●●Engineering | Explore | Job Market | Curriculum Designer

Virginia Polytechnic Institute
*Aerospace Engineering*

| | Status |
|---|---|
| Curricular Standards | |
| Participation in math & science clubs and fairs in HS | ✓ |
| ▲ Familiarity with and possession of a personal computer | ✗ |
| SAT scores | ✓ |
| High school GPA | ✓ |
| Curricular Prerequisites | |
| H.S. Chemistry | ✓ |
| Pre-Calculus | ✓ |
| H.S. Biology | ✓ |
| Algebra II/Trig. | ✓ |
| H.S. English | ✗ |

Familiarity with and possession of a personal computer

All entering students are required to have a personal computer. The engineering curriculum emphasizes the use of computers in the analysis and solution of engineering problems. Detailed specifications on the type of computer required differ from the rest of the university, and are announced by the college in late spring.

For more information, visit the engineering web site at http://www.eng.vt.edu/compreq/index.html.

▼ How To Meet This Curricular Standard

| | |
|---|---|
| Computer Form Factor | Notebook – Not a Slate form of Tablet PC |
| Processor/Processor Speed | *Intel Pentium 4M or Pentium-M (or equivalent processor) with a clock frequency of 1.40GHz + |
| Operating system | Windows XP Professional |
| Memory | 512MB on Single DIMM |
| Hard Drive | 40 Gigabytes |
| Video Card | 16MB or greater |
| Optical Device Options | DVD+R or DVD-R or DVD/CDRW |
| Network Card | 10/100 Mbit Ethernet Card and 802.1 1b Wireless Interface |
| Modem | 56Kb Modem that uses the V.90 Standard. Winmodems are not acceptable |
| Input/Output | USB, Serial and Parallel |
| File System | NTFS |
| Warranty | Recommended 3 Year |
| Software | Students are required to purchase the Engineering Student Software Bundle. This bundle offers over $1500 worth of software for around $500. Information on the bundle, pricing and pickup can be found at the software purchasing site. |

▶ Other Useful Information

[ Placement Testing ] [ Intelligent Tutor ]

◀ Explore Related... [ Select ▼ ]

| | Grade Credits |
|---|---|
| Sem 1 - Fall 2002 - $10,557 [+] [ Input Grades ] | 18 |
| General Chemistry 1 | 3 |
| General Chemistry Laboratory 1 | 3 |
| Introduction To Engineering 1 | 3 |
| Freshman English 1 | 3 |
| Calculus I | 3 |
| Elementary Linear Algebra | 3 |
| Sem 2 - Spring 2003 - $10,557 [+] [ - ] | 18 |
| Introduction To Engineering II | 3 |
| Freshman English II | 3 |
| Calculus II | 3 |
| Vector Geometry | 3 |
| Foundations Of Physics I | 3 |
| ▶More | |

*GPA: 3.68  Cost: $46,536  Credits: 19/120*

◀ EXIT PATHFINDER | Petr Sedy | SELECT PATH | Current Path Name ▲ | MANAGE PATHS | Articulate

FIGURE 11B

PathFinder
○○○●● Engineering | Explore | Job Market | Curriculum Designer

Virginia Polytechnic Institute
*Aerospace Engineering*

Algebra II/Trig.

All entering students are required to have a personal computer. The engineering curriculum emphasizes the use of computers in the analysis and solution of engineering problems. Detailed specifications on the type of computer required differ from the rest of the university, and are announced by the college in late spring. For more information, visit the engineering web site at www.eng.vt.edu/compreq/index.html.

| *Curricular Standards* | Status |
|---|---|
| Participation in math & science clubs and fairs in HS | ✓ |
| Familiarity with and possession of a personal computer | ✓ |
| SAT scores | ✓ |
| High school GPA | ✓ |

*Curricular Prerequisites*

| H.S. Chemistry | ✓ |
|---|---|
| Pre-Calculus | ✓ |
| H.S. Biology | ✓ |
| ▶ Algebra II/Trig. | X |
| H.S. English | ✓ |

How To Meet This Curricular Prerequisite Algebra II/Trig.

Other Useful Information

[Placement Testing] [Intelligent Tutor]

◀ Explore Related... | Select ▼

| | | | Grade | Credits |
|---|---|---|---|---|
| | | [Input Grades] | | 18 |
| *Semester 1  Fall 2002* | [+] [-] | | | |
| General Chemistry I | | | | 3 |
| General Chemistry Laboratory 1 | | | | 4 |
| Introduction To Engineering 1 | | | | 4 |
| Freshman English I | | | | 2 |
| Calculus I | | | | 3 |
| Elementary Linear Algebra | | | | 3 |
| *Semester 2  Spring 2003* | [+] [-] | | | 18 |
| Introduction To Engineering II | | | | 3 |
| Freshman English II | | | | 3 |
| Calculus II | | | | 3 |

▶More

*GPA:* 3.68  *Cost:* $46,536  *Credits:* 19/120

| EXIT PATHFINDER ▼ | *Petr Sedy* | SELECT PATH | Current Path Name ▲ | MANAGE PATHS |
|---|---|---|---|---|
| | | | Articulate | |

FIGURE 11C

PathFinder

○ ○ ○ ● ● Engineering | Explore | Job Market | Curriculum Designer

Virginia Polytechnic Institute
*Aerospace Engineering*

| *Curricular Standards* | Status |
|---|---|
| Participation in math & science clubs and fairs in HS | ✓ |
| Familiarity with and possession of a personal computer | ✓ |
| SAT scores | ✓ |
| High school GPA | ✓ |

*Curricular Prerequisites*

| | |
|---|---|
| H.S. Chemistry | ✓ |
| Pre-Calculus | ✓ |
| H.S. Biology | ✓ |
| Algebra II/Trig. | ✗ |
| H.S. English | ✓ |

Elementary Linear Algebra

Course Co- and Pre- Requisites:
   Pre-Calculus   Met
   H.S. Biology   Waived
X Algebra II/Trig.   UNMET   Replace Elementary Linear Algebra with this Algebra II/Trig?  [YES] [NO]

Course Objectives:
This course introduces the student to the basic concepts of linear algebra and includes the following topics: systematic solution of linear systems and Gaussian elimination, basic matrix algebra, vectors in two- and three-dimensional space, and eigenvalue problems.

Course Expected Outcomes:
- To be familiar with solving linear systems
- To be able to reduce matrices using Gaussian elimination
- Solving matrices with basic matrix algebra
- Evaluating vectors in two and three dimensional space
- Competency to solve eigenvalue problems ▶ Course Syllabus
▶ Course Coverage Schedule
▶ Course Resources
▶ History of Student Performance
▶ Archive of Student Reviews
▶ Other Pertinent Information

[Placement Testing]  [Intelligent Tutor]

| | Grade | Input Grades | Credits |
|---|---|---|---|
| Sem 1 - Fall 2002 - $10,557 | | [+] [-] | 18 |
| General Chemistry I | | | 3 |
| General Chemistry Laboratory I | | | 3 |
| Introduction To Engineering I | | | 3 |
| Freshman English I | | | 3 |
| Calculus I | | | 3 |
| ▶ Elementary Linear Algebra | | | 3 |
| Sem 2 - Spring 2003 - $10,557 | | [+] [-] | |
| Introduction To Engineering II | | | 3 |
| Freshman English II | | | 3 |

*GPA: 3.68  Cost: $46,536  Credits: 19/120* ▶ More

↖ Explore Related... [Select ▼]      [Articulate]

▼ EXIT PATHFINDER    Petr Sedy   SELECT PATH  Current Path Name ▲  MANAGE PATHS

FIGURE 11D

PathFinder

○○○●●Engineering | Explore | Job Market | Curriculum Designer

Virginia Polytechnic Institute
Aerospace Engineering

Algebra II/Trigonometry

| Curricular Standards | Status |
|---|---|
| Participation in math & science clubs and fairs in HS | ✓ |
| Familiarity with and possession of a personal computer | ✓ |
| SAT scores | ✓ |
| High school GPA | ✓ |

Course Description:
Euclidean vectors, complex numbers, and topics in linear algebra including linear systems, matrices, determinants, eigenvalues, and bases in Euclidean space.

Course Objectives:

Course Expected Outcomes:

Course Co- and Pre-Requisites:

Curricular Prerequisites
| | |
|---|---|
| H.S. Chemistry | ✓ |
| Pre-Calculus | ✓ |
| H.S. Biology | ✓ |
| Algebra II/Trig. | ✓ |
| H.S. English | ✓ |

Grade Credits

▶ Course Syllabus
▶ Course Coverage Schedule
▶ Course Resources
▶ History of Student Performance
▶ Archive of Student Reviews
▶ Other Pertinent Information

| Sem 1 – Fall 2002 – $10,557 | Input Grades | + | – | 18 |
|---|---|---|---|---|
| General Chemistry I | | | | 3 |
| General Chemistry Laboratory I | | | | 3 |
| Introduction To Engineering I | | | | 3 |
| Freshman English I | | | | 3 |
| Calculus I | | | | 3 |
| ▶ Algebra II/Trig. | | | | 3 |

| Sem 2 – Spring 2003 – $10,557 | + | – | 17 |
|---|---|---|---|
| Introduction To Engineering II | | | 3 |
| Freshman English II | | | 4 |

▶ More

Placement Testing | Intelligent Tutor

↰ Explore Related...

GPA: 3.68 Cost: $46,536 Credits: 19/120

▼ EXIT PATHFINDER | Petr Sedy | SELECT PATH | Current Path Name ▼ | Select ▼ | Articulate | MANAGE PATHS ▲

PathFinder ooo**Engineering | Explore | Job Market | Curriculum Designer

Virginia Polytechnic Institute
Aerospace Engineering

| | Grade | Credits |
|---|---|---|
| *Sem 1 - Fall 2002 - $10,557* | | 18 |
| General Chemistry I | A | 3 |
| General Chemistry Laboratory I | B | 4 |
| Introduction To Engineering I | B | 2 |
| Freshman English I | C | 3 |
| Calculus I | B | 3 |
| Algebra II / Trig. | A | 3 |
| *Sem 2 - Spring 2003 - $10,557* | | 18 |
| Elementary Linear Algebra | C | 3 |
| Introduction to Engineering II | B | 4 |
| Freshman English II | B | 2 |
| Calculus II | F | 3 |
| Vector Geometry | A | 2 |
| Foundations of Physics I | A | 2 |
| *Sem 3 - Fall 2003 - $10,557* [+][-] | | 18 |
| Calculus II | | 3 |
| General Chemistry II | | 4 |
| Computational Methods | | 4 |
| ▲ Intro to Aerospace Engineering | | 2 |
| Statics | | 3 |
| Multivariable Calculus | | 2 |

*GPA: 3.68  Cost: $46,536  Credits: 19/120*  ►More

---

Intro to Aerospace Engineering

Course Description:
An overview of aerospace engineering from a design perspective; introductory aerodynamics, lift, drag and the standard atmosphere; aircraft performance, stability, and control; propulsion; structures; rocket and spacecraft trajectories and orbits.

Course Objectives:
To highlight the fundamental concepts and approaches of aerospace engineering and design through lectures on aeronautics, astronautics, and design. To immerse student teams in a hands-on, lighter-than-air (LTA) vehicle design project where they design, build, and fly radio-controlled LTA vehicles. To show the connections between theory and practice in the LTA vehicle project.

Course Expected Outcomes:
Solid understanding of the fundamental concepts and approaches of aerospace engineering and design. To design, build, and fly radio-controlled LTA vehicles. To estimate and illustrate the performance, weight, and principal characteristics of the LTA vehicles using physics, mathematics, and chemistry known to freshmen (the emphasis being on the application of this knowledge to aerospace engineering and design rather than on exposure to new science and mathematics).

Course Co- and Pre-Requisites:
Prerequisites -- AOE 4134    Met
              AOE 4065/6   Met Corequisites -- MATH 2224   Met ▶ Course Syllabus
▶ Course Coverage Schedule
▶ Course Resources
▶ History of Student Performance
▶ Archive of Student Reviews
▶ Other Pertinent Information

[ Placement Testing ]  [ Intelligent Tutor ]

↩ Explore Related...

[ Internships ▼ ]
  Companies
  Job Functions

Articulate

---

▼ EXIT PATHFINDER | Petr Sedy | SELECT PATH | Current Path Name ▲ | MANAGE PATHS

FIGURE 11 I

PATHFINDER

○○○●● ENGINEERING | EXPLORE | JOB MARKET | CURRICULUM DESIGNER

YOU'RE NOW EXPLORING:
2003 RI-SGC
Summer Internships

▲ INSTITUTIONS, FUNDING & EMPLOYERS
▲ PURSUITS
▲ PROGRAMS & STANDARDS
▼ CURRICULA AND COURSES
   CURRICULA
   COURSE TYPES
   COURSES
   COURSE TUTORING

*SUMMER INTERNSHIP – UNITED TECHNOLOGIES*

▶ ADD TO BASKET

Title of Internship: Energy Cost Model of the Otis Gen2 Gearless Elevator System.

Objective:
To develop an energy cost model of the Otis Gen2 Gearless Elevator system that addresses design parameters incorporated in equivalent industry geared systems.
To identify critical "areas of innovation" and qualify how innovation in those areas affected the energy cost model.

Qualifications:
Open to matriculating college students of all levels.
Students majoring in Engineering and Economics are encouraged to apply.

Other information:
This is a minimum 8 week summer commitment between the last week of May and the first week of September.

Research facilities located in East Hartford, Connecticut. Please see link below for more information about East Hartford, Connecticut and surrounding cities.

Living arrangements and traveling expenses will be fully covered Sunday.

---

▼ EXIT PATHFINDER | Petr Sedy | SELECT PATH | CURRENT PATH NAME ▲ | BACK TO CURRICULUM | PAGE 1 OF 2 ▲ | MANAGE PATHS

FIGURE 11J

PATHFINDER
○ ○ ○ ● ● ENGINEERING

| EXPLORE | JOB MARKET | CURRICULUM DESIGNER |

Available Tutoring Resources for VA Tech's AOE 2104: Intro to Aero. Engineering Spring 2003

▶ ADD TO BASKET

Aerospace and Ocean engineering tutoring program
The Innovations for Aerospace and Ocean engineering tutoring program project, twice funded by the Center for Innovations in Learning, has built an interesting array of modules and tools designed to be used in a variety of aerospace and ocean engineering discipline settings to promote design skills right from the freshman class.

Contact: Leslie Graham  grahamlp@vt.edu

Register: www.aoe.vt.edu

Institutional resources
Student Success center
*Times and location of groups are provided at the time of the tutoring request and are not listed here.
Daily walk-in tutoring schedule available below:

Monday: 12:00pm-4:00pm 4:00pm-5:00pm
Tutor requests taken College Writing Center tutor available Tuesday: 10:00am-2:00pm 4:00pm-5:00pm 5:00pm-8:00pm
Tutor requests taken College Writing Center tutor available
Information tech. (computer) assistance Wednesday: 10:00am-1:00pm 4:00-5:00pm
Tutor requests taken College Writing Center tutor available Thursday: Noon-4:30pm 1:00pm-4:00pm 4:00pm-5:00pm 5:00pm-7:00pm
Tutor requests taken Information tech. (computer) assistance College Writing Center tutor available Information tech. (computer) assistance Friday: 2:00pm-4:00pm
College Writing Center tutor available

*YOU'RE NOW EXPLORING*
VA Tech's AOE 2104:
*Intro to Aero. Eng.*

▲ INSTITUTIONS, FUNDING & EMPLOYERS
▲ PURSUITS
▲ PROGRAMS & STANDARDS
▼ CURRICULA AND COURSES
  CURRICULA
  COURSE TYPES
  COURSES
  COURSE TUTORING

BACK TO CURRICULUM
PAGE 1 OF 2

◀ EXIT PATHFINDER                Petr Sedy   SELECT PATH   CURRENT PATH NAME ▲   MANAGE PATHS

FIGURE 11K

PathFinder

○○○●● Engineering | Explore | Job Market | Curriculum Designer

Virginia Polytechnic Institute
Aerospace Engineering

| | Grade | Credits |
|---|---|---|
| *Sem 1 – Fall 2002 – $10,557* | | 18 |
| General Chemistry I | A | 3 |
| General Chemistry Laboratory I | B | 4 |
| Introduction To Engineering I | B | 2 |
| Freshman English I | C | 3 |
| Calculus I | B | 3 |
| Algebra II / Trig. | A | 3 |
| *Sem 2 – Spring 2003 – $10,557* | | 18 |
| Elementary Linear Algebra | C | 3 |
| Introduction to Engineering II | B | 4 |
| Freshman English II | B | 4 |
| Calculus II | F | 2 |
| Vector Geometry | A | 3 |
| Foundations of Physics I | A | 2 |
| *Sem 3 – Fall 2003 – $10,557* [+][-] | | 18 |
| Calculus II | | 3 |
| General Chemistry II | | 4 |
| ▲ Computational Methods | | 4 |
| Intro to Aerospace Engineering | | 2 |
| Statics | | 3 |
| Multivariable Calculus | | 2 |

▶More

Articulate Course

| | Input Course | | Output Course |
|---|---|---|---|
| State | Virginia ▼ | State | Outline ▼ |
| Institution | Virginia Tech ▼ | Institution | University of Phoenix ▼ |
| Discipline | Aerospace Engineering ▼ | Discipline | Engineering ▼ |
| Program | Aerospace Engineering ▼ | Program | |
| Course Number | AOE 2074 | Course Number | |
| Course Name | Computational Methods | Course Name | Computational Methods |
| Course Description | Lorum ipsum dolor sit amet, con, minimum venami quis nostrud laboris nisi ut aliquip ex ea com color in reprehenderit in valuplate nonumy. Lorum ipsum dolor. | Course Description | Lorum ipsum dolor sit amet, con, minimum venami quis nostrud laboris nisi ut aliquip ex ea com color in reprehenderit in valuplate nonumy. Lorum ipsum dolor. |
| Course Type | Engineering Science | Course Type | Engineering Science |
| Course Credits | 3 | Course Credits | 3 |
| Other Info | | Other Info | |

[Add to Binder]  ▼ 6 of 10 ▲

[Apply to My Curriculum]  [Quit Articulation]

*GPA: 3.68   Cost: $46,536   Credits: 19/120*  ▶More

◀ EXIT PATHFINDER | Petr Sedy | SELECT PATH | Current Path Name ▲ | MANAGE PATHS

FIGURE 11L

PathFinder ooo●●Engineering | Explore | Job Market | Curriculum Designer

Virginia Polytechnic Institute
Aerospace Engineering

| | Grade | Credits |
|---|---|---|
| *Sem 1 – Fall 2002 - $10,557* | | 18 |
| General Chemistry I | A | 3 |
| General Chemistry Laboratory I | B | 4 |
| Introduction To Engineering I | B | 4 |
| Freshman English I | C | 2 |
| Calculus I | B | 3 |
| Algebra II / Trig. | A | 3 |
| *Sem 2 – Spring 2003 - $10,557* | | 18 |
| Elementary Linear Algebra | C | 3 |
| Introduction to Engineering II | B | 4 |
| Freshman English II | B | 4 |
| Calculus II | F | 2 |
| Vector Geometry | A | 3 |
| Foundations of Physics I | A | 2 |
| *Sem 3 – Fall 2003 - $10,557* [+][-] | | |
| Calculus II | | 3 |
| General Chemistry II | | 4 |
| Computational Methods | | 4 |
| Intro to Aerospace Engineering | | 2 |
| ▶ Statics | | 3 |
| Multivariable Calculus | | 2 |

*GPA: 3.68  Cost: $46,536  Credits: 19/120*  (▶More)

---

Statics

Course Co- and Pre-Requisites:
Prerequisites – EF 1016 | Met
MATH 1114 | UNMET  Approved to Waive Prerequisite? [Yes] [No]
Corequisites – MATH 2224 | Met

Course Description:
An overview of aerospace engineering from a design perspective; introductory aerodynamics, lift, drag, and the standard atmosphere; aircraft performance, stability, and control; propulsion; structures; rocket and spacecraft trajectories and orbits.

Course Objectives:
Introduce concepts of static mechanics as it relates to introductory aerospace engineering. Teach how to evaluate the moments of a force and the resultant of a force system; Analyze general equilibrium problems and teach freebody diagrams and the fundamental applications of equilibrium equations; Address the structural applications of concepts listed above.

Course Expected Outcomes:
Define the concepts listed above. Resolve and add vectors. Multiply vectors using both dot and cross products. Find the resultant of any force system. Isolate any body and draw the freebody diagram. Solve for unknown forces and moments on a body in equilibrium. Determine internal forces in trusses, frames, and machines. Compute the centroid or the center of mass using integration and composite parts. Construct shear and bending moment diagrams for beams. Work static problem involving friction. Calculate area moments of inertia by integration. Calculate area moments of inertia using the parallel-axis theorem.

▶ Course Syllabus
▶ Course Coverage Schedule
▶ Course Resources
▶ History of Student Performance
▶ Archive of Student Reviews
▶ Other Pertinent Information

[Placement Testing] [Intelligent Tutor]

↩ Explore Related...  [Select ▼]  [Articulate]

---

[◀ EXIT PATHFINDER]   Petr Sedy   SELECT PATH | Current Path Name ◀ ▼ | MANAGE PATHS

FIGURE 11P

PATHFINDER ooo●●ENGINEERING

| EXPLORE | JOB MARKET | CURRICULUM DESIGNER |

*YOU'RE NOW EXPLORING:*
ACADEMIC PERFORMANCE-BASED MERIT GRADES

- INSTITUTIONS, FUNDING & EMPLOYERS
- PURSUITS
- PROGRAMS & STANDARDS
- CURRICULA AND COURSES
  - CURRICULA
  - COURSE TYPES
  - COURSES
  - COURSE TUTORING

FINANCIAL RESOURCES: ACADEMIC PERFORMANCE-BASED MERIT GRANTS

▶ ADD TO BASKET

IN-INSTITUTION

UPPERCLASS SCHOLARSHIPS

Our College of Engineering has corporate and private support for upperclass academic scholarships. These competitive upperclass scholarships are awarded on the basis of performance at Virginia Tech. Each January, scholarship information is announced on the engineering opportunities listserv which is used to communicate with enrolled Virginia Tech engineering students. Rising sophomores with a cumulative 3.4 GPA or above and rising juniors and seniors with a cumulative 3.0 GPA at the end of fall semester are eligible to apply. The scholarship application form is available online in late January. Application deadline is March 1. Approximately 450 upper class engineering students receive academic scholarships each year. Scholarships range from $500 to full tuition/fees and room/board. The average award is $1,000. Students may receive both financial aid awards based on income and academic awards based on achievements.

Eleanor Davenport Leadership Scholarship

Davenport Leadership Scholars are selected on the basis of superior intellectual promise and academic performance, leadership ability, personal character, and community service. Eligible applicants must have an exemplary GPA, SAT scores of 1500 or higher, and meet leadership and service requirements.

Scholars should have submitted their application for admission to the College of Engineering at Virginia Tech by January 15, 2003 and plan to pursue full-time study (12 credits or more) toward a degree in engineering. Recipients will receive an award the equivalent of in-state tuition and fees for a total of four years. This scholarship may be renewed each semester for a total of eight semesters of academic study, or until receipt of the B.S. degree in engineering, whichever occurs first. Scholars are expected to maintain full-time student status enrolled in an engineering curriculum and an overall GPA of 3.5 or better in order to retain the award. Four scholarships will be granted each year to applicants who demonstrate the necessary requirements.

Contact Carlene Arthur at carthur@vt.edu if you qualify to request an application. Applicants for this scholarship will be accepted through February 15, 2003. Personal interviews with candidates may be conducted as part of the selected criteria. Recipients of the award will be notified no later than March 15, 2003.

BACK TO CURRICULUM
PAGE 1 OF 2

| ▼ EXIT PATHFINDER | Petr Sedy | SELECT PATH | CURRENT PATH NAME ▲ | MANAGE PATHS |

FIGURE 11R

PathFinder
○○○●●Engineering  Explore  Job Market  Curriculum Designer

Virginia Polytechnic Institute
*Aerospace Engineering*

| | Grade | Credits |
|---|---|---|
| Sem 2 – Spring 2003 - $10,557 | | 15 |
| Elementary Linear Algebra | C | 3 |
| Introduction to Engineering II | B | 3 |
| Freshman English II | B | 3 |
| Calculus II | F | 3 |
| Vector Geometry | A | 3 |
| Foundations of Physics I | A | 3 |
| Sem 3 – Fall 2003 - $10,557 | | 15 |
| Calculus II | A | 3 |
| General Chemistry II | B | 3 |
| Computational Methods | A | 3 |
| Multivariable Calculus | B | 3 |
| Foundations of Physics II | B | 3 |
| Sem 4 – Spring 2003 - $8,797 | | 18 |
| Intro to Aerospace Engineering | A | 3 |
| Statics | B | 3 |
| Special Study | B | 3 |
| ▶ Materials in Aero. And Oceanic Sys. | D | 3 |
| Dynamics | C | 3 |
| Intro Diff Equations | B | 3 |

*GPA: 3.68  Cost: $46,536  Credits: 19/120*  ▶More

Materials in Aero. and Oceanic Sys.

X Options for Reporting Failed Course (Student Must Choose One)

| SELECT | Option 1: Repeat same course in the immediate following semester |
| SELECT | Option 2: Repeat course at a later semester |
| SELECT | Option 3: Substitute Course for an equivalent course to be taken now or later |

Course Objectives:
To introduce the Aerospace and/or ocean engineering student to the fundamental properties of materials typically required for structural design. Presentation and contrasting the performance capabilities of metals, polymers, composites and ceramics. Provide an understanding of how processing affects material properties and performance. Providing foundation of material manufacturing.

Course Expected Outcomes:
Identify the meaning and significance of material properties which are used to describe mechanical performance. Perform fundamental calculations and analyses necessary to describe and predict mechanical behavior of materials. Identify and recommend processing methods by which specific material structures can be produced and their properties developed or enhanced. Identify and select appropriate materials for aerospace applications based upon the knowledge of performance needs and design constraints, material properties, processing opportunities and limitations.

Course Co- and Pre-Requisites
Prerequisites – AOE 2074

▶ Course Syllabus
▶ Course Coverage Schedule
▶ Academic Performance Details
▶ History of Student Performance
▶ Archive of Student Reviews
▶ Other Pertinent Information

| Placement Testing | Intelligent Tutor |

↩ Explore Related... [ Select ▼ ]

◀ EXIT PATHFINDER    Petr Sedy   SELECT PATH [ Current Path Name ▲▼ ]  MANAGE PATHS  [ Articulate ]

FIGURE 121

PATHEVO
○○○●●ENGINEERING

EXPLORE | JOB MARKET | CURRICULUM DESIGNER

FILTERS | HISTORY | BINDER | SEARCH

▶ INSTITUTIONS, FUNDING AND EMPLOYERS
  - AGENCIES AND COMPANIES
  - INDUSTRIES
  - ENGINEERING DISCIPLINES
  - COLLEGES
  - FINANCIAL RESOURCES
  - GEOGRAPHICAL LOCATIONS
▶ PURSUITS
▶ PROGRAMS AND STANDARDS
▶ CURRICULA AND COURSES

▫ IBM

| ADD TO BINDER | DECISION MAKER |
|---|---|

IBM

About IBM

At IBM, we strive to lead in the invention, development and manufacture of the industry's most advanced information technologies, including computer systems, software, storage systems and microelectronics.

We translate these advanced technologies into value for our customers through our professional solutions, services and consulting businesses worldwide.

History of IBM

The character of a company - the stamp it puts on its products, services and the marketplace - is shaped and defined over time. It evolves. It deepens. It is expressed in an ever-changing corporate culture, in transformational strategies, and in new and compelling offerings for customers. IBM's character has been formed over nearly 100 years of doing business in the field of information handling. Nearly all of the company's products were designed and developed to record, process, communicate, store and retrieve information - from its first scales, tabulators and clocks to today's most powerful computers and vast global networks.

IBM helped pioneer information technology over the years, and it stands today at the forefront of a worldwide industry that is revolutionizing the way in which enterprises, organizations and people operate and thrive.

The pace of change in that industry, of course, is

PLEASE SELECT MEDIA TO VIEW
- IMAGE IBM
- IMAGE IBM NOTEBOOK 1
- IMAGE IBM NOTEBOOK 2
- IMAGE IBM NOTEBOOK 3
- VIDEO IBM
- VIDEO IBM DATA STORAGE to the 21st or pinpoint – year-by-year or decade-by-decade - the key events that have led to the IBM of today. We hope that you enjoy this unique look back at the highly textured history of the International Business Machines Corporation.

About Community Relations
New strategic directions

Over the last ten years, IBM has been one of the largest corporate contributors of cash, equipment, and people to nonprofit organizations and educational institutions across the U.S. and around the world. In all our efforts, we help people use information technology to improve quality of life for themselves and others.

IBM's contributions target a few key areas and leverage our expertise in technology. In our efforts, we strive to underscore the role of technology as a tool to address societal issues; demonstrate IBM's reputation as a solutions provider; and focus IBM's philanthropic programs to enhance relationships with customers and employees. This policy of strategic investments has benefited communities by bringing IBM experts from all over the world to address their concerns, and has engaged our employees more fully in the important mission of corporate citizenship.

We believe the same information technology innovations

---

▼ EXIT PATHFINDER | ■ Show Hidden Items | version 32d | Petr Sedy | SELECT PATH | CURRENT PATH NAME ▲ | MANAGE PATHS

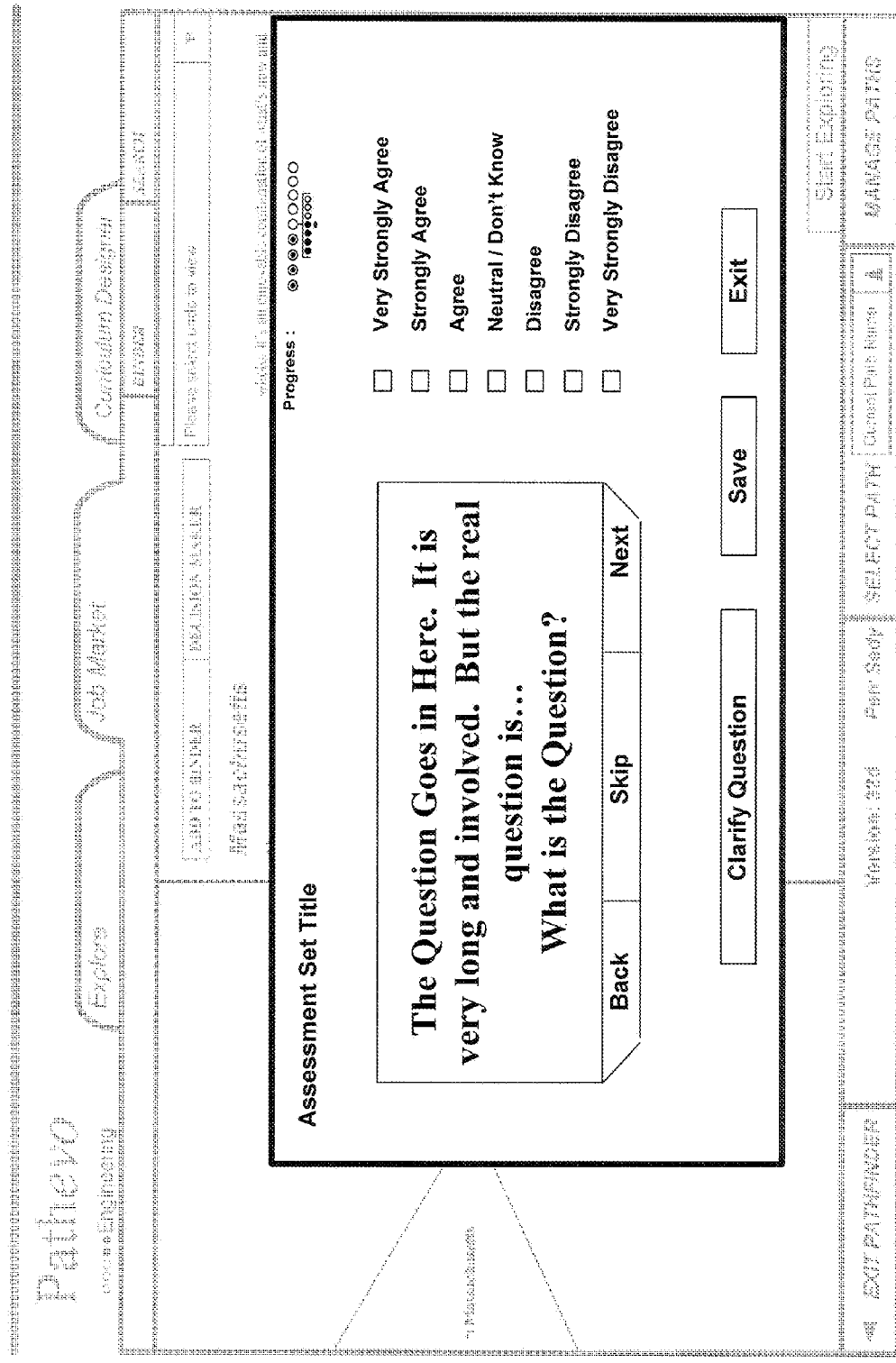

SYSTEMS AND METHODS FOR PROVIDING ADAPTIVE TOOLS FOR ENABLING COLLABORATIVE AND INTEGRATED DECISION-MAKING

This application claims priority from U.S. Provisional Application Ser. No. 60/408,875 filed Sep. 9, 2002, and U.S. Provisional Application Ser. No. 60/432,661, filed Dec. 12, 2002. The entirety of these provisional applications are incorporated herein by reference.

BACKGROUND OF THE INVENTION

Field of the Invention

The present invention relates generally to systems and methods for presenting data, and specifically to systems and methods for presenting filtered data.

BRIEF DESCRIPTION OF THE FIGURES

FIGS. 2A-2H illustrate logic diagrams indicating how levels and sublevels are filtered, according to one embodiment of the present invention.

FIG. 2I is a flowchart diagram illustrating an example of how levels and sublevels are filtered, according to one embodiment of the present invention.

Additional features and advantages of the present invention will become more apparent from the detailed description set forth below when taken in conjunction with the Figures in which like reference numbers indicate identical or functionally similar elements.

DESCRIPTION OF THE INVENTION

Figure 1:
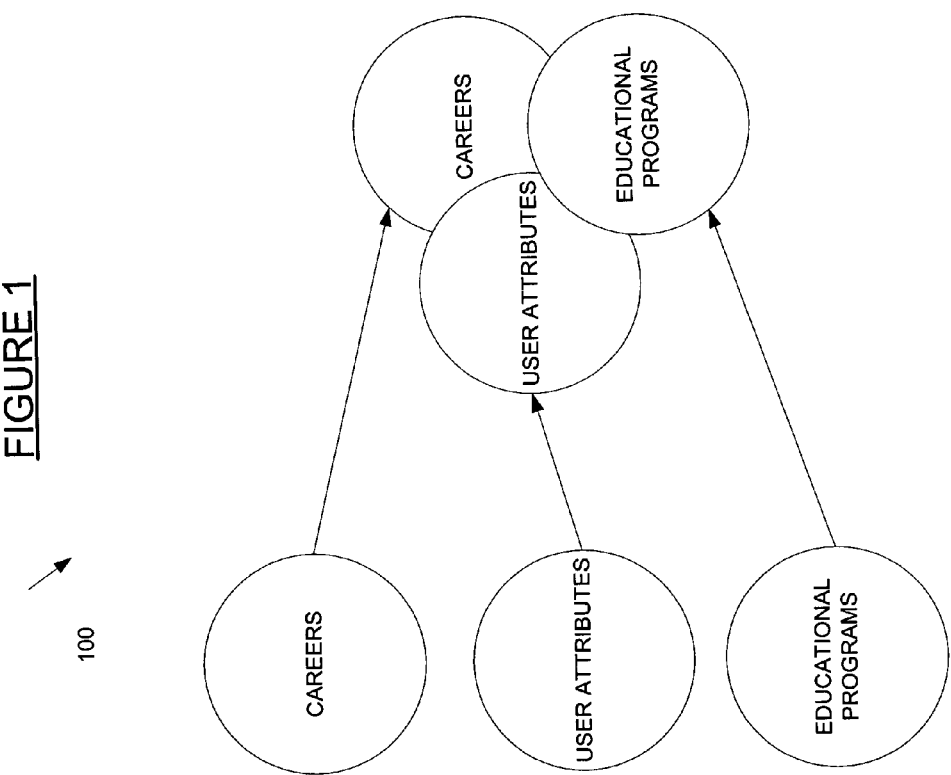
FIG. 1 illustrates a dynamic intersection of career, user attributes, and educational programs, according to one embodiment of the present invention.

While pursuing education and career objectives and goals, prospective and continuing students, face many questions. Correct and timely answers to these questions are very important, particularly early in the life of a student, as they could make the emotional and financial difference between staying on-track towards personal goals, or being off-track without knowing it.

The present invention comprises a system and method for presenting data relating to at least one individualized instructional program, comprising: receiving filtering criteria, accessing at least one repository of data relating to the individualized instructional program, and identifying data responsive to the filtering criteria.

The present invention develops and presents an optimal individual-matched and integrated education and career plan. The present invention provides decision support techniques for obtaining integrated education-career planning and implementation solutions, supported by a vast education and career knowledge base. In one embodiment, the present invention is used for middle school through college education levels. In other embodiments, the present invention is used for other levels of education, including pre-school, elementary, and post graduate education.

The present invention allows students to acquire quick, accurate, complete, and comprehensive answers to questions related to career possibilities and potential educational paths to these careers.

The present invention also allows guidance counselors and advisors to quickly and efficiently create a rigorous education and career plan optimized for each individual student. The present invention integrates potential careers, potential education programs, and student attributes in an easy-to-use package that each student can use to do most of the work, optionally with some assistance or review by a parent or counselor.

The present invention can be used in any educational field, including, for example: engineering, computers and information technology, health, physical, biological and life sciences, business management, education, and social and behavioral science.

While the present invention is described in the context of education, those experienced in the art will see that use outside the education field is possible. Potential other fields include, for example: use by local governments and states to rapidly analyze the general career direction of students for policymaking projection of state workforce levels; use in preventive medicine and health management, to produce a treatment explorer to explore and investigate optimal individualized options (e.g., on the basis of personal traits and family history) in diagnosis and treatment for diseases, even before the onset of disease; and use in designing individualized financial portfolios for exploring and investigating optimal individualized options in financial products. In these cases, the education-related databases described below are replaced by other databases relevant to the field (e.g., a disease diagnostic and treatment database).

Intersection of Career, User Attributes, and Educational Programs

FIG. 1 illustrates a dynamic intersection of career, user attributes, and educational programs, according to one embodiment of the present invention.

FIG. 2A illustrates four levels of support functions: primary (e.g., Institutions, Funding & Employers) 205, secondary (e.g., Pursuits) 210, tertiary (e.g., Programs & Standards) 215, and quaternary (e.g., Curricula & Courses) 220, according to one embodiment of the present invention. A user may use the present invention at any level, depending on the need to seek either general decision support, or increasingly specific decision support. Users also have flexibility to limit searches to an education universe only, a career universe only, or an integrated education-career universe, with or without personal attribute integration. All levels are structurally interlinked for full, integrated functionality.

The primary level 205 provides integrated education-career exploration and investigation. This exploration and investigation is matched to a user, in an alternate embodiment. For example, a user can enter a request for information on colleges that provide special academic programs for certified musicians to be trained as computer programmers, preferably located in the rural United States, close to branches of major IT companies, with an admission policy that accommodates someone with a high school GPA of 2.5, and an SAT score of 1000.

At the secondary 210 and tertiary 215 levels, the present invention supports integrated education-career exploration and investigation that is more detailed and specific than the broad picture provided at the primary level. All levels utilize user attributes as a dependable delimiter of options, to obtain reliable, individualized solutions.

The quaternary level 220 provides personalized educational scenarios in detail, using extremely detailed information available from the tertiary level. For example, courses, course descriptions, course equivalencies, curricula requirements, and formal education standards are used.

Figure 2B:
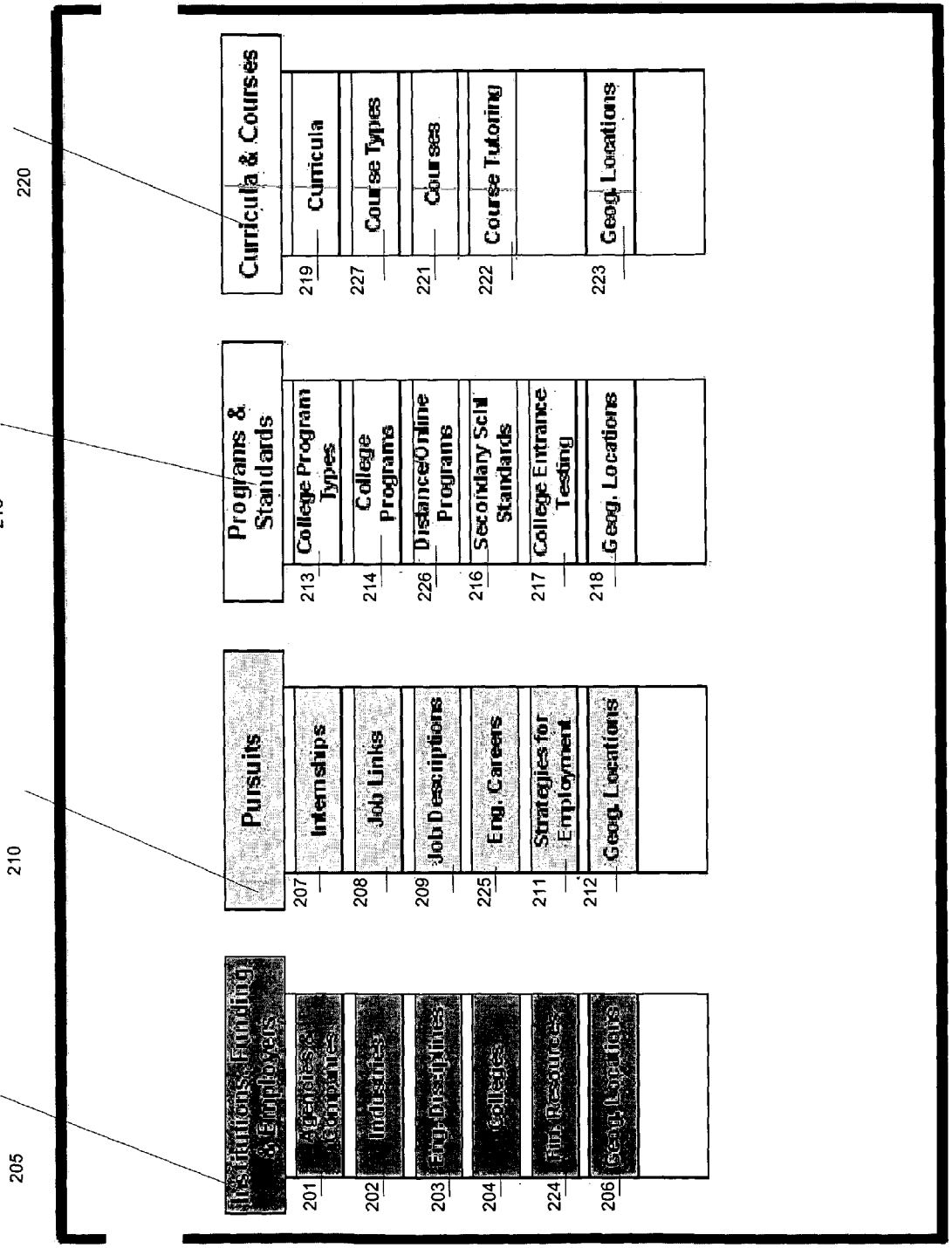
Figure 2C:
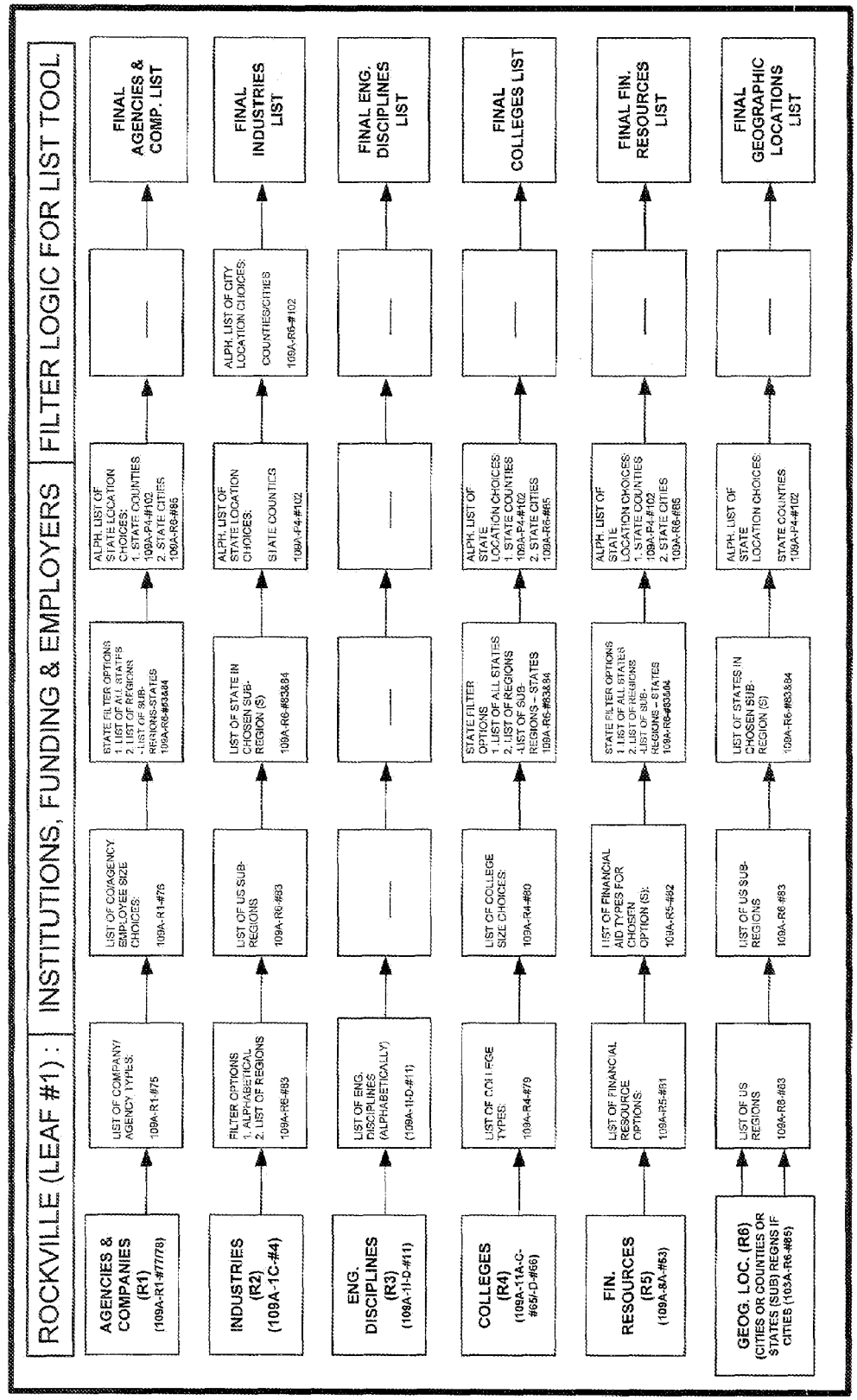
Figure 2D:
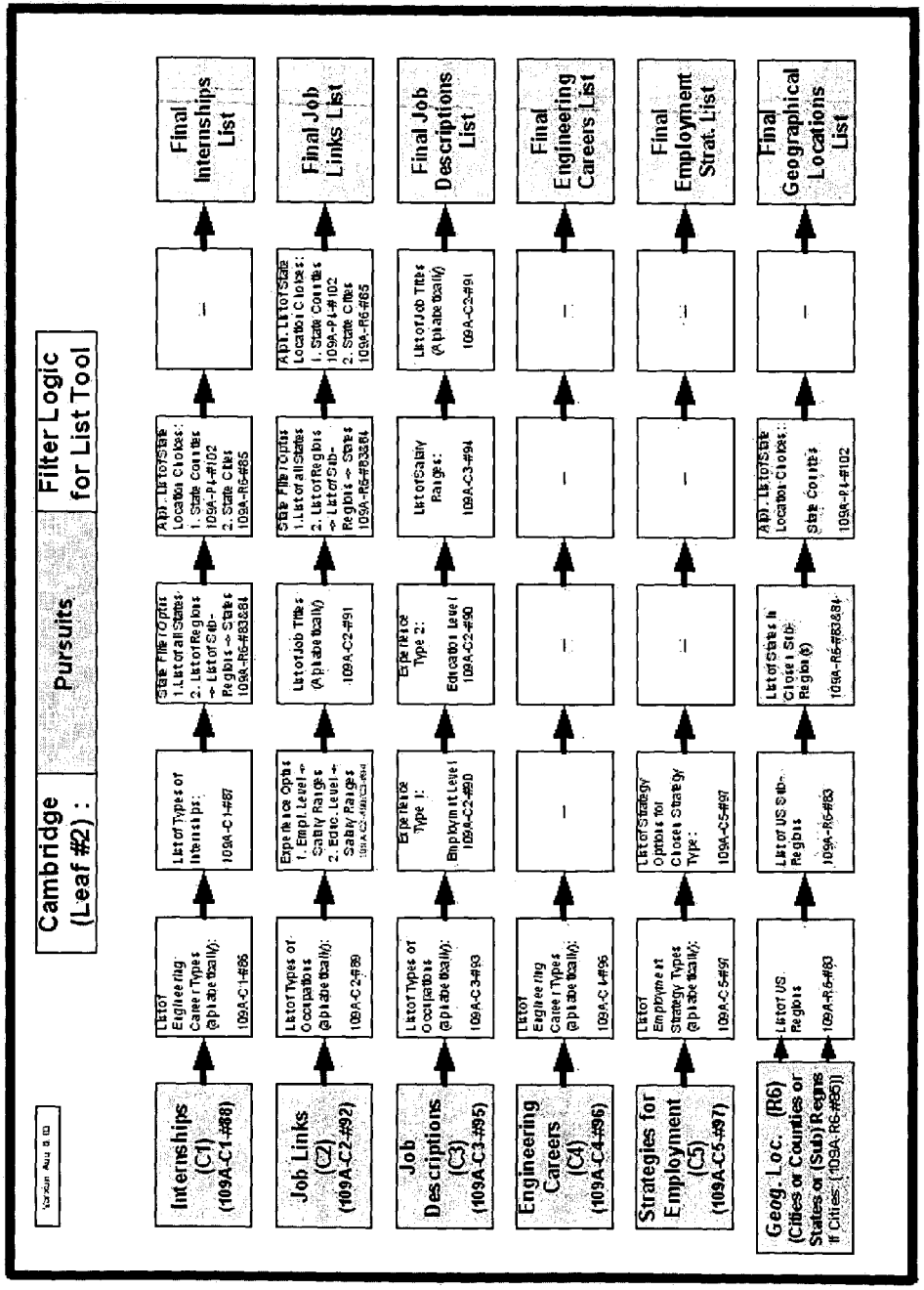
Figure 2E:
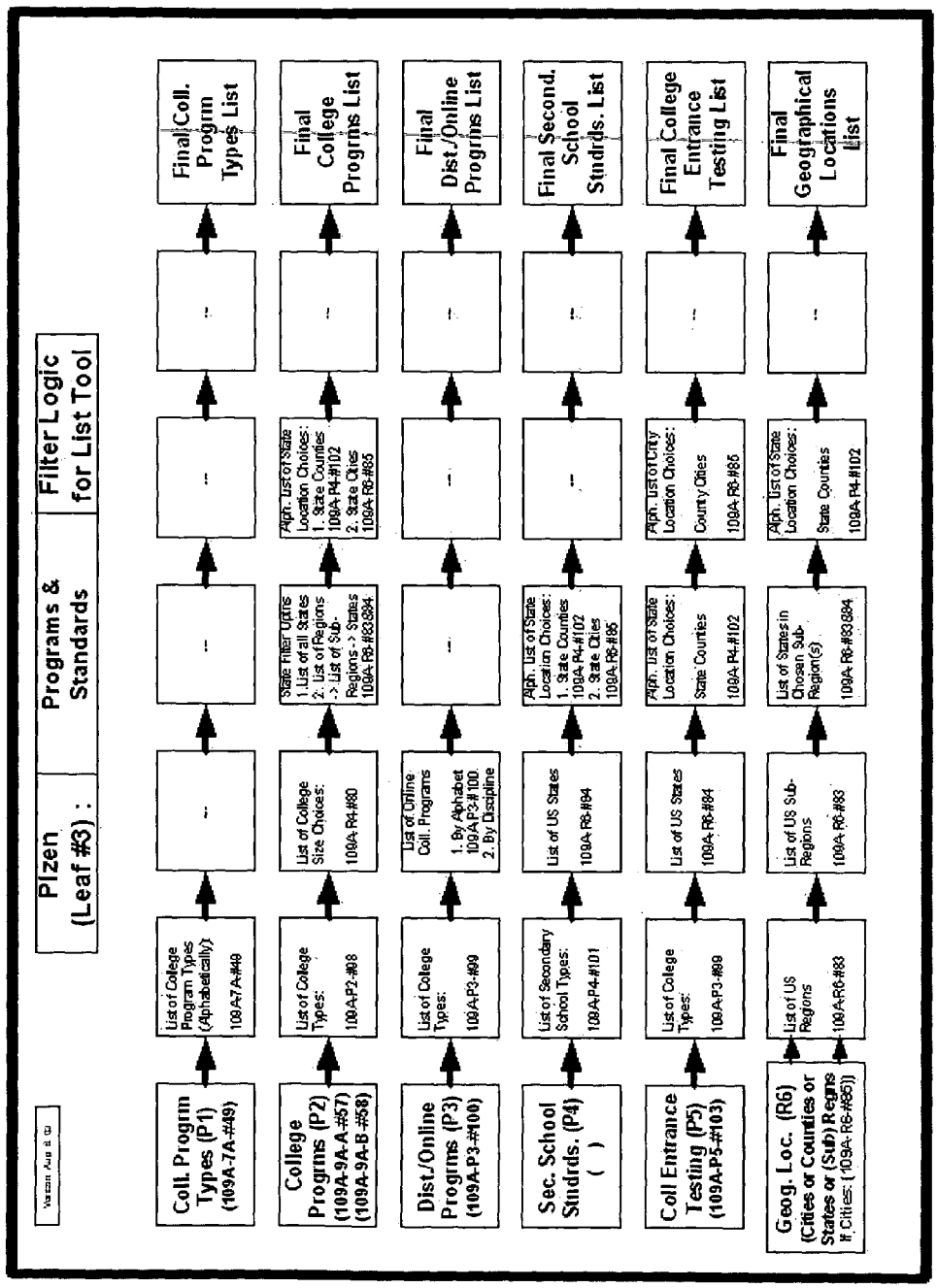
Figure 2F:
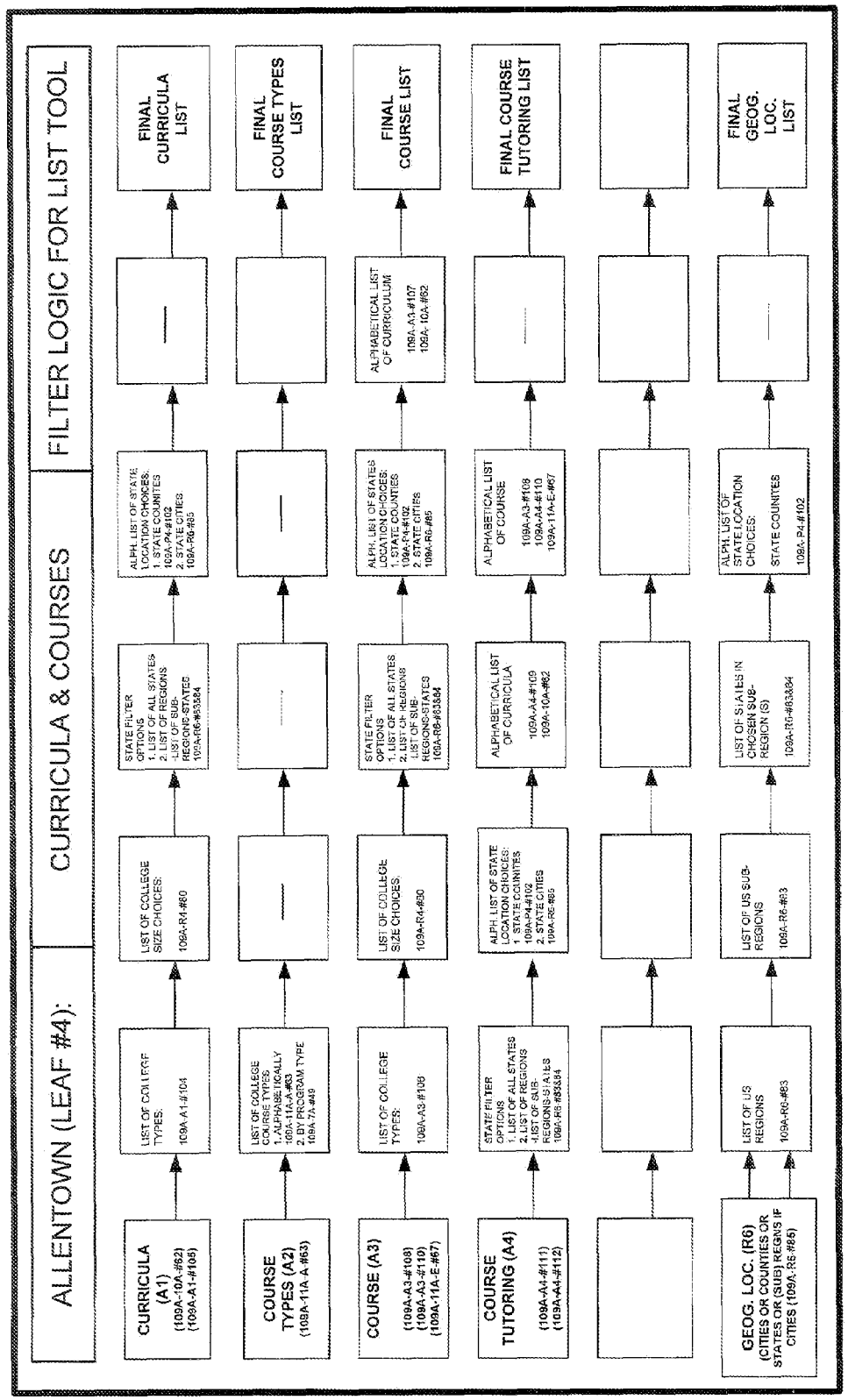

FIG. 2B illustrates the primary, secondary, tertiary, and quaternary levels and sublevels (or modules), according to one embodiment of the present invention. Primary level 205 is Institutions, Funding & Employers. The sublevels are, for example: Agencies & Companies 201, Industries 202, Engineering Disciplines 203, Colleges 204, Financial Resources 224, and Geographical Locations 206.

Secondary level 210 is Pursuits. The sublevels are, for example: Internships 207, Job Links 208, Job Descriptions 209, Engineering Careers 225, Strategies for Employment 211, and Geographic Locations 212.

Tertiary level 215 is Programs & Standards. The sublevels are, for example: College Program Types 213, College Programs 214, Distance/Online Programs 226, Secondary School Standards 216, College Entrance Testing 217, and Geographical Locations 218.

Quaternary level 220 is Curricula & Courses. The sublevels are, for example: Curricula 219, Course Types 227, Course 221, Course Tutoring 222, and Geographic Locations 223.

The base data filtering system is a two-tier filter system: (1) intra-module filtering and (2) inter-module filtering. FIGS. 2C-2F illustrate logic diagrams indicating how the modules may be undergo intra-filtering, according to one embodiment of the present invention. Thus, for example, large datasets from module C3 (Job Descriptions) may be filtered (i.e., delimited for the user) within that module by options in Occupation, Employment Level, Education Level, Salary Range and Job Title.

Figure 2G:
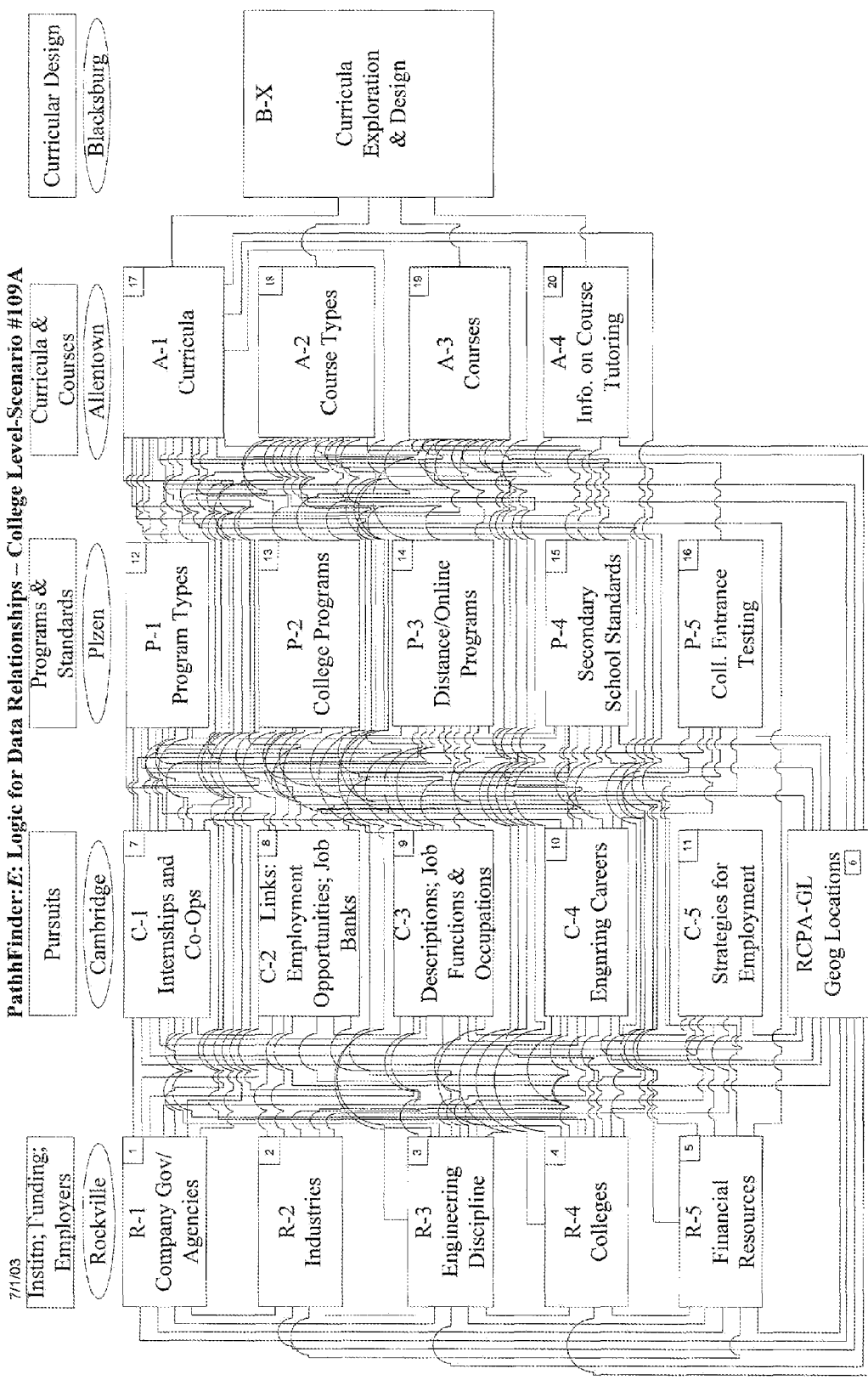
Figure 21:
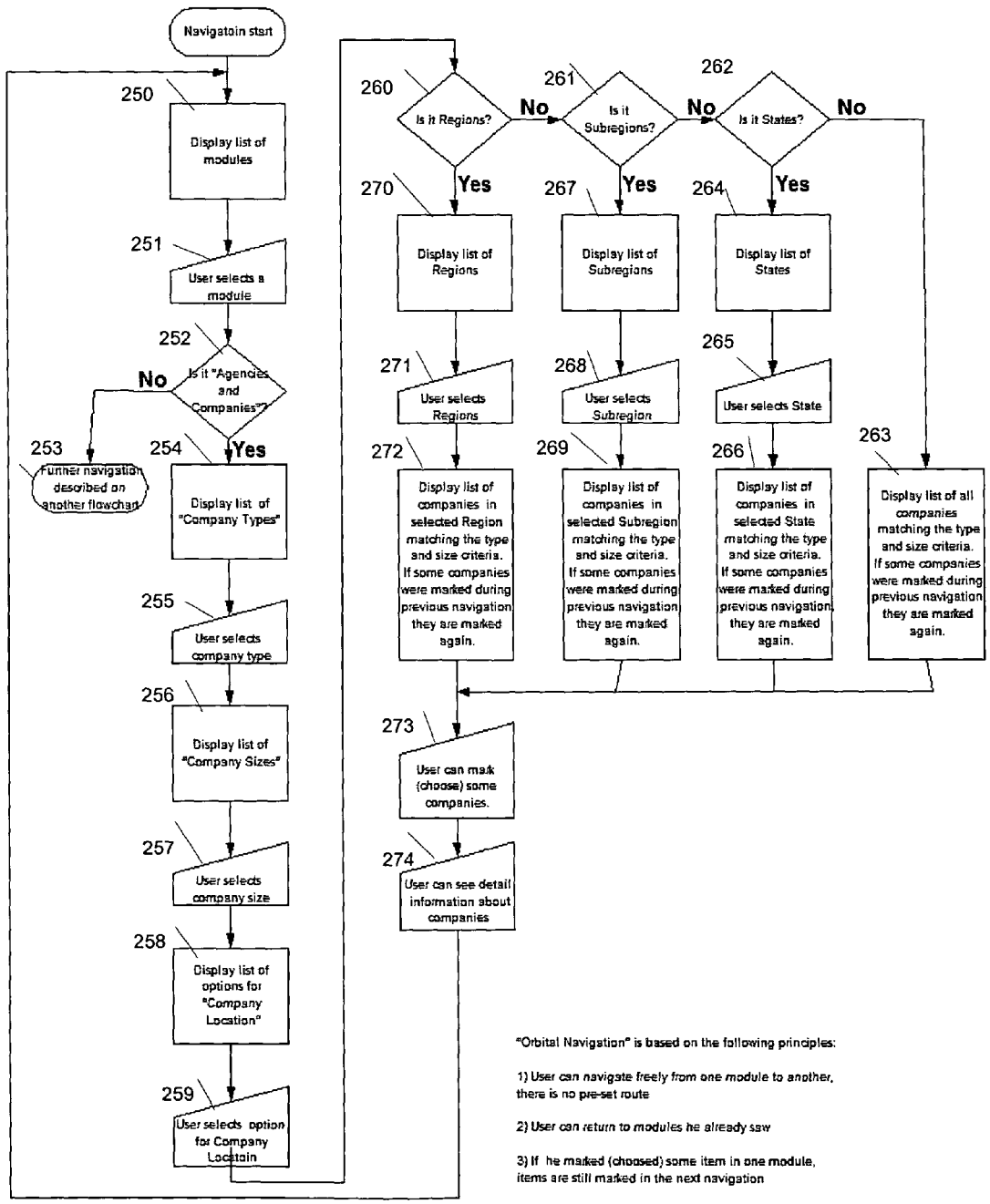

Furthermore, FIGS. 2G and 2H illustrates a data navigation logic diagram and chart indicating how the levels may in turn undergo inter-level filtering, according to one embodiment of the present invention. Thus, for example, information from module R1 (Agencies & Companies) may be filtered (e.g., delimited with) information from modules R2 (Industries), R3 (Engineering Disciples), R5 (Financial Resources), RCPA-GL (Geographical Locations), C1 (Internships), C2 (Job Links), C3 (Job Descriptions), C4 (Engineering Careers), P1 (College Program Types), A1 (Curricula), and A2 (Course Types).

FIG. 2I is a flowchart diagram illustrating how levels and sublevels are filtered, according to one embodiment of the present invention. The example of filtering in sublevel R1 (Agencies & Companies) is shown. In step 250, a list of modules is displayed. In step 251, a user selects a module. In step 252, it is determined whether the module is "Agencies & Companies". If no, in step 253, further navigation takes place. If yes, in step 254, a list of company types is displayed. In step 255 the user selects a company type. In step 256, a list of company sizes is displayed. In step 257, the user selects a company size. In step 258, a list of options for a company location is displayed. In step 259, the user selects an option for the company location. In step 260, it is determined if the company location option selected is regions. If no, in step 261, it is determined if the company location option selected is subregions. If no, in step 252, it is determined if the company location option selected is states. If no, in step 263, the list of all companies matching the type and size criteria is displayed. If some companies were marked during previous navigation, they are marked again.

In step 264, if the company location option is states, the list of states is displayed. In step 265, the user selects at least one state. In step 266, a list of companies in the selected state(s) matching the type and size criteria is displayed. If some companies were marked during previous navigation, they are marked again.

In step 267, if the company location option is subregions, a list of subregions is displayed. In step 268, the user selects at least one subregion. In step 269, a list of companies in the selected subregion(s) matching the type and size criteria is displayed. If some companies were marked during previous navigation, they are marked again.

In step 270, if the company location option is regions, a list of regions is displayed. In step 271, the user selects at least one region. In step 272, a list of companies in the selected region(s) matching the type and size criteria is displayed. If some companies were marked during previous navigation, they are marked again.

In step 273, the user can mark (choose) at least one company. In step 274, the user can view detailed information about the marked companies. The process then returns to step 250 and repeats.

Application Overview

Figure 3A:
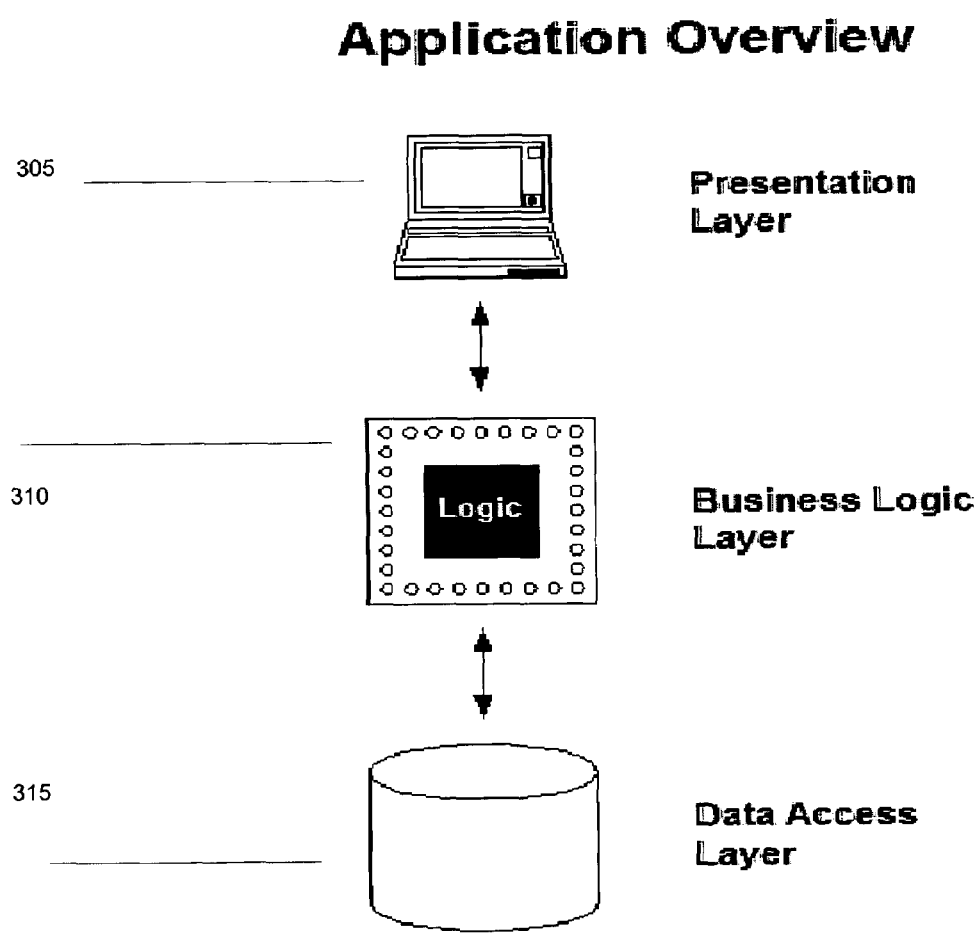
FIGS. 3A and 3B illustrate application overview 300, according to one embodiment of the present invention.
Figure 3B:
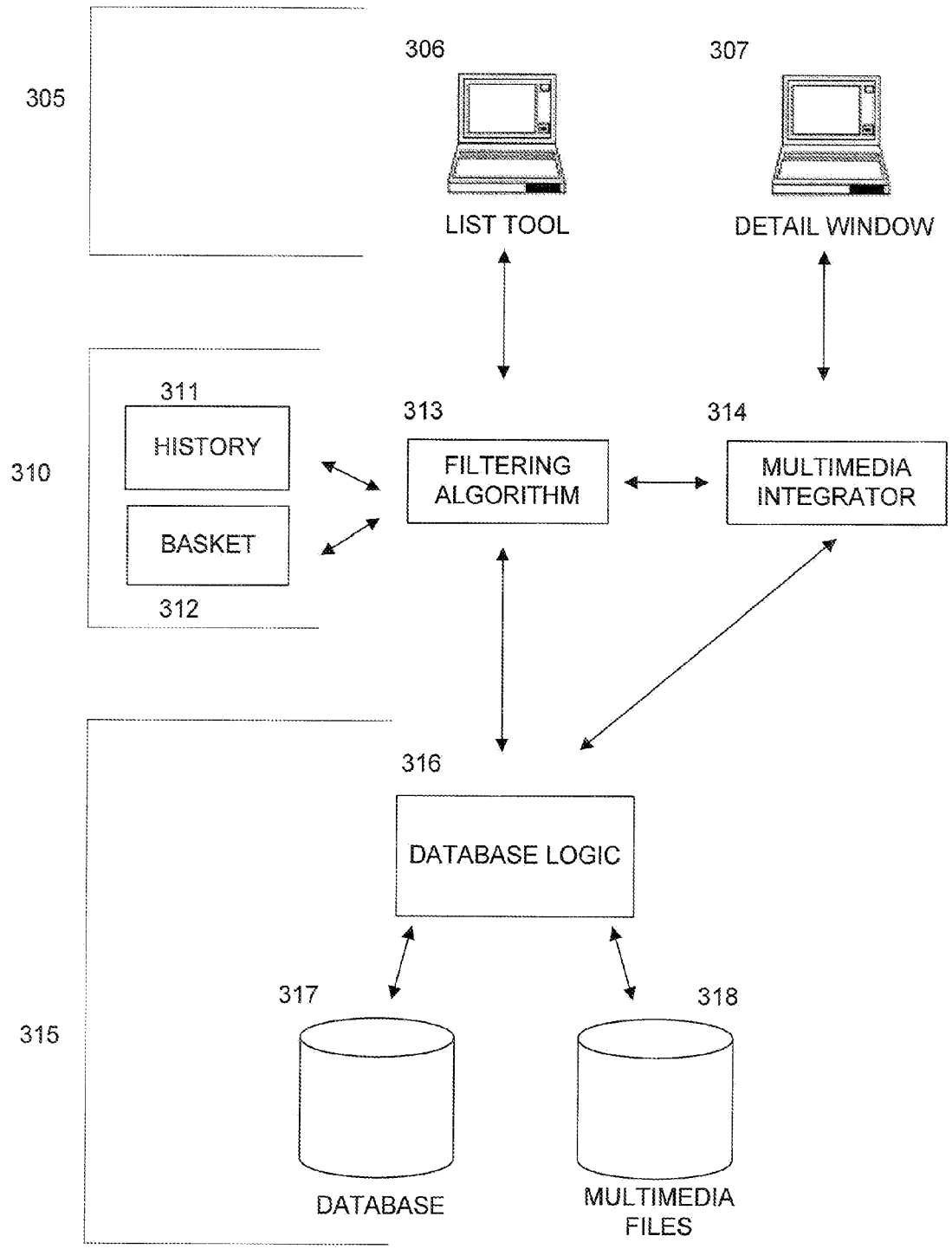

FIGS. 3A and 3B illustrate application overview 300, according to one embodiment of the present invention. The application overview 300 comprises a presentation layer 305, a business logic layer 310, and a data access layer 315.

Presentation Layer. The presentation layer 305 comprises a list tool 306 and a detail window 307.

List Tool. The list tool 306 is used for navigational purposes. The list tool 306 displays a list of items (e.g., representing modules, tables, limiters, ranges, and items from the database). Graphical representation of the items is different for different types of items. The item can contain, for example, a checkbox, various forms of highlighting, and different appended icons. The list tool 306 uses orbital navigation, which is an unrestricted always all-forward navigation. Back navigation (e.g., undo level) is also supported in one embodiment. The list tool 306 allows long lists to be displayed in a way that allows intra-module filtering and inter-module filtering options. The list tool 306 also allows orbital navigation.

Detail Window. The detail window 307 displays detailed information about the items selected in the list tool 306. The detail window 307 also enables comparison of the items. The detail window 307 displays textual information together with all relevant multimedia information (e.g., audio, pictures, video files). The detail window 307 effectively uses the available display area by dynamically changing the sizes of the displayed objects. The detail window 307 displays all relevant information in one place. The detail window 307 also performs an intelligent comparison of particular items together with a collateral view. The detail window 307 also dynamically changes the viewing area so that an item of interest occupies more area than other items.

Business Logic Layer. The business logic layer 310 comprises a history 311, a basket 312, a filtering algorithm 313, and a multimedia integrator 314.

Filtering Algorithm. The filtering algorithm 313 limits the number of possibilities according to previously selected data. The filtering algorithm 313 works with data in the database and with lists of previous selections, and uses the database model to dynamically and effectively create and optimize queries. The filtering algorithm 313 allows queries to be constructed "on the fly" and uses data models to create queries.

History. The history 311 remembers visited items (e.g., ranges, limiters, modules, module items) and enables easy navigation to the visited items. The history 311 stores lists of previously displayed items, and if the user clicks on an item in the list, the history 311 enables displaying of that item.

Basket. The basket 312 stores items selected by user into a formatted repository. The basket 312 stores items checked by a user, keeps a used list generation (i.e., items that were checked previously must be checked when the list is displayed again). The basket 312 also preserves stored items for (re)display, printing or sharing. In addition, stored items can be sent to another user (e.g., a counselor) for review.

Multimedia Integrator. The multimedia integrator 314 gathers all relevant data from the disparate databases into one coherent whole, personalized for the user, and advises a user how to continue navigating the present invention. The multimedia integrator 314 uses multimedia files together with database information and filtering processes to display all information. In addition, all information is displayed intelligently at one place. It also uses the history of visited modules and items to recommend for the next navigation. The multimedia integrator also makes intelligent recommendations for further path application.

Data Access Layer (Data Storage). The data access layer 315 comprises database logic 316, database 317, and multimedia files 318.

Database Logic. The database logic 316 is a communication level between the application logic and the data. It creates responses to data queries, provides simple manipulations with queries using the database model (no history or other session data is used during these manipulations), and sends queries to the database and provides simple manipulations with the results.

Database. The database 317 stores all textual data and all lists used. It also stores all relations between the data. The database can also retrieve requested data quickly and efficiently.

Multimedia files. The multimedia files 318 are displayed in the application.

Filtering Method Overview

Figure 4:
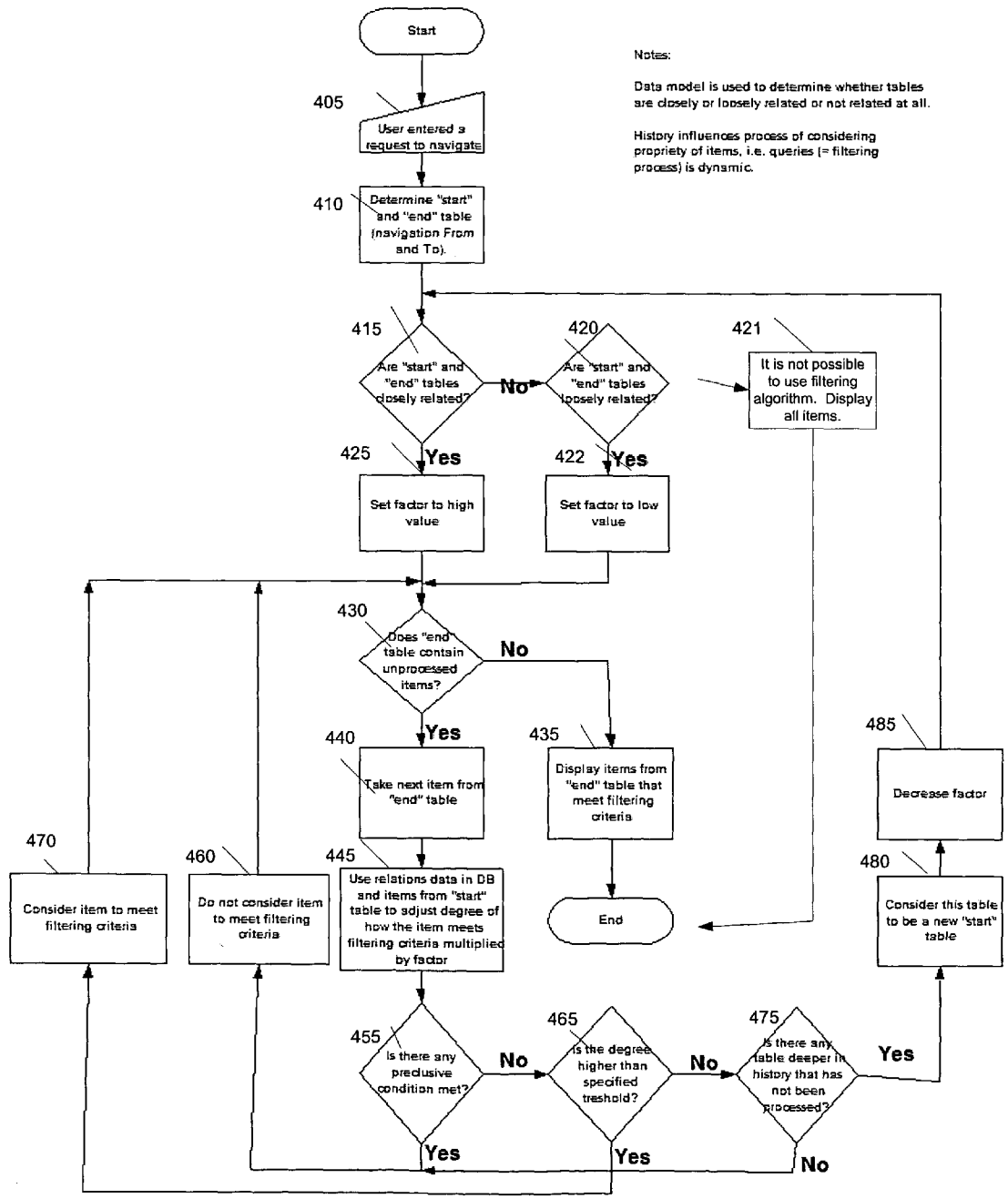
FIG. 4 illustrates a method of filtering data 400, according to one embodiment of the present invention.

FIG. 4 illustrates a method of filtering data 400, according to one embodiment of the present invention. In step 405, the user enters a filtering request (e.g., a request to navigate the data—translated as a request to use the data as a delimiter, or as a constraint object). In step 410, a start table and an end table in the database are determined. The start table is determined by the module the user was in when the user started navigating, and the end table is determined by the requested module (where the user wants to end navigating). In step 415, it is determined if the start table and the end table are closely related. The start table and end table are closely related if there exists a direct relationship in the data model. If the start table and the end table are not closely related, in step 420, it is determined if the start and end tables are loosely related. The start table and end table are loosely related if there is no direct relationship in the data model, but there is an indirect relationship (i.e., there is a route in the data model from one table to another table via an interim table or tables). In one embodiment, the maximum number of interim tables is set to two, or another function exists to related items from one table to another (e.g., the function is strictly case oriented, or specific for certain tables and built using external knowledge). If the start table and the end table are not loosely related, in step 421, the filtering algorithm cannot be used because there is no utilizable information. In this case, all items from the end table are displayed and the process ends. If the start table and the end tables are loosely related, in step 422, a factor is set to "low value". The process then moves to step 430.

If the start and end tables are closely related, in step 425, the factor is set to "high value". The process then moves to step 430, where it is determined if the end table contains any unprocessed items. This algorithm processes all items, one after another, in a sequential manner (i.e., one item at a time, one after another). If the end table does not contain any unprocessed items, data from the end table that meet the filtering criteria are displayed in step 435.

If the end table does contain any unprocessed items, in step 440, the next item is taken from the end table. In step 445, the relations data and items from the start table are used to adjust the degree of how the item meets the filtering criteria, multiplied by a factor. In this process, the overall degree of item compatibility is calculated. The degree is defined as a sum of particular compatibilities with particular tables (e.g., filtering criteria). Each particular compatibility is computer first. Then the computer compatibility is multiplied by a factor, so the proximity of relation (e.g., its importance) is taken into account. In step 455, it is determined if there is any preclusive conditions that are met. For each table, a defined set of preclusive conditions is set. If any of these conditions is met, the filtering algorithm knows that the considered item is not acceptable as a compatible result. The preclusive conditions are defined strictly for specific tables and typically uses specific data in items and specific external information (e.g., from a suer's profile). If there are any preclusive conditions that are met, in step 460, the item is not considered to meet the filtering criteria. The process then returns to step 430.

If there are not any preclusive conditions that are met, in step 465, it is determined if the degree is higher than the specified threshold. A specific threshold value is set for a particular solution. The threshold value is determined experimentally, in some cases. If the value is too high, few items are considered to be compatible. If the value is too low, too many items are considered to be compatible. If yes, in step 470, item is considered to meet the filtering criteria, and the process returns to step 430. If no, in step 475, it is determined if there is a table deeper in the history that has not been processed. The history contains a list of tables that were used during navigation in the past. This program determines a level of compatibility for each item in the end table for each table in the history. Tables in the history are stored in an array and are taken one after another If there is not a deeper table in the history, in step 460, the item is not considered to meet the filtering criteria, and the process returns to step 430. If there is a deeper table in the history, in step 480, this table is designated as the new start table, the factor is decreased in step 485, and the process returns to step 415.

Additional Features

Adaptive Graphical User Interface (GUI). Rather than using a "one-size-fits-all" GUI, the adaptive GUI personalizes the GUI's "look and feel", using the user's characteristics (e.g., age, gender, and maturity) to maximize the user's experience. For example, a GUI for adolescent females may be chosen that displays videos of women in the workplace.

The adaptive GUI adapts to the user's profile in at least two ways: it optimizes the layout of the GUI for optional user experience in performing tasks, and it optimizes the function of the GUI.

To optimize the layout of the GUI elements that are identified as profile-relevant by the personal agent factor (PAF), a layout appropriateness (LA) method is used. The LA method computes the layout appropriateness of an interface by assigning frequencies and costs to task descriptions (i.e., sequences of user transitions between GUI elements) involved in performing specific tasks with the interface. The costs are derived from the distance a user must travel between GUI elements and also to an index of difficulty (e.g., Fitts Index of Difficulty).

The LA method enables the in-situ generation of a user-tailored, user-optimal layout, until the system again recognizes an off-tolerance user profile change. User profile information (e.g., for user behavior during application use, as captured by the assessment manager; from assessment scores; or from direct user input), if within the norm, will add no changes to the functionality of the base GUI components, and thus the GUI display. However, new user profile elements (e.g., use behavior), once outside the set norm references, will effect functional changes to the base GUI components, and potential layout changes to GUI display.

In optimizing the adaptive GUI function, to better provide the user with tailored resources, the present invention uses a personal agent framework (PAF). The PAF coordinates numerous user profile files. Thus, the user's application user behavior is evaluated continuously during interaction with the application, and the user's profile could change accordingly.

Optimizing the function takes place by linking GUI objects to user profile elements using the PAF. The PAF links the GUI elements with the dynamic repository of user profiles. The PAF also stores objects in a multimedia solution database. After the multimedia solution database has been populated via pilot test and continuous user data capture, PAF uses its case-based learning module to improve and speed up the rate at which it generates user profile-GUI element combinations by matching the profile of the new user with those for which combinations exist in the solution repository. A PAF profile manager acquires and stores user profiles (e.g., user-input personal data, interest topics, assessment results, user habits) and manages user interest hierarchy.

The adaptive GUI can be used for, for example, adaptive learning products, involving intelligent tutoring, self-paced, self-directed education, computer based educational and career assessment tools, and adult learning tools and products.

Figure 5:
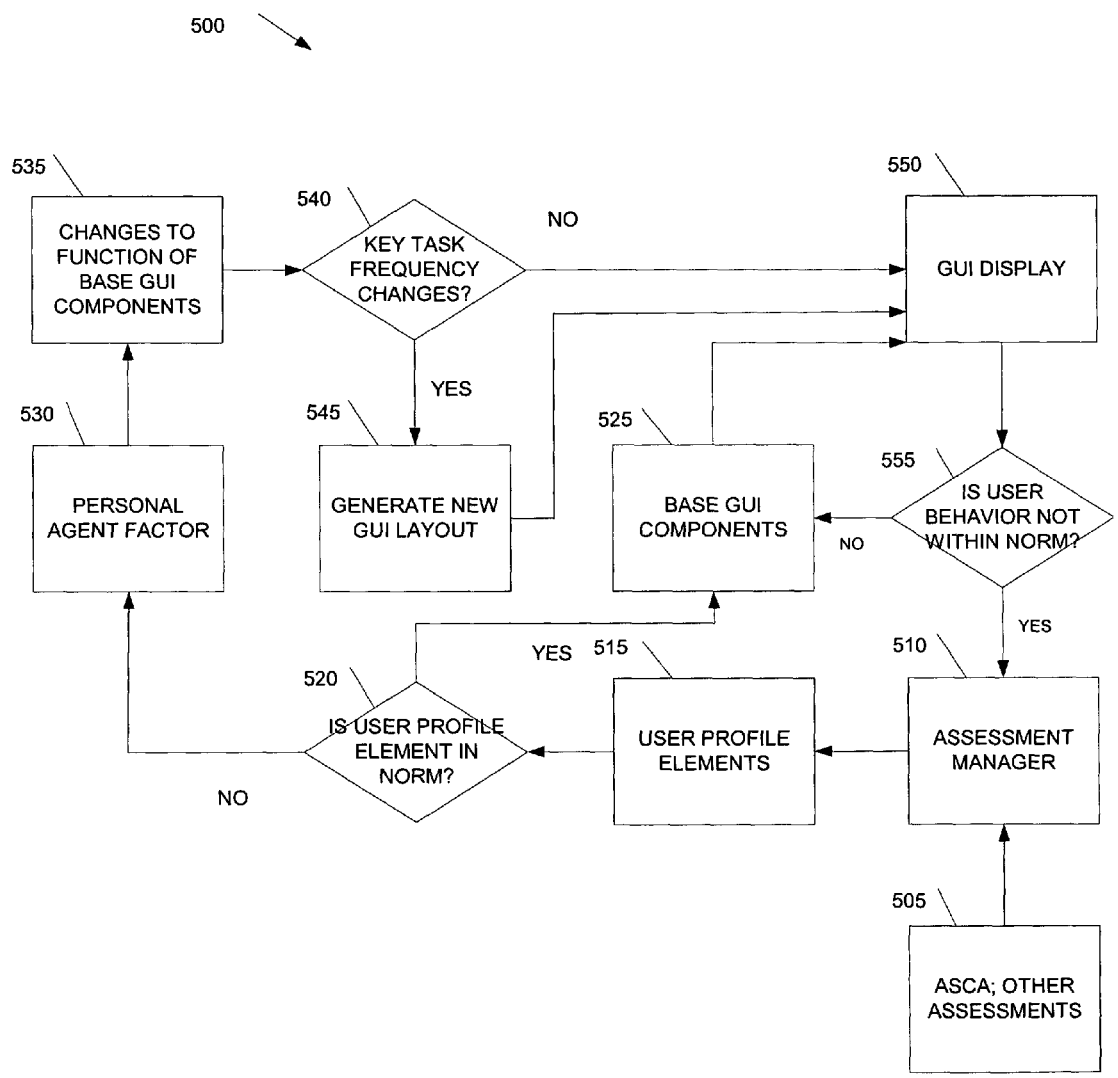
FIG. 5 illustrates a method of using an adaptive graphical user interface 500, according to one embodiment of the present invention.

FIG. 5 illustrates a method of using the adaptive graphical user interface 500, according to one embodiment of the present invention. In step 505, output results from an advanced self-concept assessment instrument (or multimedia questionnaire), as well as results from other appropriate assessment instruments are fed into an assessment manager in step 510. In step 510, the assessment manager serves to organize the assessment results and user behavior parameters into profile elements. In step 515, the profile elements for the user are then categorized and classified into norm-referenced user profiles, and stored into a "user profiles" database. In step 520, a comparison of a current user profile is made with the norm. In step 525, if the profile is within the norm, the base GUI components are activated, and if already activated previously, then the GUI display remains as is in step 550 and there is no change to the GUI. If the user profile is outside of the norm, step 530 activates the personal agent factor (PAF). The PAF innovation serves two key purposes: first, it will use a knowledge base of user profiles and AI techniques to mine, organize and report useful, individualized information or solutions back to the user. Secondly, the PAF will assign GUI component parameter values to user profile elements, thus providing the basis for changes to base GUI components. In step 535, those changes are implemented in the base GUI components. Step 540 determines whether the changes to the function of the base GUI components have resulted in changes to the frequencies of key tasks of the application. If so, then a new GUI layout is generated in step 545 and displayed in step 550, and if not, the GUI remains the same in step 550, with no changes to the current GUI setting.

The adaptive GUI continuously monitors and captures user behavior during application use, and continuously compares that application use behavior to stored values of the norm. In step 555, if user behavior is within the norm, there is no change to the nominal base GUI components of step 525, and the display remains the same in step 550. If user behavior is outside of norm however, that information is passed to the assessment manager step in 510 for processing and subsequent generation of new user profile elements.

Assessment Combinator. The objectives of the assessment combinator are two-fold: (1) Create relevant combinations of assessment items across assessment batteries (i.e., new assessment scales obtained by combining question items from different assessment instruments) and (2) Assign inferences on combination results to choice options. The assessment combinator will thus be an efficient match-enabler for integrated education-career options by providing a searchable "library" of new combinator result-to-choice option assignments. The assessment combinator will resolve the issue of the systematic assignment of new cross-instrument measures to attributes, and the systematic assignment of such attributes to choice options. If successful, the value-added here will be the generation of a large number of additional cross-instrument sub-scales, with a minimal number of their associated measures able to point users to choice options that existing instruments are currently inherently unable to do. For example, in the case of two conventional instruments (or questionnaires) A and B, each with three assessment components (each requiring a "Yes"/"No" response), the maximum number of intra-instrument sub-scales from each instrument would be {3C1+3C2+3C3}, or seven, for a total of fourteen (14) sub-scales from both instruments. However, the maximum additional number of component combinations from both instruments, to create new possible cross-instrument sub-scales would then be the square of {3C1+3C2+3C3}, or forty-nine (49) sub-scales, for a sub-scale total of 63.

The successful use of measures from some of the new sub-scales as new predictive decision pointers will be a significant extension of the state-of-the-art. Such a development will open up new possibilities for decision support, enhance the efficiency and utility of existing decision tools, and maximize the usefulness to the user of user-supplied assessment information.

Figure 6:
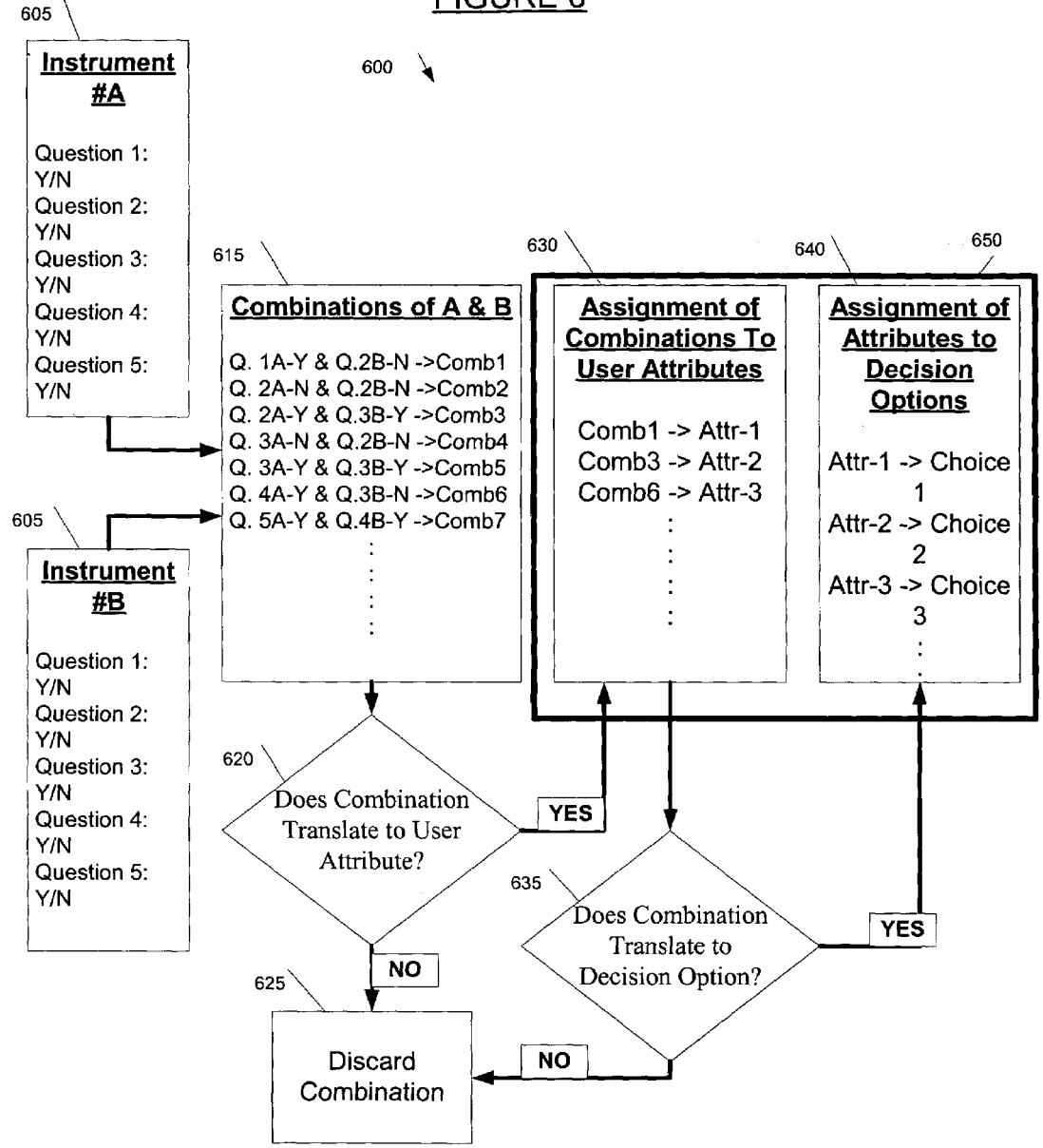
FIG. 6 illustrates a method of using an assessment combinator 600, according to one embodiment of the present invention.

FIG. 6 illustrates a method of using an assessment combinator 600, according to one embodiment of the present invention. In step 605, at least one question from instrument #A is entered. In step 610, at least one question from instrument #B is entered. Instrument #A and instrument #B are, for example, questionnaires related to preferences, skills, abilities, temperment, self-concept, decision-making ability, etc. The questionnaires can be on paper or computerized. An example of a question from instrument #A is "Do you like working in a team?". An example of a question from instrument #B is "Do you like math?". In step 615, at least one answer from instrument #A and at least one answer from instrument #B are combined. In step 620, it is determined if the #A and #B combination translates into at least one user attribute by searching a database of user attributes to see if there is a match. In this example, if a person likes working on a team and likes math, a user attribute can be, for example, that the person is a technical team player. If not, in step 625, the #A and #B combination is discarded. If yes, the #A and #B combination is assigned to the at least one user attribute in the database of user attributes. Thus, in this example, the combination is assigned a user attribute of a technical team player. In step 635, it is determined if the user attribute combination translates to a decision option. Thus, in the example, the choice would be an engineer. If not, in step 625, the user attribute combination is discarded. If yes, in step 650, the user attribute combination is assigned to the at least one decision option.

Self-Concept Assessor. Inaccurately measuring a person's self-concept (e.g., interest and skills) provides inaccurate education and career choice options. Conventional self reports that assess self-concepts (e.g., rating scale) often result in a masked measure for a self-concept (e.g., a person will answer questions according to social expectations instead of real feelings). The present invention provides a self-concept assessor that captures direct user feedback that is not masked. The present invention does not require substantial verbal skills, inherently reminds a user of his/her own perceptions, and requires a low "social desirability" response. In addition, the present invention separates two embedded utilities: (1) the expression of a range of self-efficacy beliefs in a multi-media presentation for the user to react to in various levels of distinction, and (2) subtle references to accuracy criteria in the same multimedia presentation.

The present invention includes at least one of the following features:

Levels of occupational and academic interest and skills are assessed.

Techniques that transfer self-efficacy beliefs into a multimedia presentation (e.g., video, pictures, animations) for a user to react and respond to (e.g., concur with, disagree with, or neutral) are used, where the multimedia presentation also embeds a criterion of accuracy.

Responses to items are in a Likert-type response format (e.g., concur with, disagree with, neutral) with various levels of distinction (e.g., strong agreement, complete agreement).

Interests, skills and occupational scales scores will be reported and integrated into the user profile database.

A criterion-referenced approach, in which the user's self-concept beliefs are assessed repeatedly in reference to an external criterion of accuracy, rather than to a norm, is used.

The self-concept assessor takes advantage of education and career setting video images incorporated into an "exploration function" of the architecture. It uses a criterion-referenced approach, where a user's self-concept beliefs are assessed repeatedly in reference to an external criterion of accuracy, built around video clips, rather than an approach that compares a user's response against a set of norms. The self-concept assessor captures self-efficacy thoughts, in as filter-free a manner as practicable.

Figure 7:
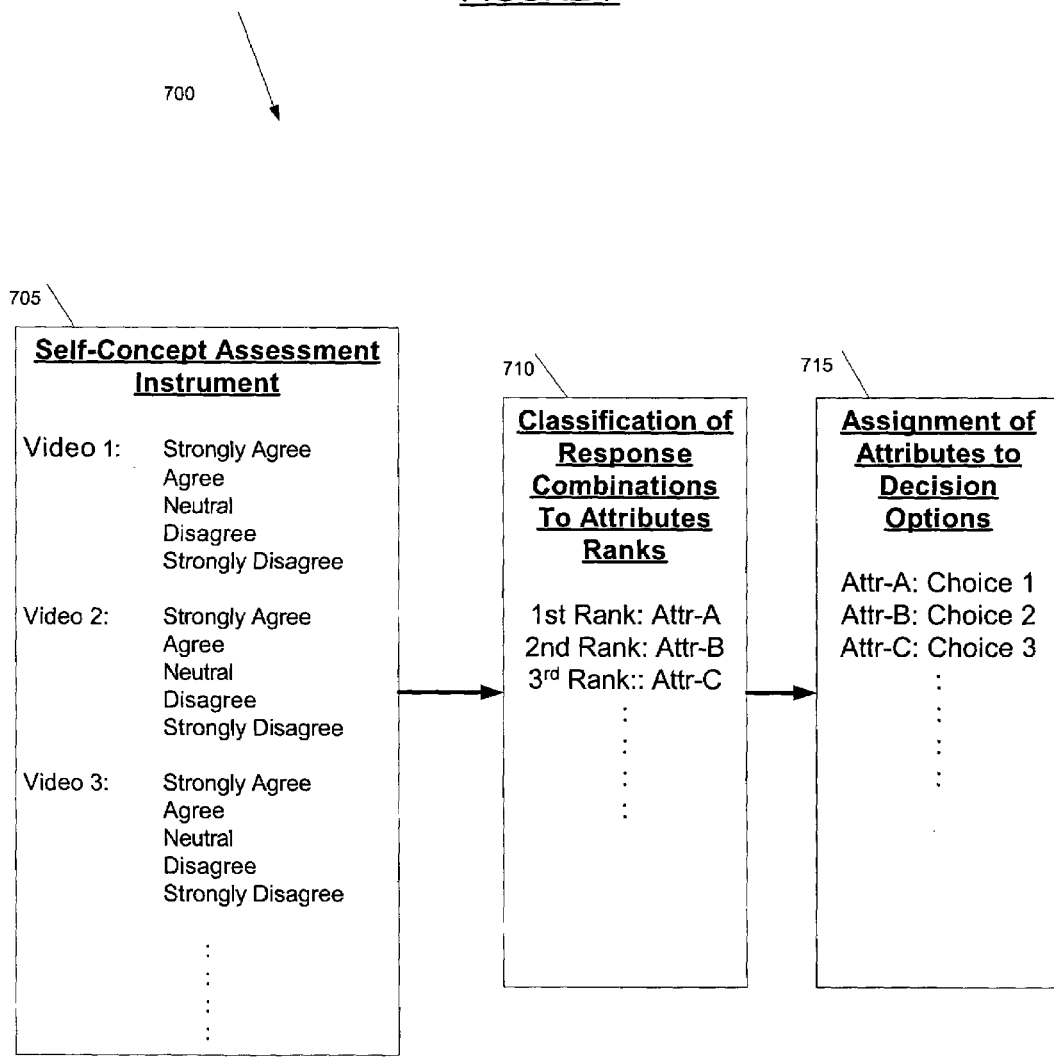
FIG. 7 illustrates a method of using a self-concept assessor 700, according to one embodiment of the present invention.

FIG. 7 illustrates a method of using a self-concept assessor 700, according to one embodiment of the present invention. In step 705, a self-concept assessment instrument is created. For example, a video is created showing day-to-day activities of an attorney. The user is super-imposed in the video. In step 710, a response combination to attribute ranks is classified. Thus, for example, the user can answer questions about the video, and the responses are classified. In step 715, attributes are assigned to a decision option. In the example, if the user indicated that he liked the attorney occupation, the career option of an attorney is designated. The attributes and career options can be ranked.

Education Plan Designer. The explosion of education options and paths necessitates a mechanism that enables students' exploration of several explore options. The education plan designer provides a convenient tool for user-friendly creation, manipulation, display, and review of educational curricula, using at least one of the following features:

Enables a user to design a new course plan, or modify an existing plan towards completing a degree at a specific institution, that will lead to a desired career path.

Enables a user to investigate and if desired, articulate and thus substitute courses with other compatible, institutionally acceptable courses from a variety of sources (e.g., neighboring institutions, e-learning sites).

Enables a user to investigate and if desired, articulate current curricula with other curricula, with a view to exploring the various implications (career and otherwise) of a change of institution and/or major area of study.

Enables a user (enrolled or un-enrolled) to perform their own investigations related to transferring, with due regard to required and elective course options, and the career and employment implications of course choices.

Enables a user to perform audits on their current curriculum towards determining graduation prospects and timing.

The educational plan designer implements the congruence of the education universe with the other two universes of careers and personal attributes. This changes the way students navigate the educational process, by potentially putting in the hands of all students, whether currently enrolled or not, the resources and tools to review, plan and design their own educational plan.

The education plan designer imports the entire curricula, program elements, accompanying protocols and Boolean requirements from a set of institutions relevant to a specific career and educational path into a series of updatable databases. The education plan designer then simulates the process of student advising, transfer student auditing, and curricula design, but does it with an entire advisory environment from the relevant institutions, providing design tools to review, initiate, re-build, and investigate options with significant savings in time. The user will be able to: design a new course plan, or modify an existing one for academic work at a specific institution, that will lead to a desired career path; investigate and if desired, articulate courses on the primary plan with institutionally acceptable substitute courses from neighboring institutions; investigate and if desired, articulate current curricula with other curricula, to explore implications (e.g., career, graduation) of a change of institution/major area of study; and perform regular/transfer student advising, with due regard to required/elective course options, and their employment and/or internship implications.

Example uses of the education plan designer include: articulating transfer students quickly and efficiently for educational institutions; and embedding the education plan designer in existing products for college-bound students for software publishers.

Figure 8:
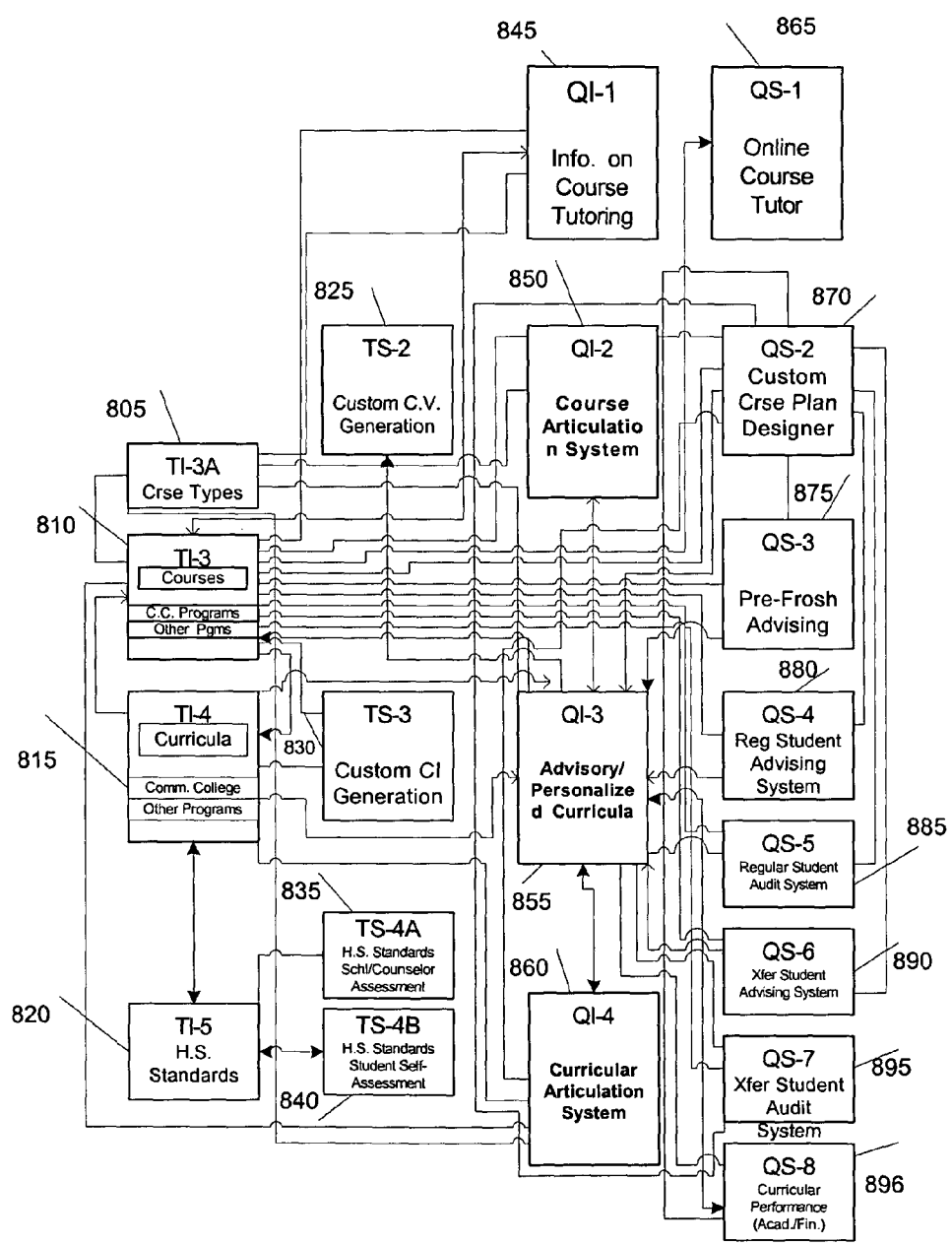
FIG. 8 illustrates a method of using an education plan designer 800, according to one embodiment of the present invention.

FIG. 8 illustrates a logic diagram of using the education plan designer 800, according to one embodiment of the present invention. Databases include course types 805, courses 810, curricula 815, standards 820, and information on course tutoring 845. Programs include course articulation system 850, advisory/personalized curricula 855, curricular articulation system 860, custom course plan designer 870, pre-frosh advising 875, regular student advising system 880, regular student audit system 885, transfer student advising system 890, transfer student audit 895, and curricular performance 896. FIG. 8 illustrates how the databases and programs are logically connects. T represents tertiary, Q represents quaternary, S represents services, and I represents information.

Adaptive Backsteppable Filter. Finding a dynamic intersection, in terms of options, among career, education and user attribute databases requires a robust data integrator that efficiently organizes the vast amounts of multimedia data in these databases for logical filtering. The adaptive backsteppable filter performs this task. The adaptive backsteppable filter is a three-stage series of data integrator-filters. Stage I dynamically aggregates and stores objects created from combinations of related education database data and career database data. Stage I then forwards a copy of these new objects to Stage II to enable a rejoining of the objects with compatible user profile elements to obtain new "education-user profile objects" and "career-user profile objects". Stage III dynamically creates new objects to obtain "education-career-user profile objects". These integrated objects are then instantly available to the front-end as display-ready information, improving query efficiency and accuracy. The user may also re-engineer a solution by back-stepping to recall how options and paths were derived, providing a useful function to reviewers of user decision processes (e.g., counselors).

Figure 9:
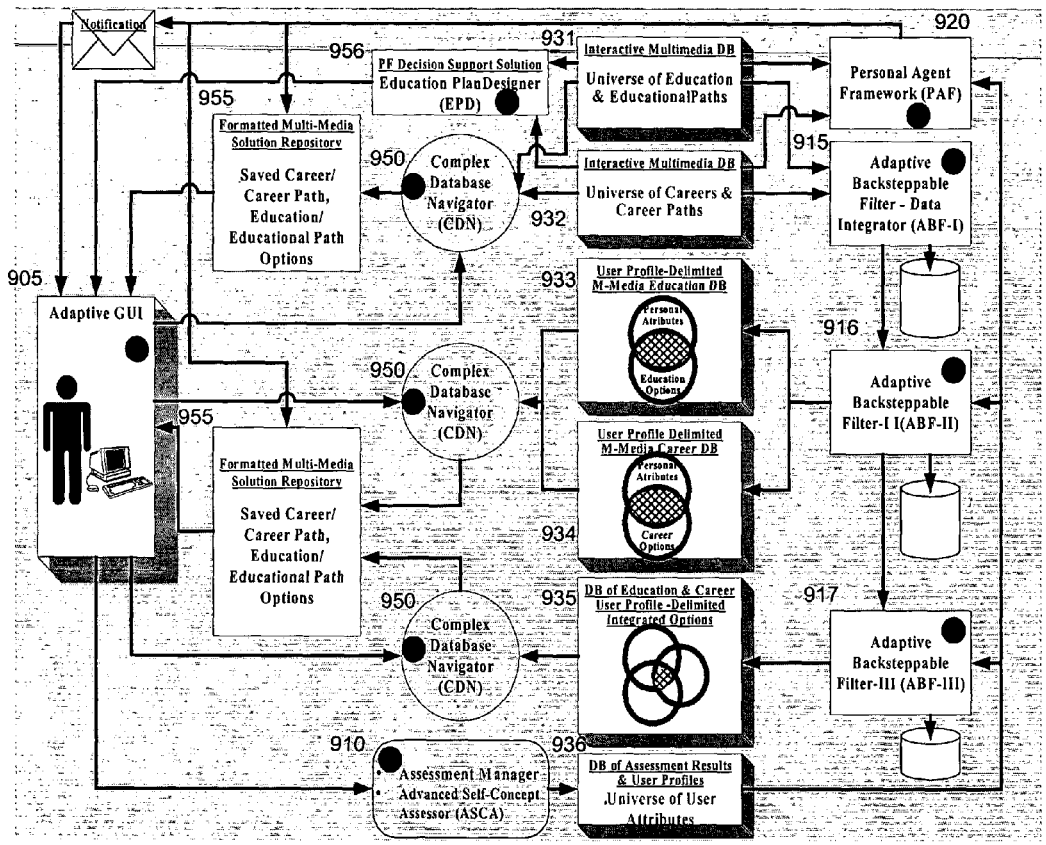
FIG. 9 illustrates a method of using an adaptive back-steppable filter 900, according to one embodiment of the present invention.

FIG. 9 illustrates a method of using the present invention, highlighting the adaptive backsteppable filter 900, according to one embodiment of the present invention. The user takes an assessment instrument to discover an initial user profile using the adaptive GUI 905. The user profile undertakes several assessment instruments 910 (e.g., self-concept assessor, assessment manager) and then proceeds to a database of user attributes 910. The user attribute information is provided to the adaptive backsteppable filters 915, 916, and 917, and the personal agent framework 920. The list tool mechanism will then be used to limit the information that is shown. At this point, the GUI 905 can be adapted, if necessary. Now that the user has an adapted GUI 905, information from the databases 931, 932, 933, 934, 935, and 936 is pulled using the database navigators 950 to navigate all the databases. This filtered information is displayed on the GUI 905. It is also stored in the in the repository 955 (i.e., history/basket).

Integrated Assessor. The integrated assessor is the end-use computer implementation, in software, of the assessment combinator functionality. It is the process for integrating assessment combination assignments into a computer application for direct use by the user. The utility and benefit of the assessment combinator will be completely lost to the user, without the ability to incorporate the new cross-instrument assessment scales and ensuing measures into an application's decision-making mechanism. This involves the creation of a function that stores cross-instrument scale combinations (new sub-scales), and attribute assignments of their potential measures, in a data repository, much like a searchable library, such that choice options are recalled, whenever combinations are matched by the user.

The integrated assessor is illustrated as step 650 of FIG. 6, according to one embodiment of the present invention. The integrated assessor combines steps 630 and 640 of FIG. 6.

Assessment Manager. The assessment manager serves to organize the assessment results and user behavior parameters into profile elements. It engages in processing and generation of user profile elements for use as delimiters that filter user choice options. Thus, as the assessment manager captures user behavior parameters during application use, or processes assessment results into profiles for immediate use as delimiter filters, it effectively acts as a "just-in-time" administrator and implementer of assessment results, due to a capability as a "just-in-time" generator of user profile elements.

Figure 10:
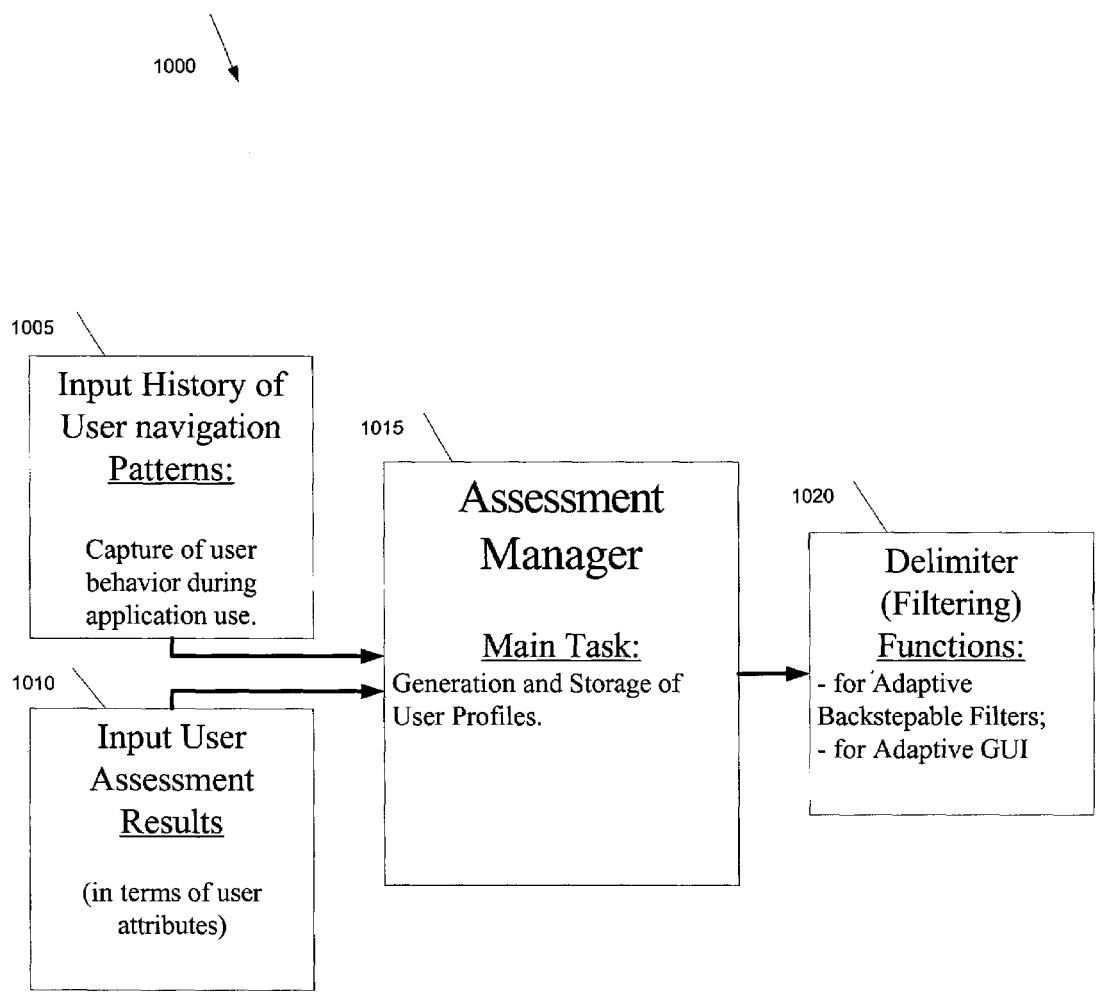
FIG. 10 illustrates a method of using an assessment manager 1000, according to one embodiment of the present invention.

FIG. 10 illustrates a method of using the assessment manager 1000, according to one embodiment of the present invention. In step 1005, a history of user navigation patterns is input. In step 1010, user assessment results are input. In step 1015, the assessment manager generates and stores a user profile. In step 1020, delimiting (filtering) functions are performed.

Multimedia Information Integrator and Navigator. The multimedia information integrator and navigator represents a database management function to effectively and efficiently integrate information from the three universes of potential careers, potential educational paths and student attributes. It enables the entire application to display the attributes of integrated functionality. The multimedia information integrator and navigator also allows the application to display recommended paths to the user in an integrated manner, to allow them to navigate through the database in a way that will most likely help the user more quickly reach their goals.

Solution Analyzer. The solution analyzer provides tools and algorithms for extracting and analyzing education-career solution information and sharing it with others. The solution analyzer extracts education-career solution information from solution repositories throughout the application, and then creates a formatted analysis of the extracted solution, on a multimedia template that can be easily shared with other stakeholders. The solution analyzer provides the user with summary information about an investigated solution option, including rationale behind solution options. A detailed solution option analysis allows the user to identify flaws, in the input information and assumptions that generated the solution path. The solution analyzer allows the user to make critical changes that may lead to a new, more realistic, more compatible and more desirable solution option.

Screen Shots

Figure 11E:
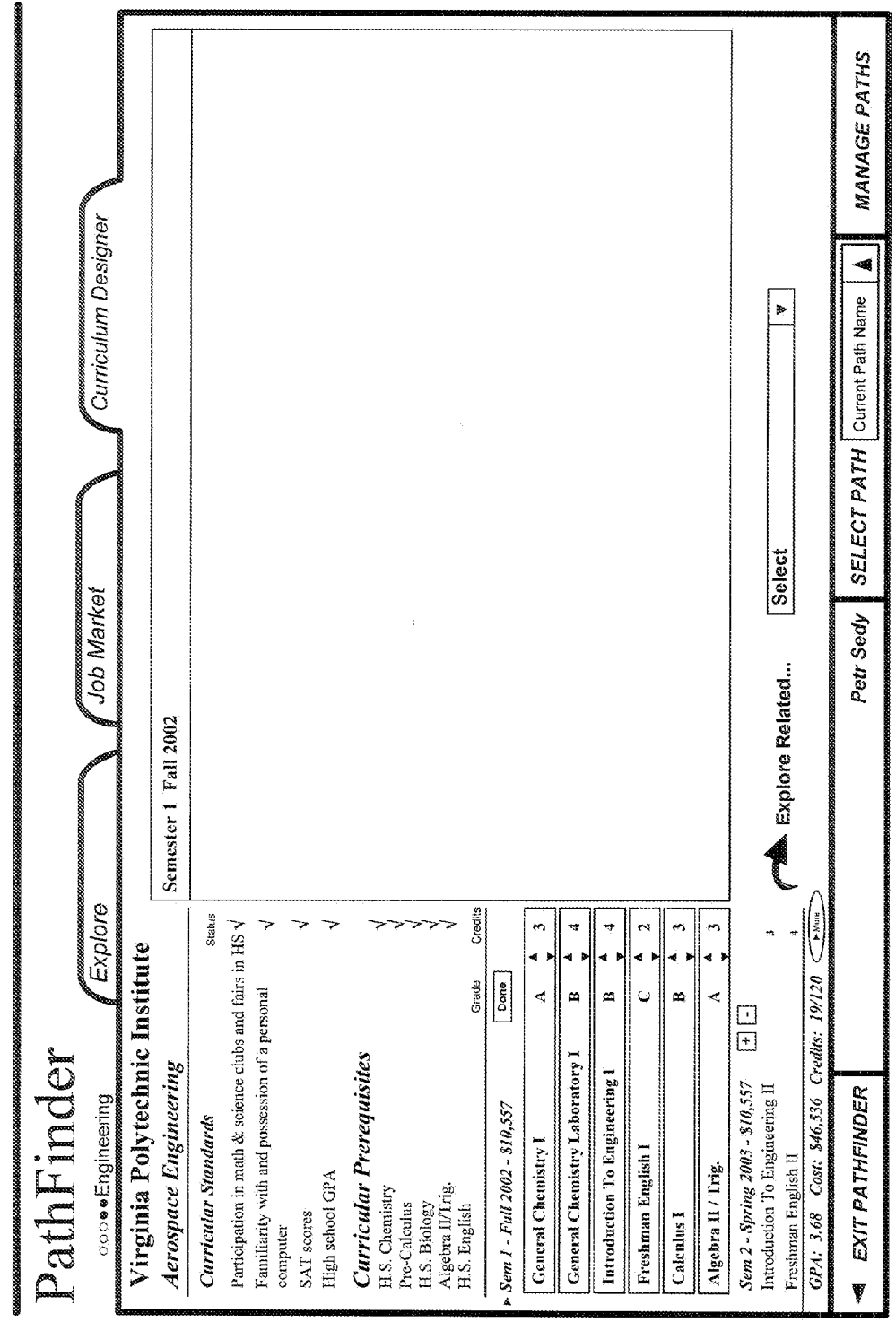
FIGS. 11A-11S illustrate curricular design screen shots.
Figure 11F:
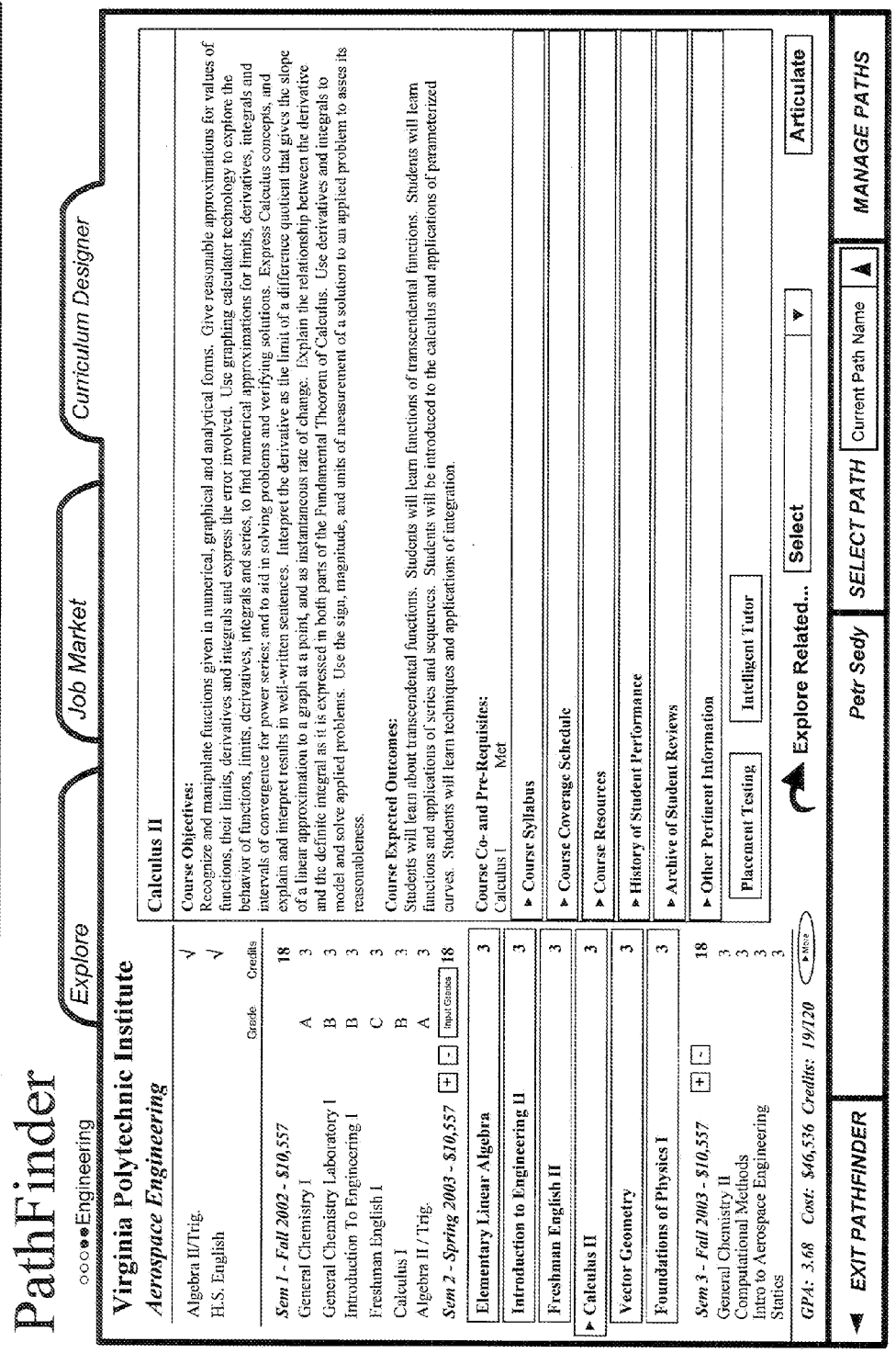
Figure 11G:
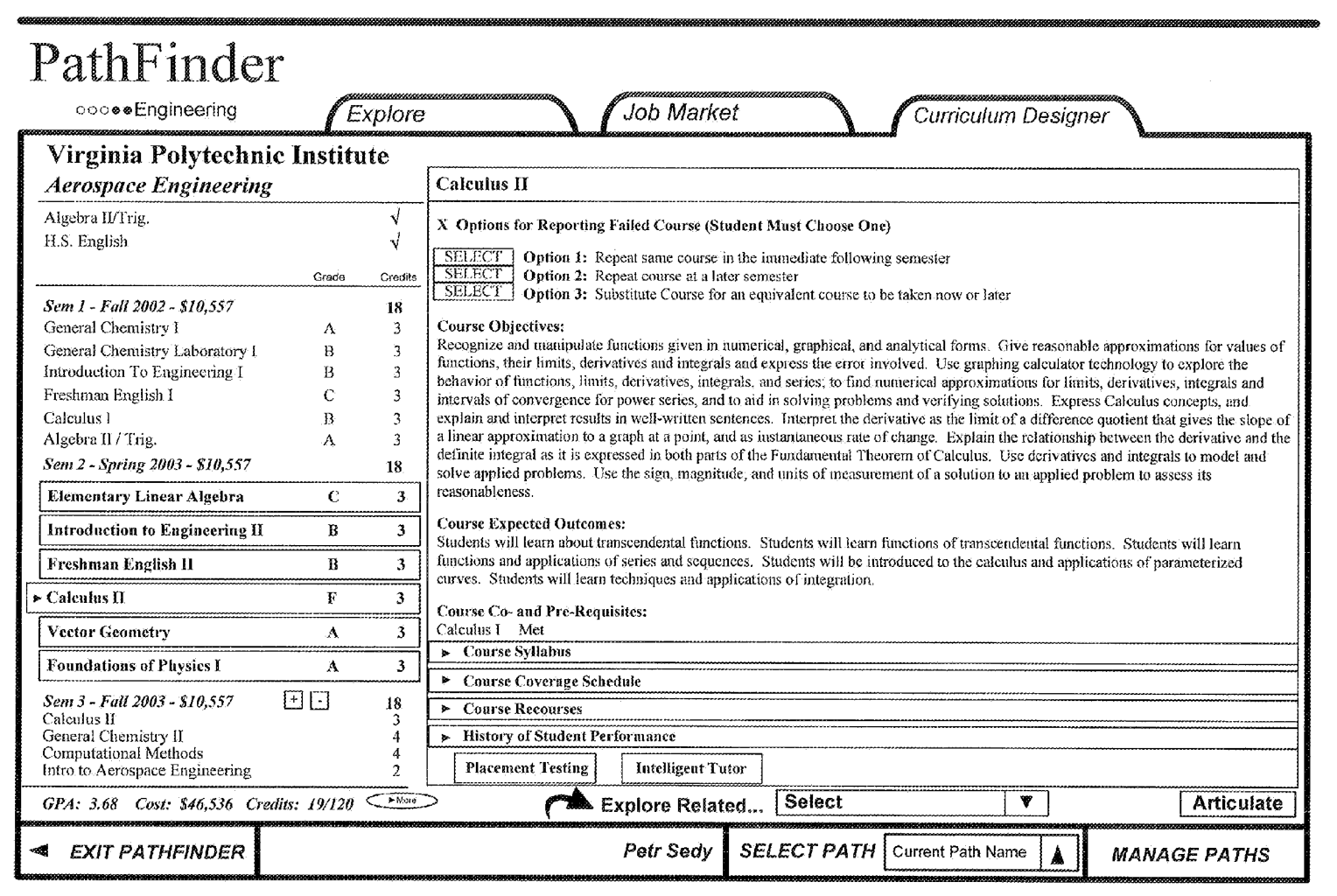
Figure 11M:
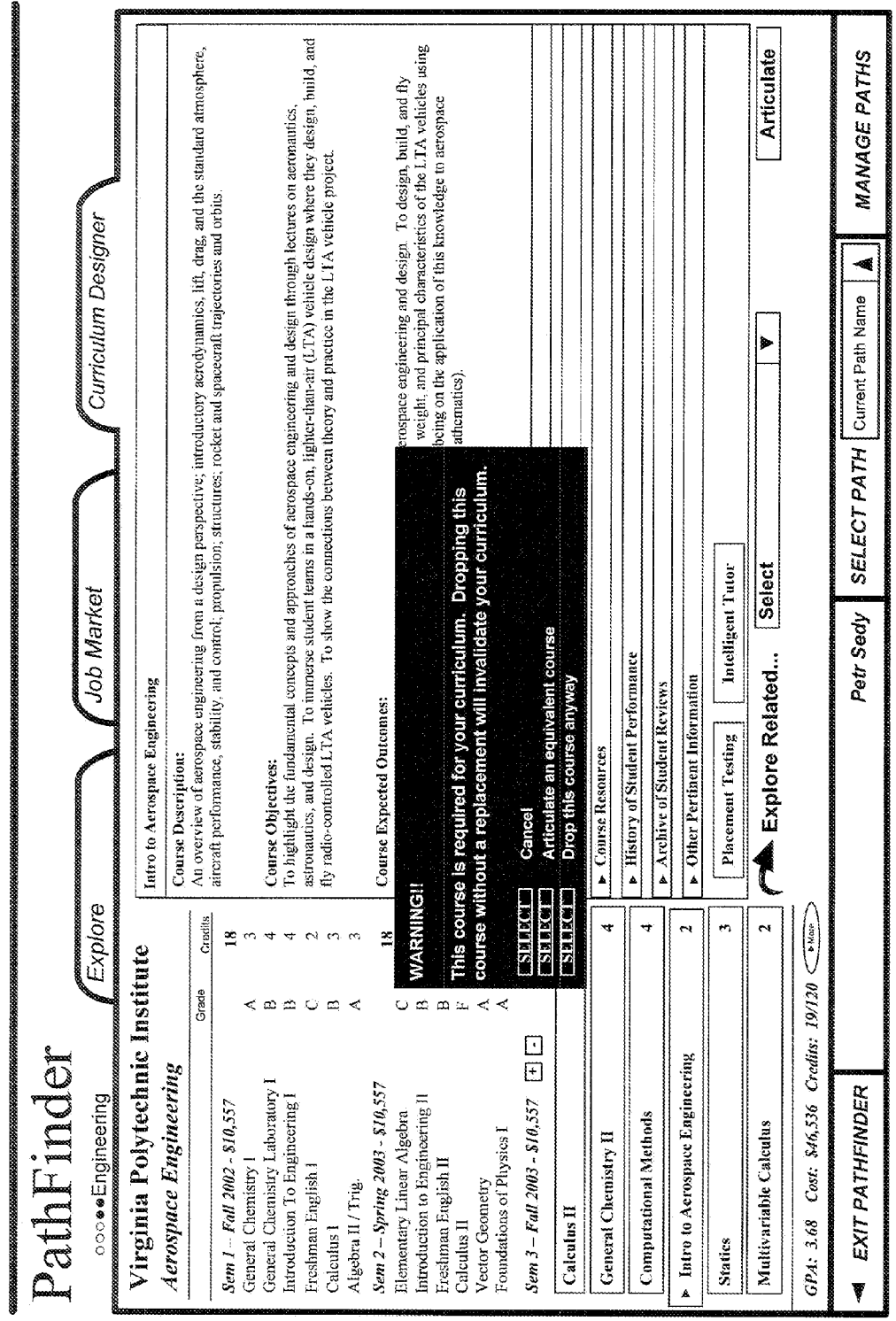
Figure 11N:
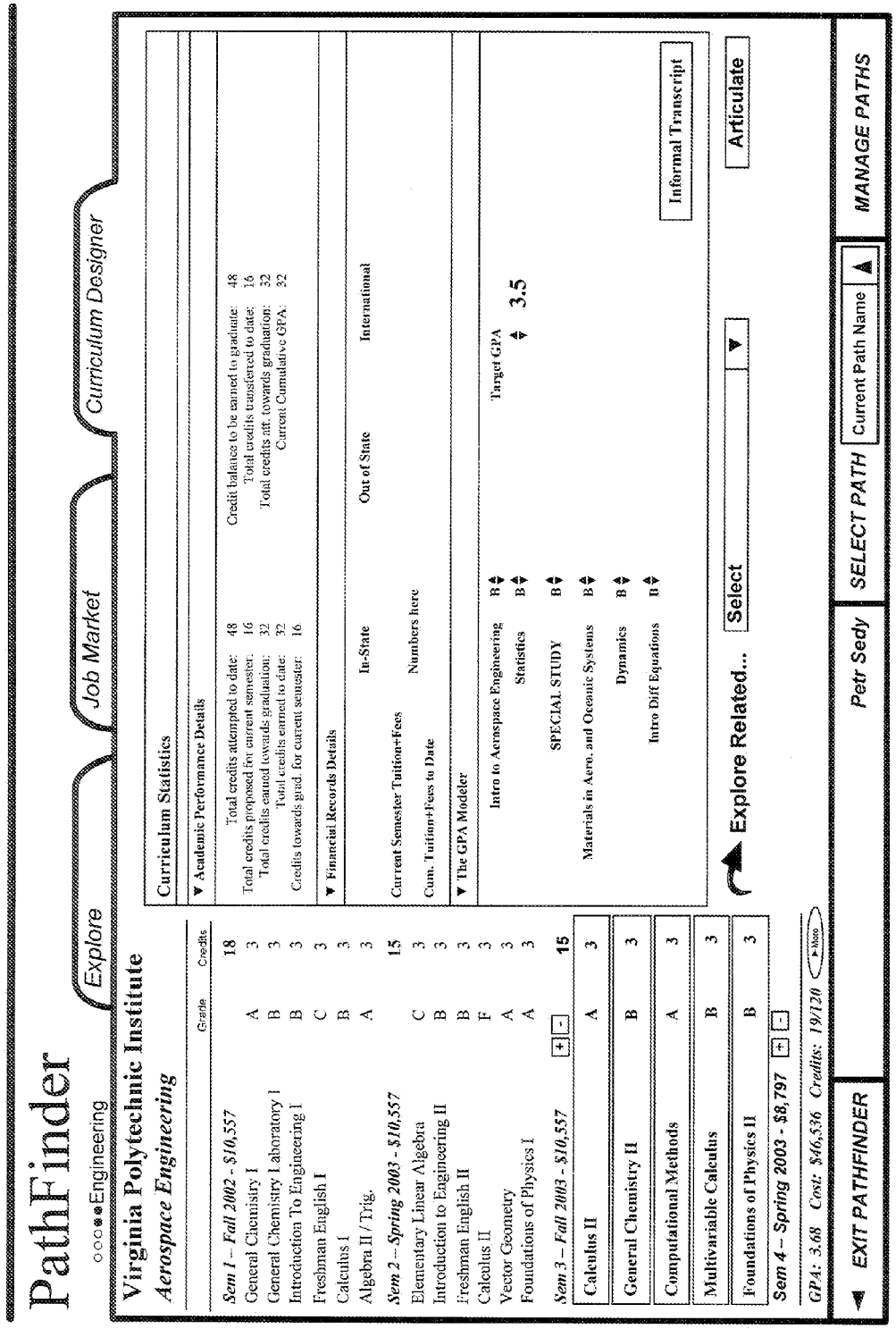
Figure 11O:
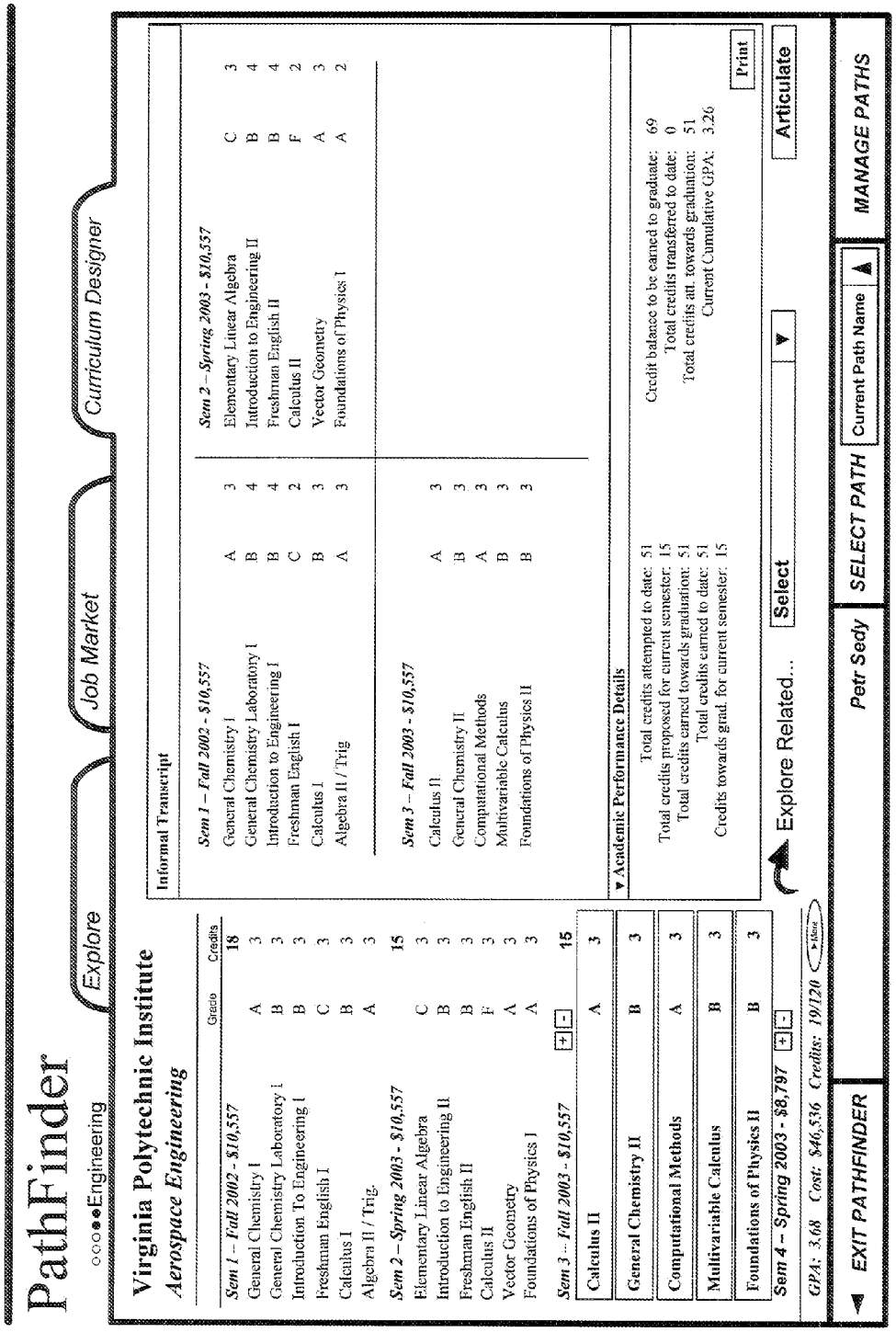
Figure 11Q:
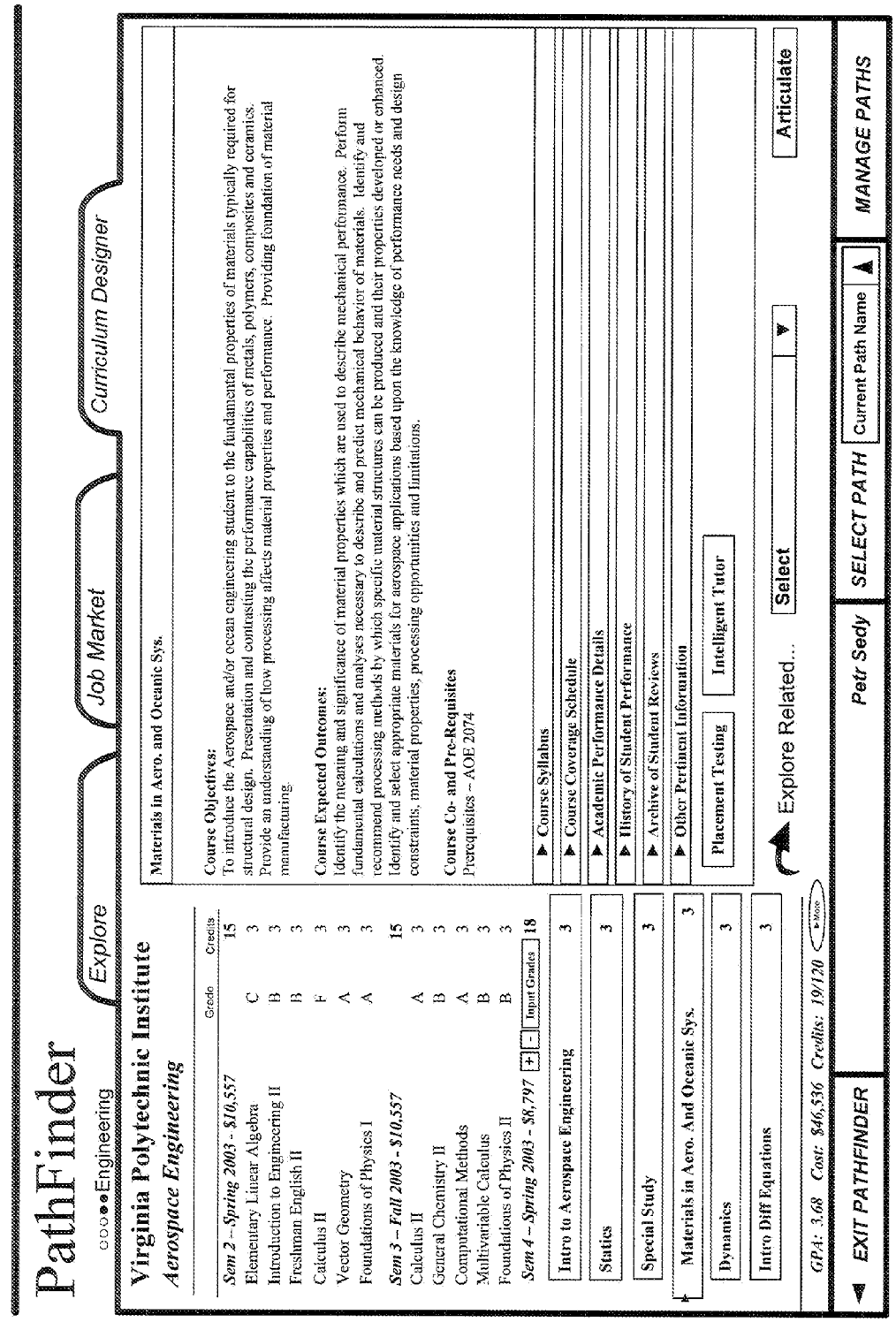
Figure 11S:
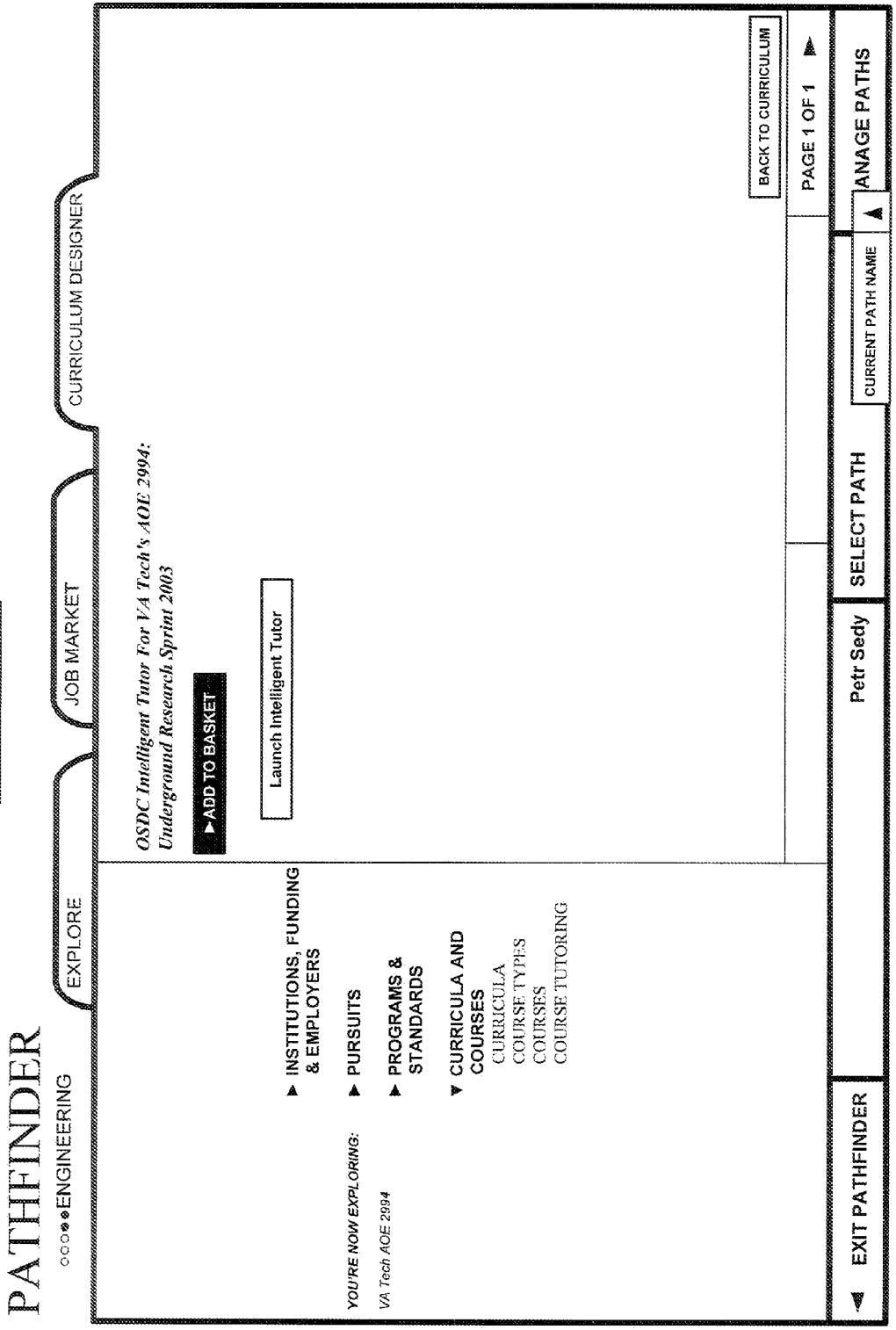

Curricular Designer Screen Shots. FIGS. 11A-11S illustrate screen shots that present the entire curriculum sequence of courses, from semester to semester, where the user is able to perform the following functions: Review the details about a course, from descriptions to reviews of syllabi, course objectives, course expected outcomes, course resources, grading policies, course schedule, archive of student's reviews; Adding, dropping and choosing options about what course to take, from a database of courses that include courses from all institutions in the country; finding options about repeating courses; Inputting grades; Tracking Grade Point Averages (GPA's); Modeling future GPA's; Tracking financial costs, financial statistics, academic statistics; Launching a self-guided intelligent tutor to assist with course tutoring; Tracking credits and time needed to graduate, and its projected costs; Investigating the implications of taking a course on future employment or internship opportunities; Investigating the implications of taking a particular course and having a particular GPA on financial aid; Articulating courses with similar courses from appropriate institutions in the country that have closely similar (articulated) courses; Reviewing the possibility for articulating existing courses with matching, accepted courses; Generating an informal transcript; Reviews of merit-based and non-merit-based financial resources; and, Articulating whole curricula with other curricula from appropriate institutions in the country, in order to identify similarities in transfer courses (for transfer students).

Figure 12A:
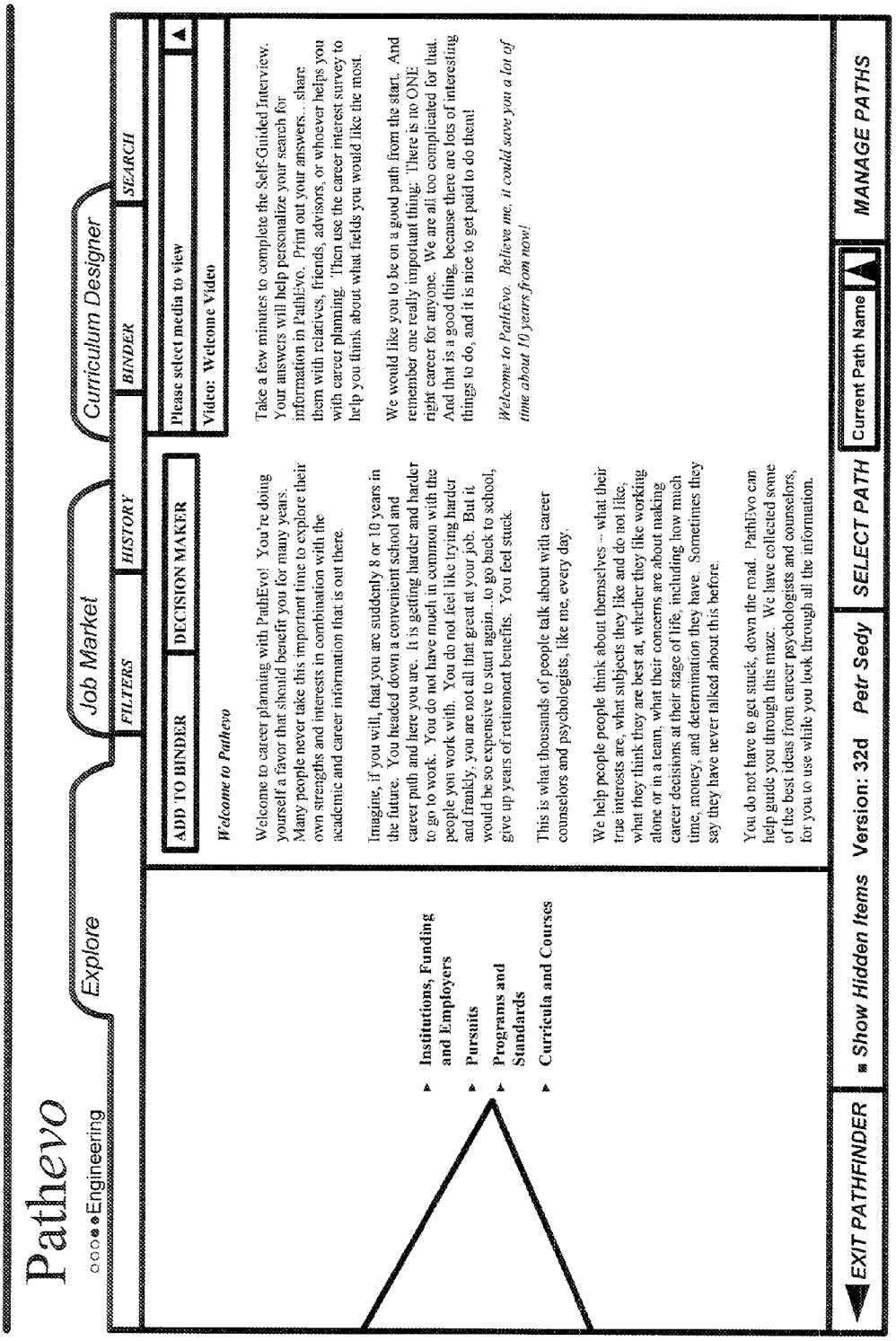
FIGS. 12A-12U illustrate explore/job market screen shots.
Figure 12B:
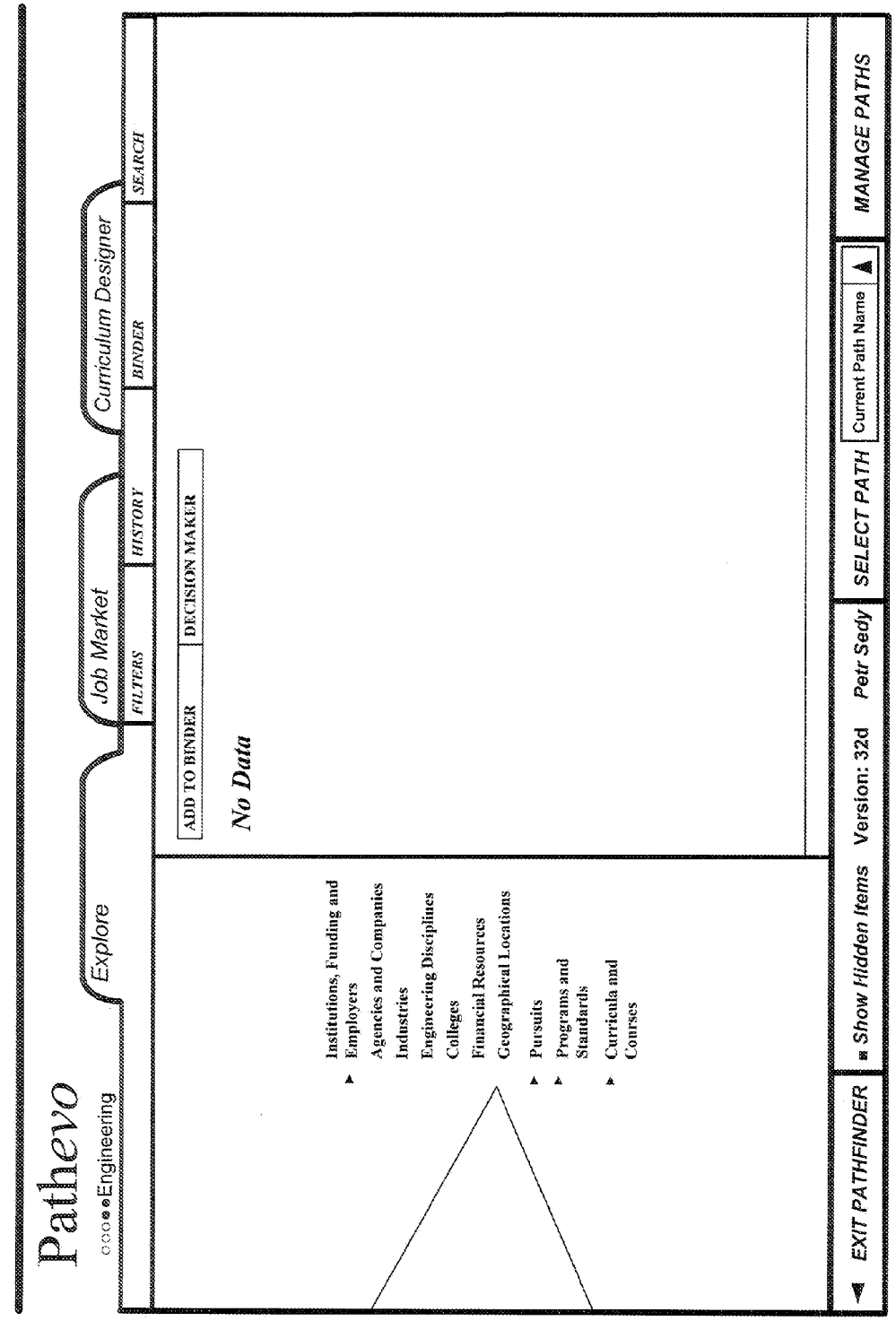
Figure 12C:
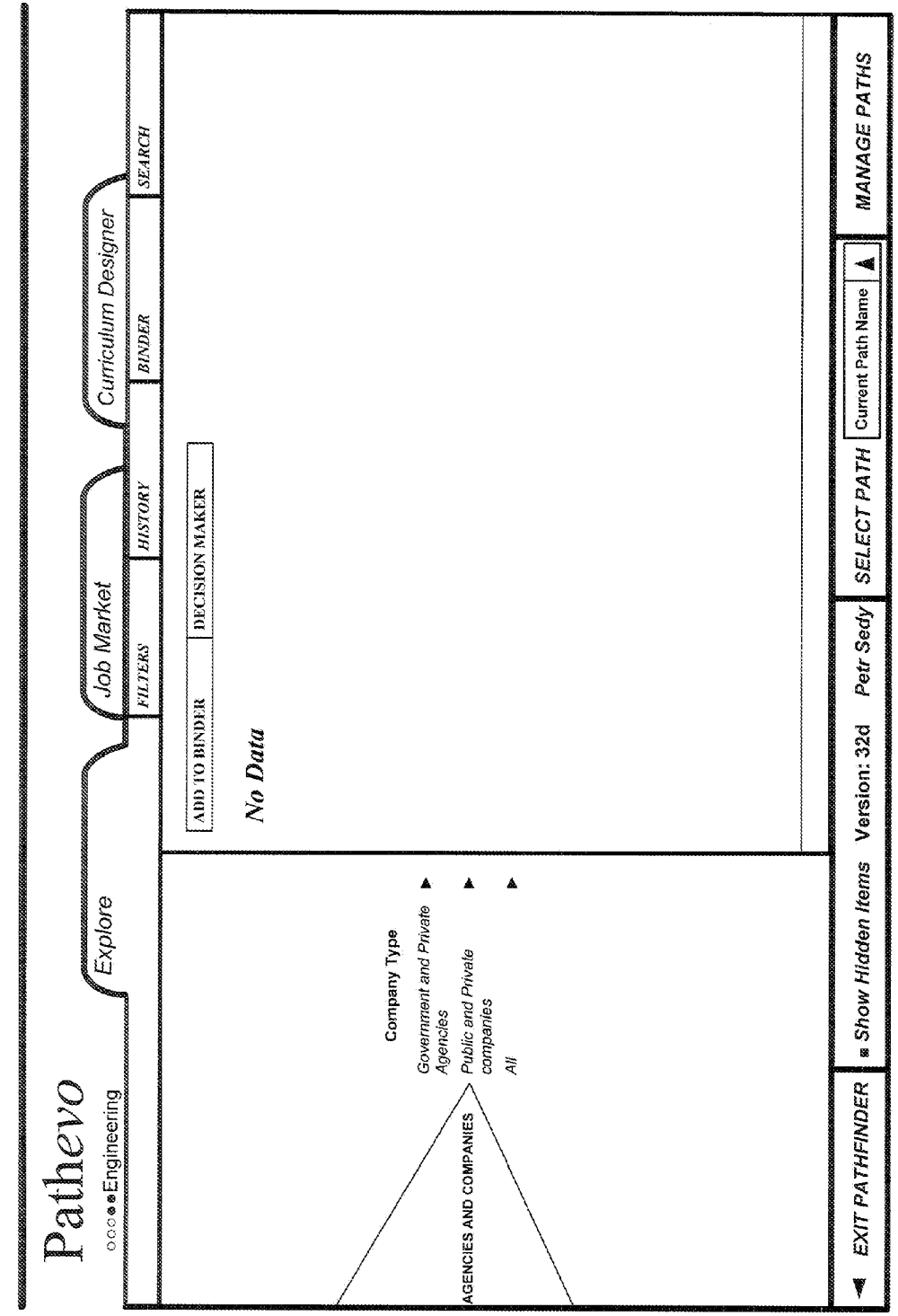
Figure 12D:
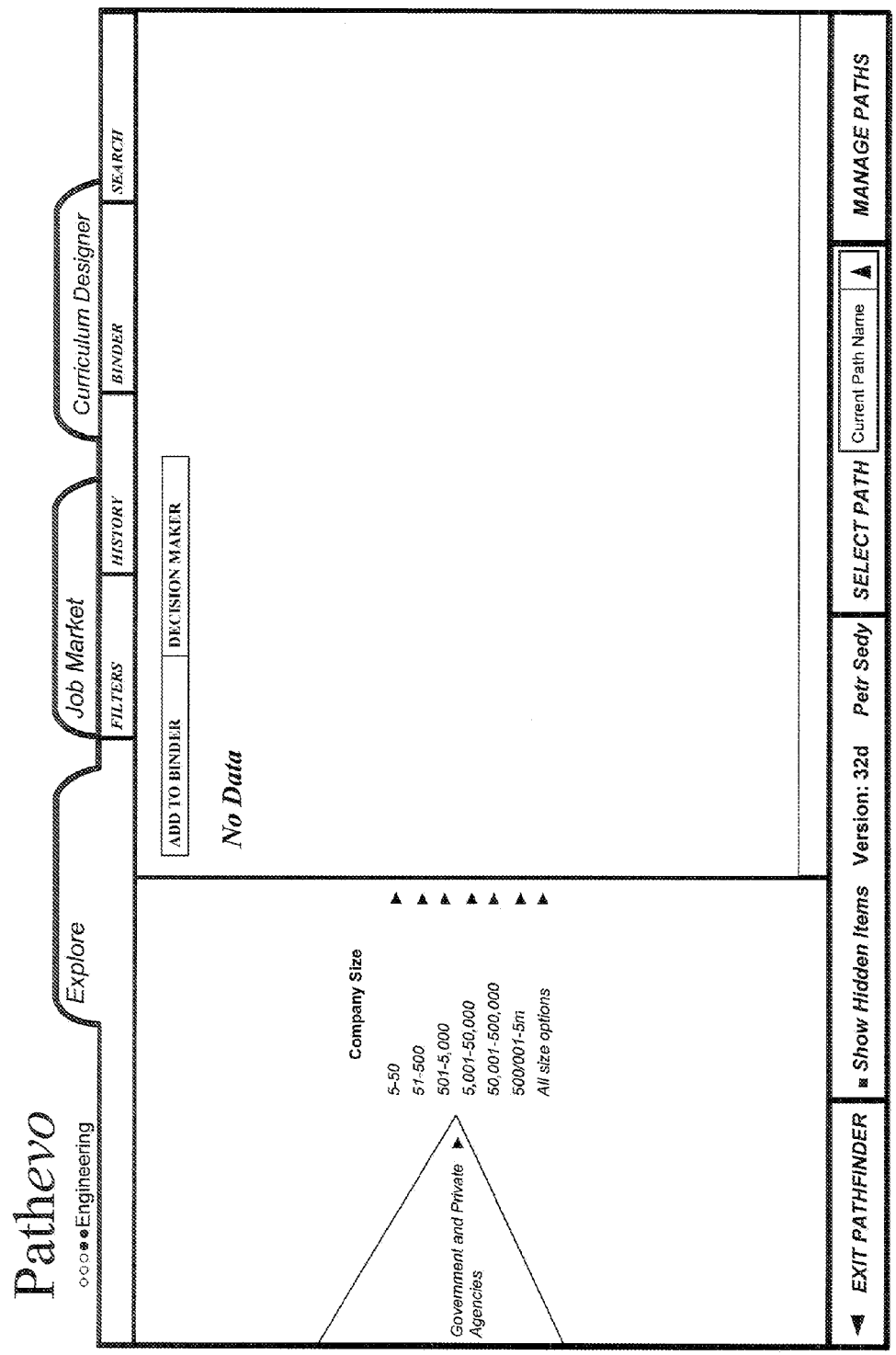
Figure 12E:
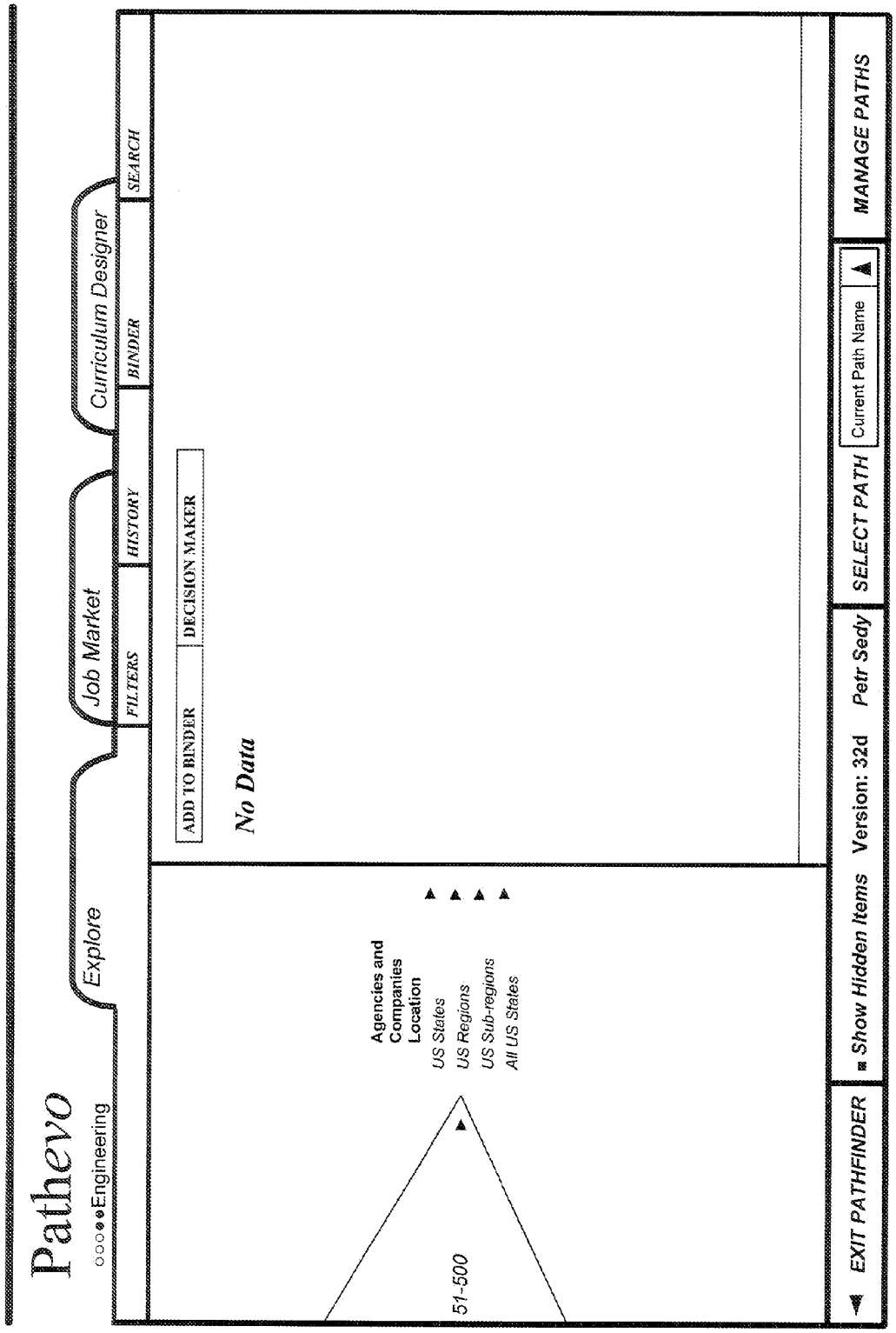
Figure 12F:
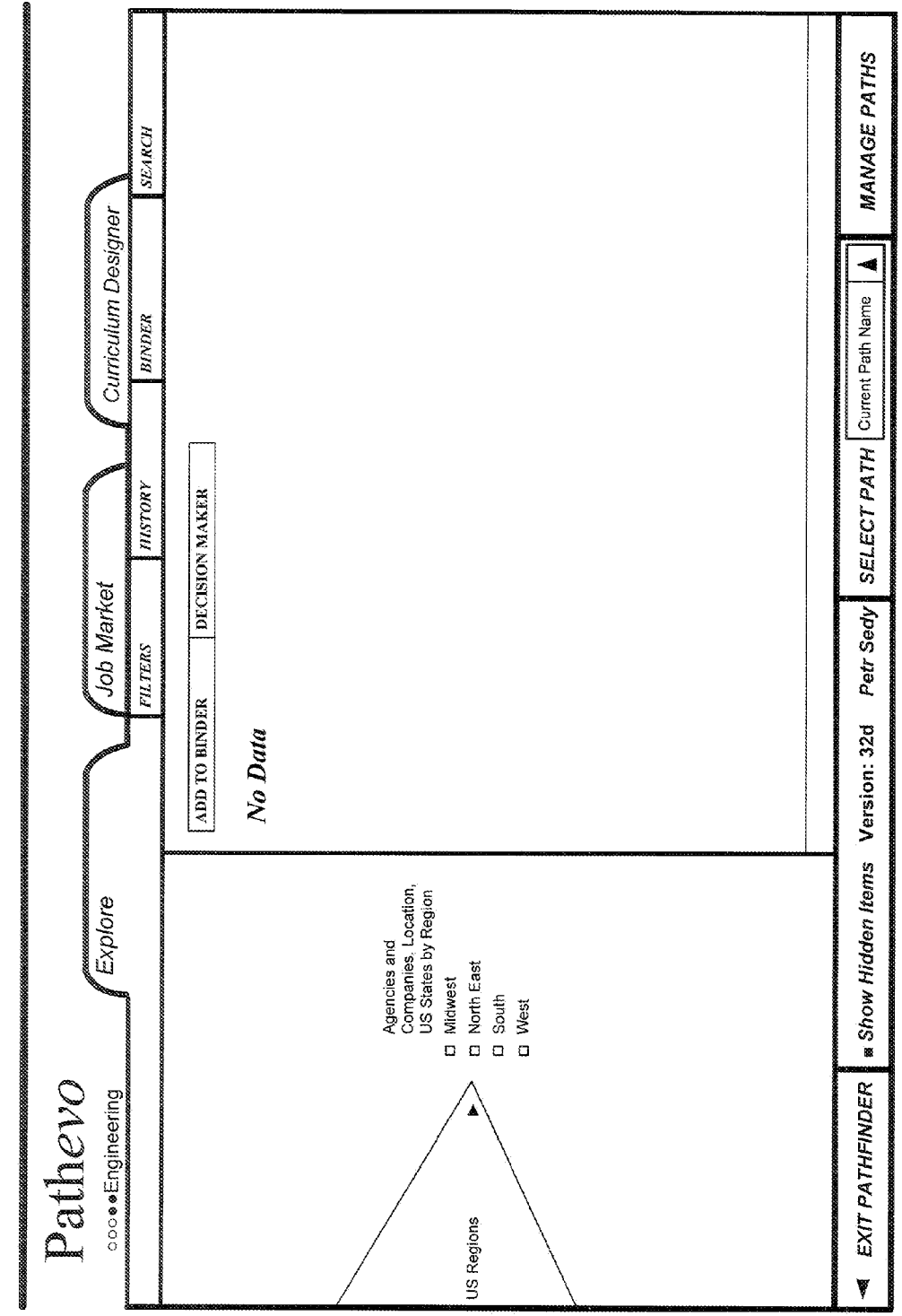
Figure 12G:
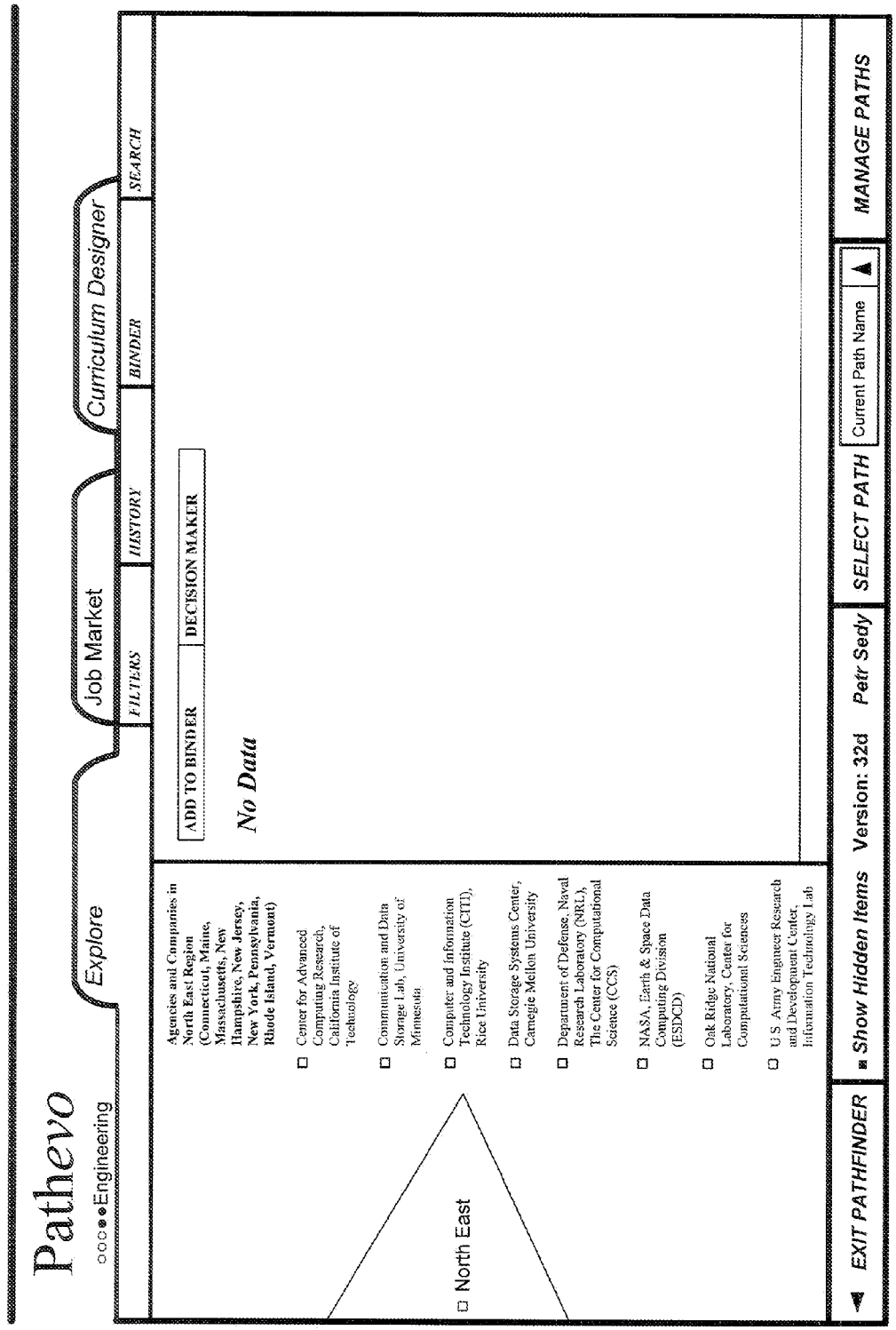
Figure 12H:
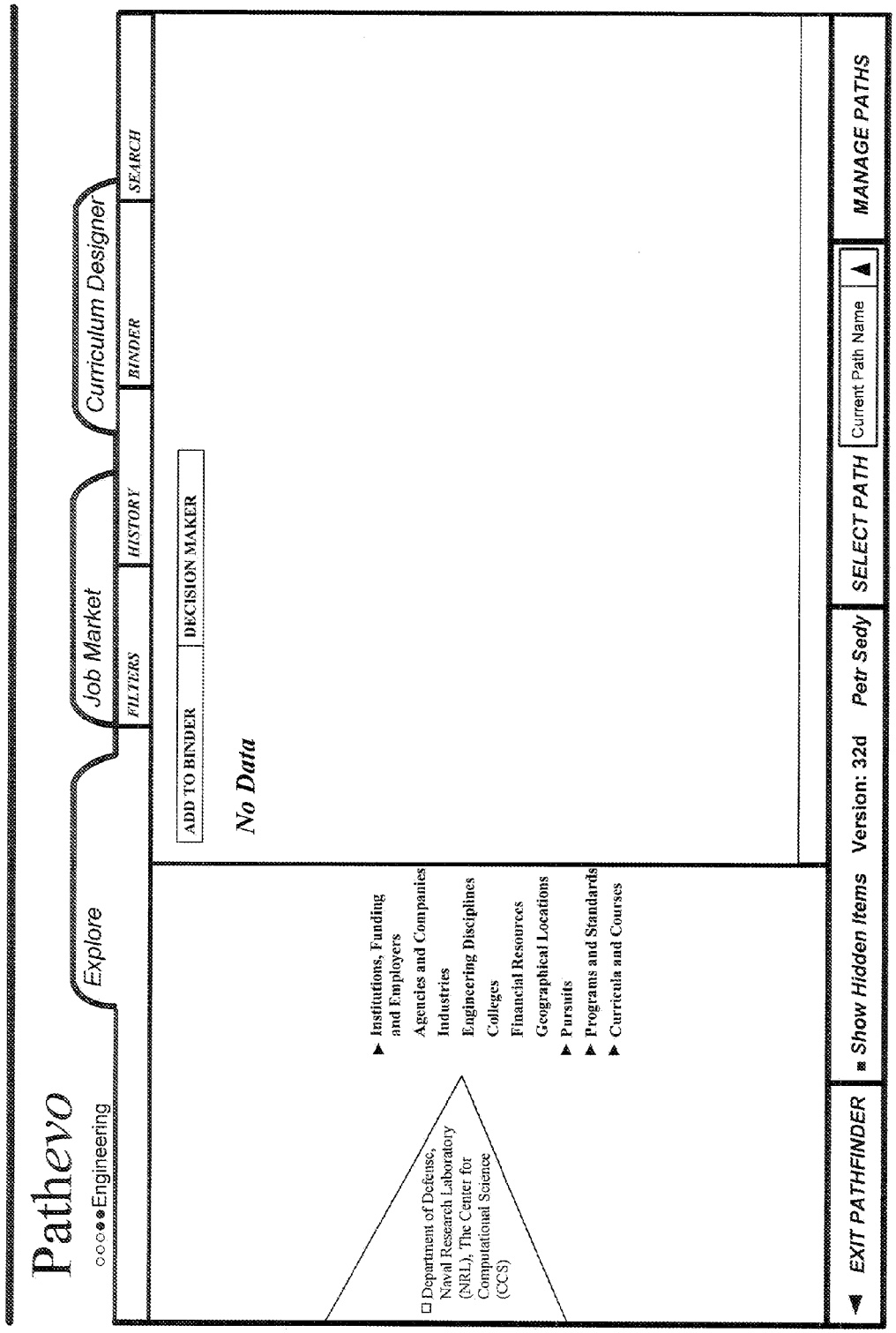
Figure 12J:
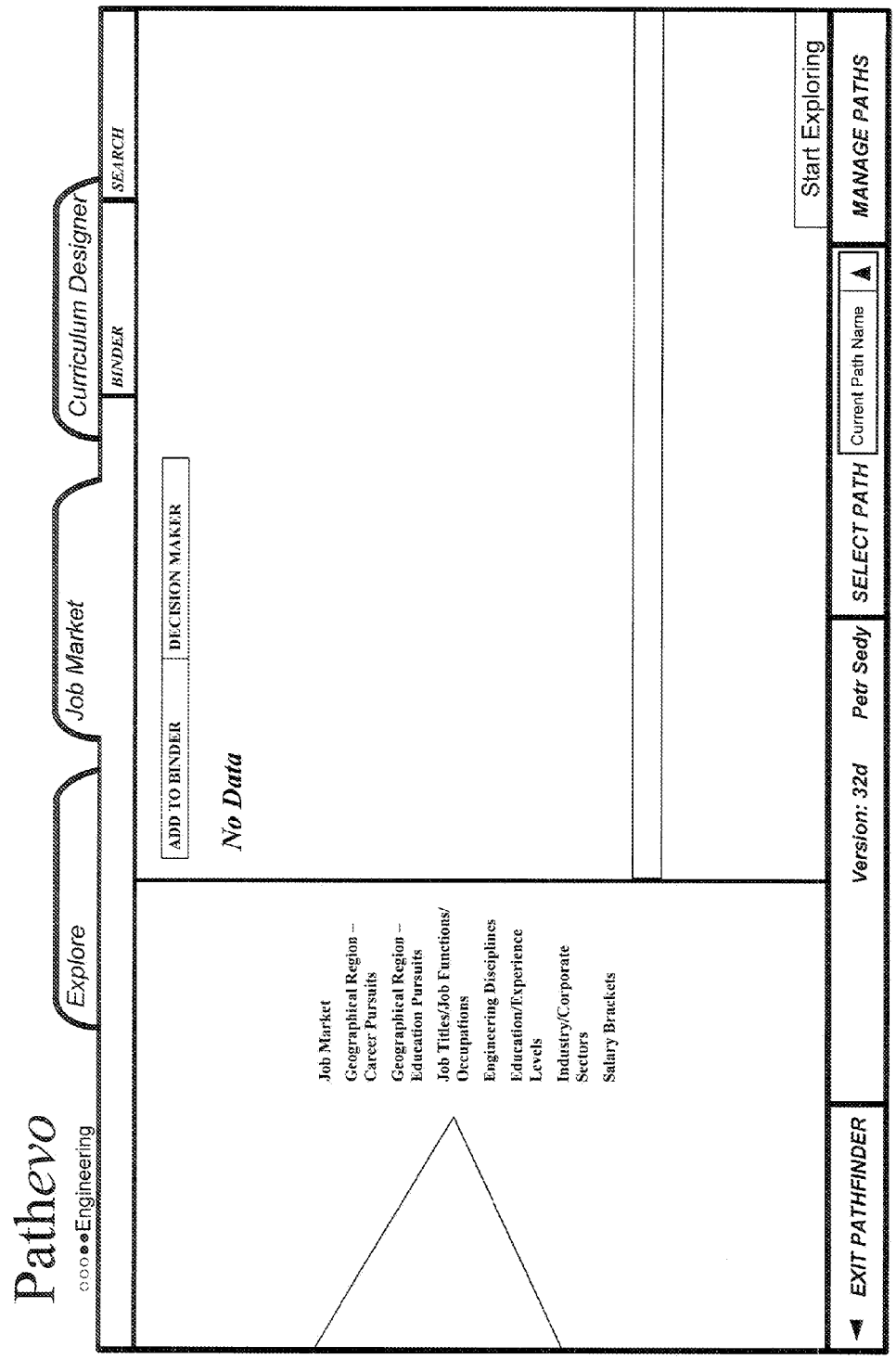
Figure 12K:
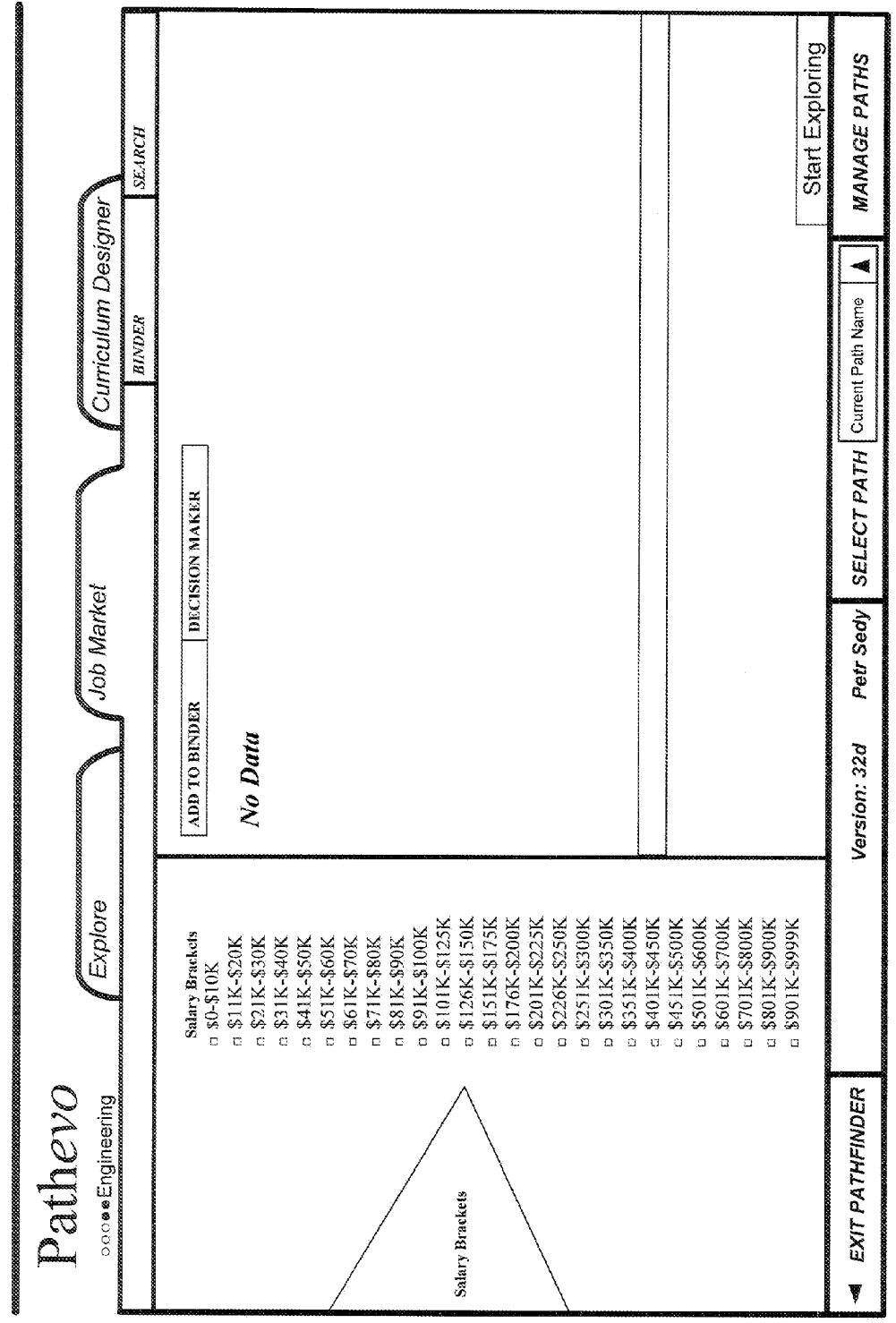
Figure 12L:
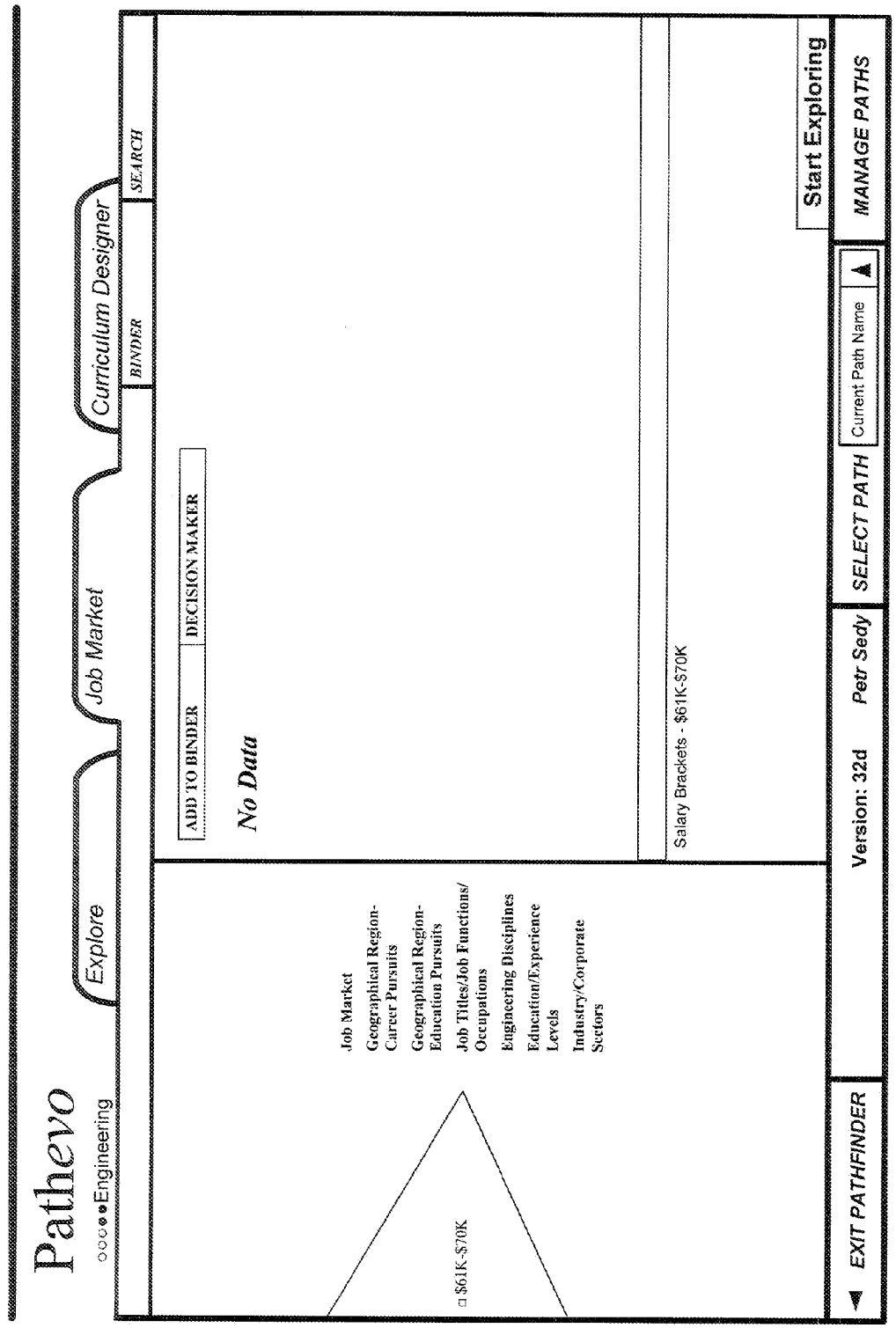
Figure 12M:
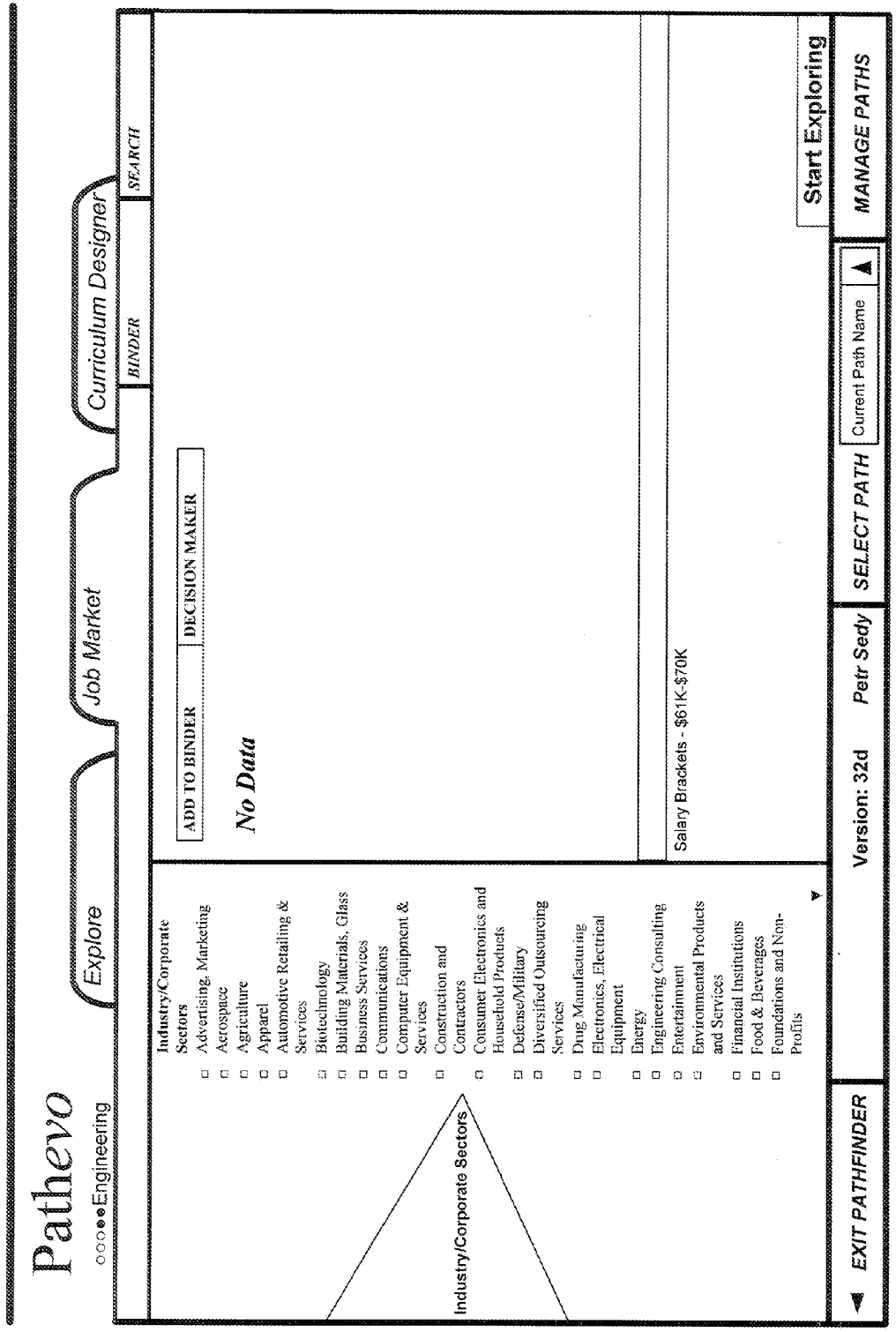
Figure 12N:
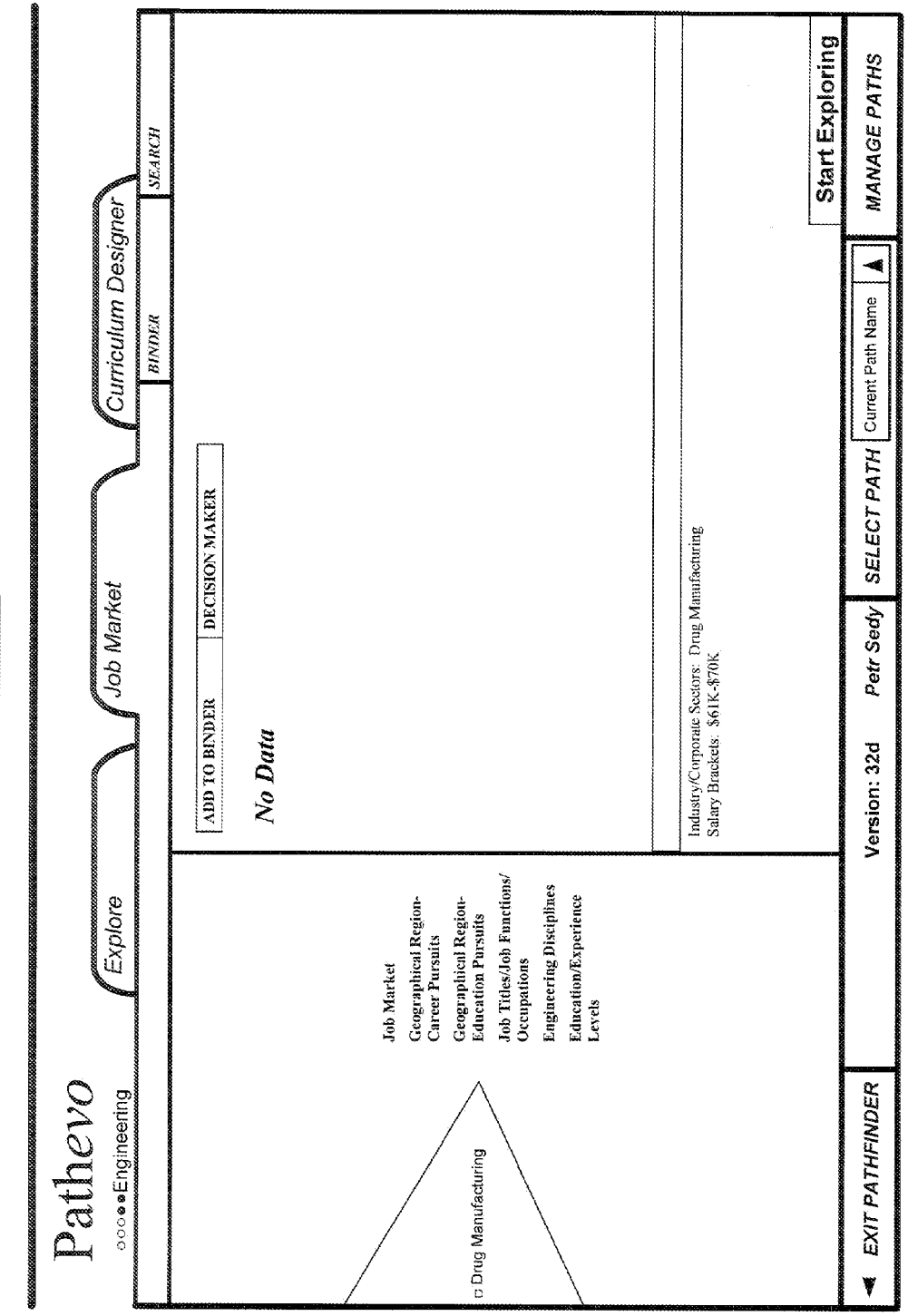
Figure 12O:
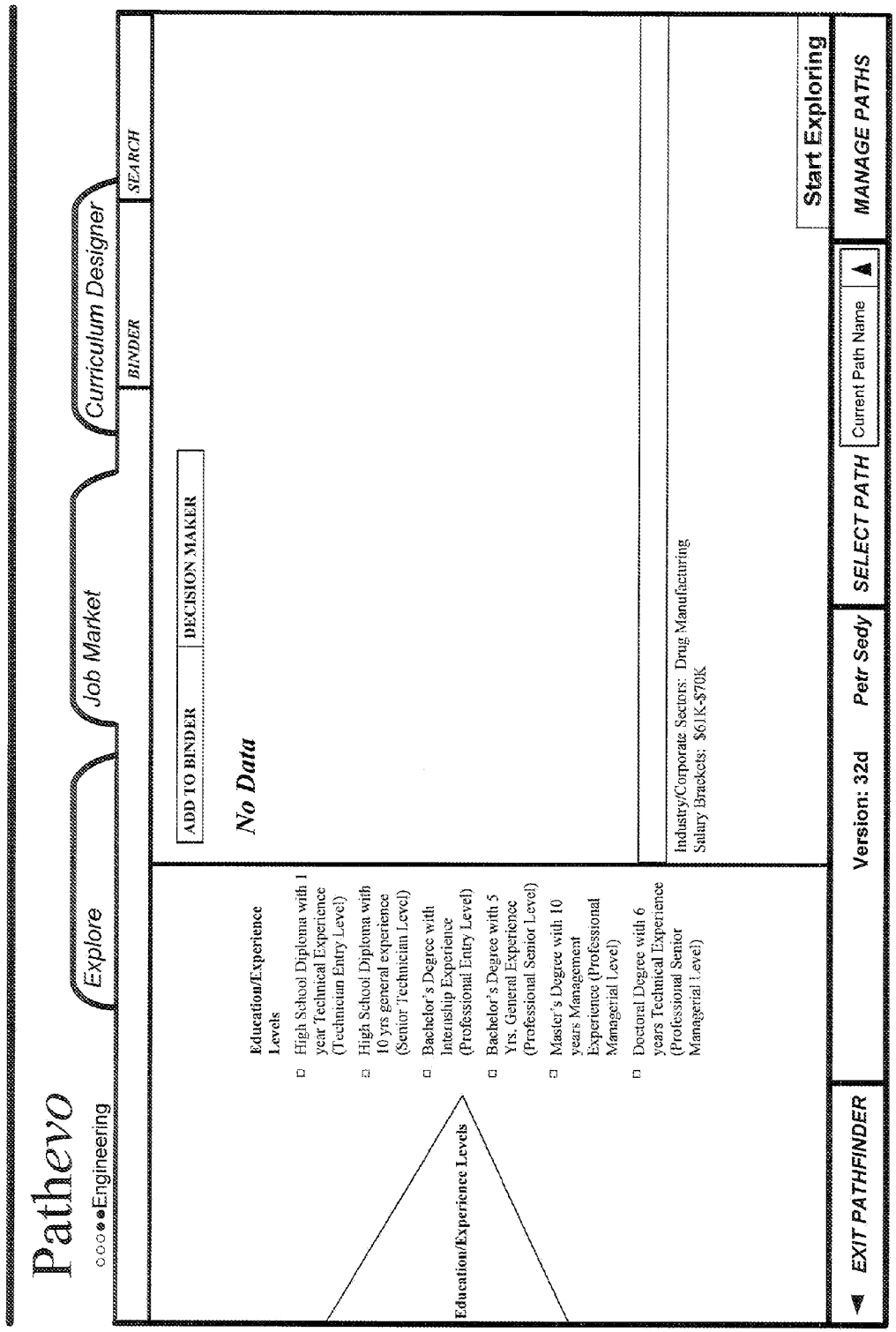
Figure 12P:
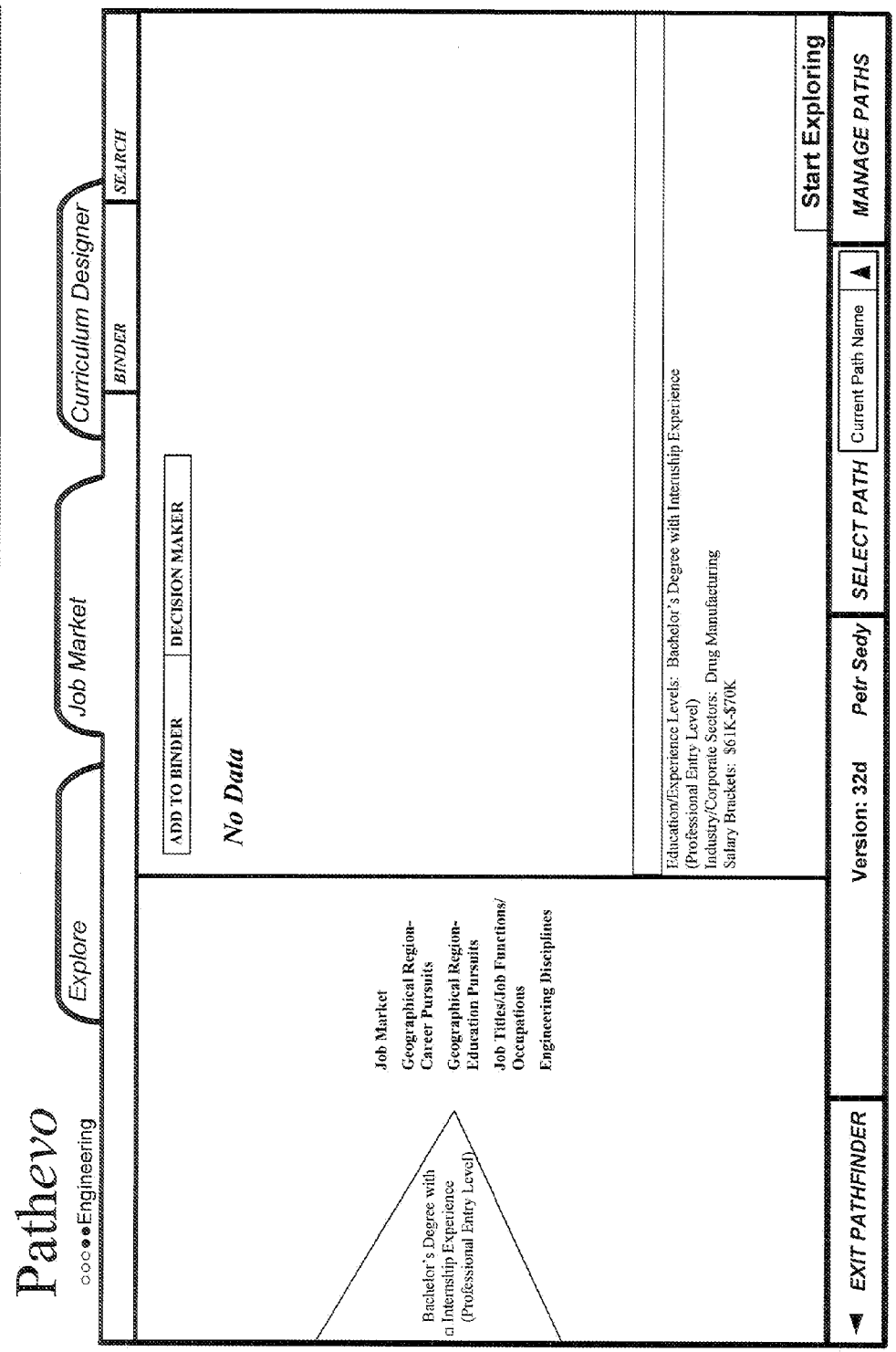
Figure 12Q:
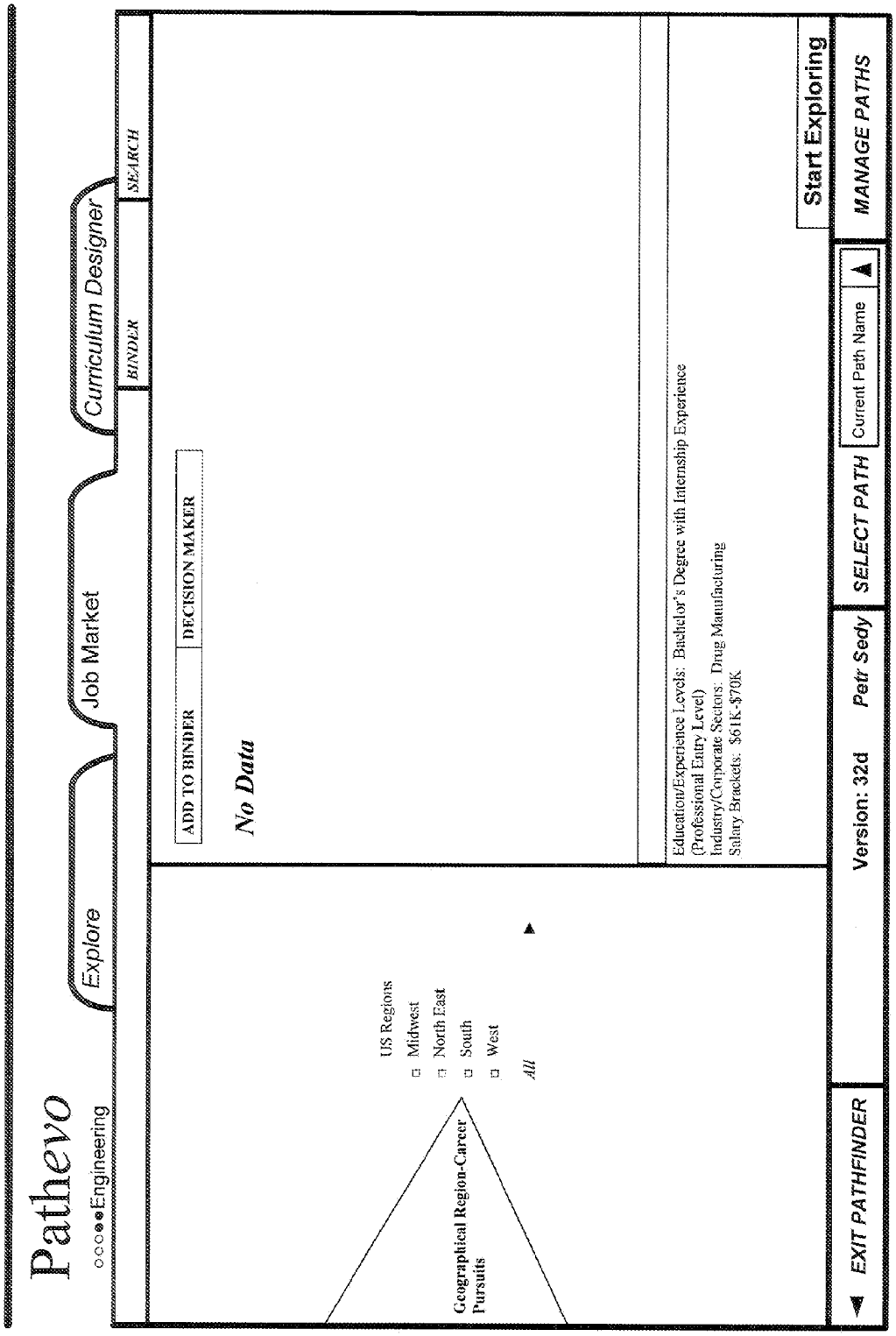
Figure 12R:
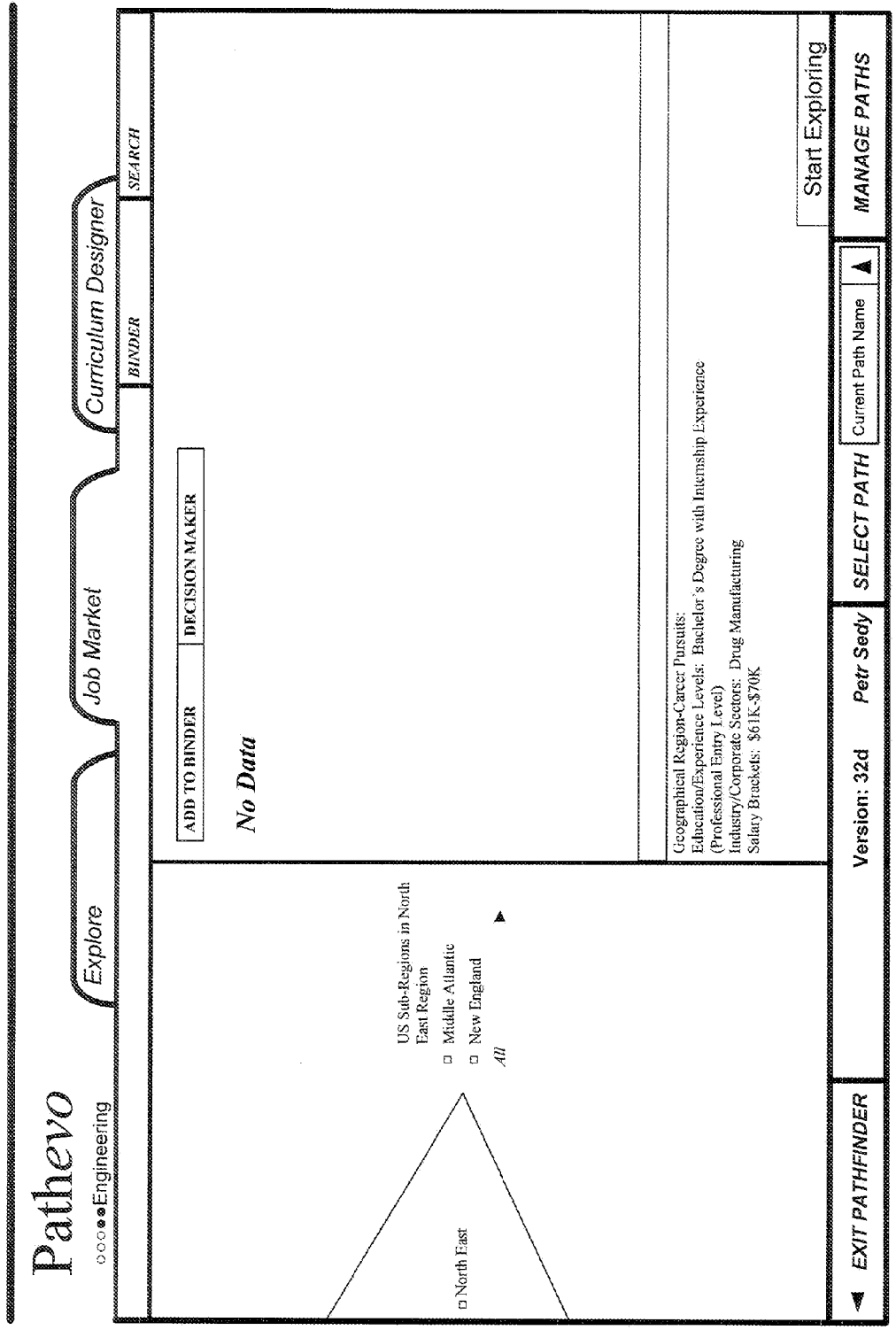
Figure 12S:
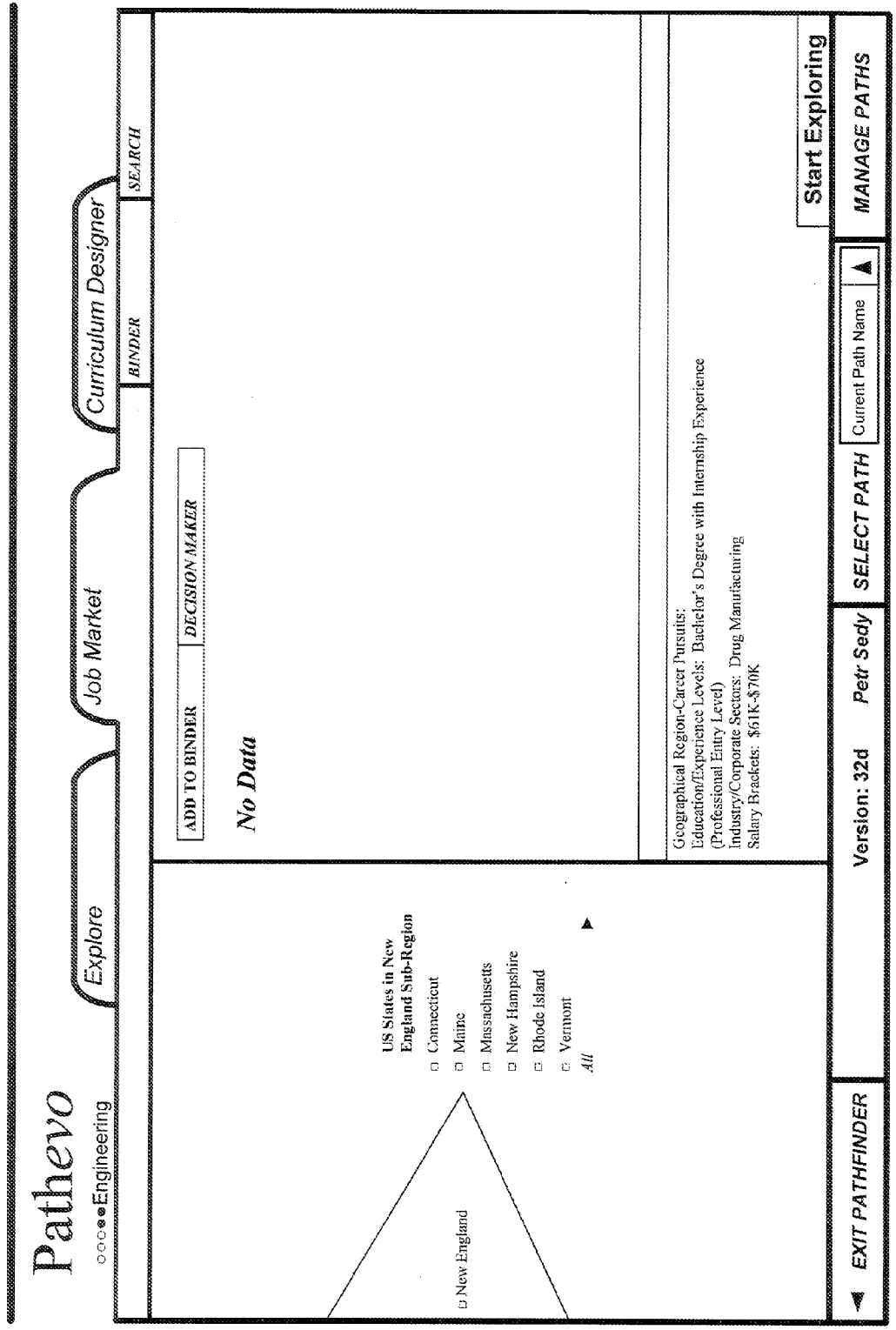
Figure 12T:
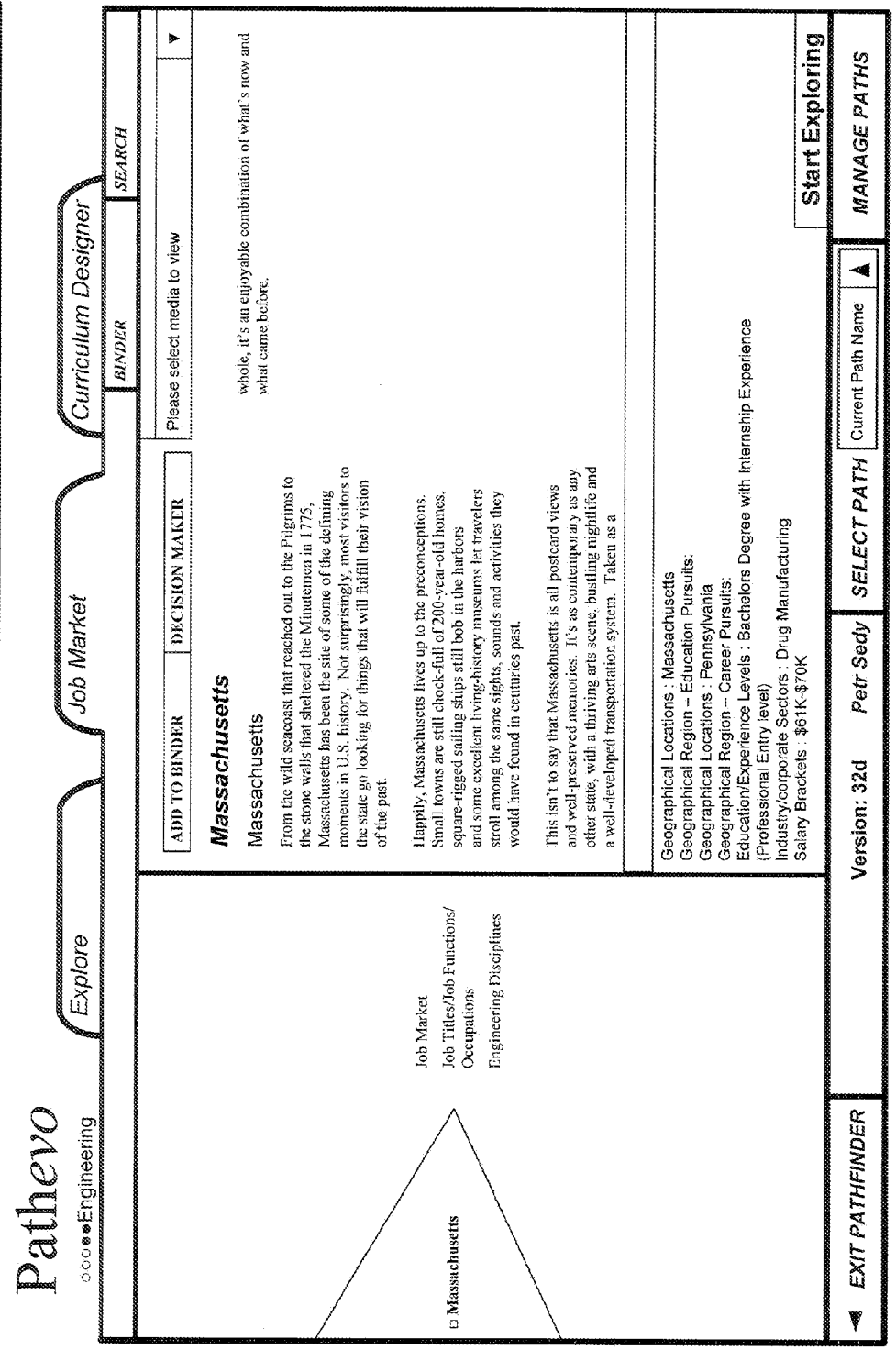

Explore/Job Market Screen Shots. FIGS. 12A-12U illustrate explore/job market screen shots. FIG. 12A illustrates the main categories and levels of the application. FIGS. 12B to 12G take a user from the first level to additional sub-levels, to obtain module and sub-module lists. FIGS. 12H to 12I illustrates succeeding navigation proceeding in an "always forward" mode (referred to as orbital navigation). FIGS. 15J to 15T illustrates list of modules within which user has to choose choice options, and the program then presents to the user the possibilities for the remaining categories. For each choice, user is able to review vast multimedia content on the choice item before making a decision to choose. FIG. 15U is an assessment user interface.

The present invention is described in terms of the above embodiments for convenience only, and this is not intended to limit the application of the present invention. It will be apparent to one skilled in the relevant arts how to implement the present invention in alternative embodiments. In addition, the Figures and screen shots described above, which highlight the functionality and advantages of the present invention, are presented for example purposes only. The architecture of the present invention is sufficiently flexible and configurable, such that it may be utilized in ways other than that shown in the Figures and screen shots. Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for presenting data relating to at least one individualized instructional program, the method comprising:
generating first filtering criteria utilizing user attributes;
accessing at least one database relating to the at least one individualized instructional program, the at least one database comprising modules;
determining a start table, the start table determined by a module a user chose when the user began accessing the at least one database;
applying the first filtering criteria to the start table to generate any primary documents, the first filtering criteria comprising user attribute variables representing primary intra-module filter accessing and filtering information only within any one module;
applying second filtering criteria based on the first filtering criteria to generate any secondary documents, the second filtering criteria comprising inter-module secondary filtering information in at least two modules, the at least two modules including the module utilized to generate any primary documents; and
continuously adapting the first and second filtering criteria to generate a unique end table to fit an adapting user profile, the unique end table populated by any generated primary or secondary documents.

2. The method of claim 1, wherein the applying of the second filtering criteria further comprises determining if the first filtering criteria is closely related to information in at least one module being searched, the at least one module being a module other than the module utilized in the first filtering criteria, and if the first filtering criteria is closely related, designating a high value factor.

3. The method of claim 2, wherein if the first filtering criteria and the information in the at least one module being searched are not closely related, determining if the first filtering criteria and the information in the at least one module being searched are loosely related, and if so, designating a low value factor.

4. The method of claim 2, wherein if the information in the at least one module contains new content;
selecting another item from the information in the at least one module;
applying the generated first filtering criteria;
determining if at least one preclusive condition has been met; and
if at least one preclusive condition has been met, designating the item as not meeting the filtering criteria.

5. The method of claim 4, wherein if at least one preclusive condition has not been met, determining if a degree is higher than a specified threshold.

6. The method of claim 5, wherein if the degree is determined to be higher than the specified threshold, an item is considered to meet the filtering criteria.

7. The method of claim 5, wherein if the degree is not higher than the specified threshold, determining if there at least one table exists deeper in a history that has not been processed.

8. The method of claim 7, wherein if at least one table does not exist deeper in the history that has not been processed, the table is designated as not meeting the first filtering criteria.

9. The method of claim 7, wherein if at least one table exists deeper in the history that has not been processed, the table is designated as a new table with new content, and from which primary or secondary documents have not yet been generated.

10. The method of claim 1, wherein the first filtering criteria related to user attribute variables comprises information from at least one of: education; careers; and personal attributes.

11. The method of claim 1, further comprising utilizing a graphical user interface that adapts to a user profile.

12. The method of claim 1, further comprising extracting the first filtering criteria by capturing at least one user reaction to at least one self-assessment instrument.

13. The method of claim 1, wherein the first criteria is created by capturing and processing user reactions.

14. The method of claim 1, further comprising discovering intersections among at least two instruments and assigning meaning to the intersections.

15. The method of claim 1, wherein the at least one database is an updatable database.

16. The method of claim 1, wherein data in at least two databases is integrated into a database to produce a dynamic intersection of options.

17. The method of claim 1, wherein the individualized instructional program comprises information from more than one institution.

18. The method of claim 17, wherein the individualized instructional program comprises information available on the Internet.

19. The method of claim 1, further comprising customizing display information to match current user profile information.

20. The method of claim 19, wherein customizing the display information to match the current user profile information comprises a personal agent factor.

21. The method of claim 20, wherein the personal agent factor comprises: organizing and reporting customized user profile information; and assigning display information to customized user profile information.

22. The method of claim 19, wherein the user profile information is related to the individualized instructional program.

23. A system for presenting data relating to at least one individualized instructional program, the system comprising a program configured to operate with a processor, the program capable of:

generating first filtering criteria utilizing user attributes;

accessing at least one database relating to the at least one individualized instructional program, the at least one database comprising modules;

determining a start table, the start table determined by a module a user chose when the user began accessing the at least one database;

applying the first filtering criteria to the start table to generate any primary documents, the first filtering criteria comprising user attribute variables representing primary intra-module filter accessing and filtering information only within any one module;

applying second filtering criteria based on the first filtering criteria to generate any secondary documents, the second filtering criteria comprising inter-module secondary filtering information in at least two modules, the at least two modules including the module utilized to generate any primary documents; and continuously adapting the first and second filtering criteria to generate a unique end table to fit an adapting user profile, the unique end table populated by any generated primary or secondary documents.

24. The system of claim 23, wherein generating the second filtering criteria further comprises determining if the first filtering criteria and the information in at least one module being searched are closely related, and if so, designating a high value factor.

25. The system of claim 24, further comprising determining if the first filtering criteria and the information in at least one module being searched are closely related, and if so, designating a high value factor.

26. The system of claim 25, further comprising: applying the generated first filtering criteria; determining if at least one preclusive condition has been met; and if at least one preclusive condition has been met, designating the item as not meeting the filtering criteria.

27. The system of claim 26, further comprising determining if a degree is higher than a specified threshold.

28. The system of claim 26, further comprising determining if there at least one table exists deeper in history that has not been processed.

29. The system claim 23, wherein at least one key personal attribute is discovered and added to the filtering criteria.

30. The system of claim 23, wherein the first filtering criteria comprises information from at least one of: careers; and personal attributes.

31. The system of claim 23, further comprising an interface that adapts to a user profile.

32. The system of claim 23, further comprising extracting an accurate user profile by capturing at least one user reaction to at least one question.

33. The system of claim 23, wherein data responsive to the first filtering criteria has been filtered across different types of data.

34. The system of claim 23, further comprising customizing display information in a user interface to match the at least one user profile.

35. The system of claim 34, further comprising: if the current user profile information does not meet criteria of at least one norm user profile, customizing the display information to match the current user profile information.

* * * * *